US011208116B2

(12) United States Patent
Emura

(10) Patent No.: US 11,208,116 B2
(45) Date of Patent: Dec. 28, 2021

(54) DRIVING ASSISTANCE METHOD, AND DRIVING ASSISTANCE DEVICE AND DRIVING ASSISTANCE SYSTEM USING SAID METHOD

(71) Applicant: Panasonic Intellectual Property Management Co., Ltd., Osaka (JP)

(72) Inventor: Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 210 days.

(21) Appl. No.: 16/546,331

(22) Filed: Aug. 21, 2019

(65) Prior Publication Data

US 2019/0375430 A1 Dec. 12, 2019

Related U.S. Application Data

(63) Continuation of application No. PCT/JP2018/006341, filed on Feb. 22, 2018.

(30) Foreign Application Priority Data

Mar. 2, 2017 (JP) .............................. JP2017-039752
Mar. 2, 2017 (JP) .............................. JP2017-039753

(Continued)

(51) Int. Cl.
*B60W 50/14* (2020.01)
*B60W 30/09* (2012.01)
(Continued)

(52) U.S. Cl.
CPC ............ *B60W 50/14* (2013.01); *B60W 30/09* (2013.01); *B60W 30/0956* (2013.01);
(Continued)

(58) Field of Classification Search
CPC ................. B60W 30/08; B60W 30/18; B60W 30/18009; B60W 30/18018; B60W 30/09;
(Continued)

(56) References Cited

U.S. PATENT DOCUMENTS 8,676,431 B1 * 3/2014 Mariet .................... G08G 1/166
701/28
8,773,281 B2 * 7/2014 Ghazarian ........... H04L 12/6418
340/903
(Continued)

FOREIGN PATENT DOCUMENTS

CN 105015548 B * 10/2017
CN 105270366 B * 8/2019 .............. B60T 8/171
(Continued)

OTHER PUBLICATIONS

International Search Report of PCT application No. PCT/JP2018/006341 dated Apr. 17, 2018.

*Primary Examiner* — Angelina Shudy
(74) *Attorney, Agent, or Firm* — Greenblum & Bernstein, P.L.C.

(57) ABSTRACT

Behavior information input unit (54) receives stop-behavior information about vehicle (100) from automatic-driving control device (30). Image-and-sound output unit (51) outputs inquiry information for inquiring of an occupant whether a possibility of collision between an obstacle and vehicle (100) is to be excluded from a determination object in automatic-driving control device (30) to notification device (2), when a distance from one point on a predictive movement route of the obstacle to the obstacle is greater than or equal to a first threshold, and a speed of the obstacle is less than or equal to a second threshold. Operation signal input unit (50) receives a response signal for excluding the collision possibility from the determination object. Command output unit (55) outputs a command to exclude the (Continued)

collision possibility from the determination object to automatic-driving control device (30).

6 Claims, 23 Drawing Sheets

(30) Foreign Application Priority Data

Mar. 2, 2017 (JP) .............................. JP2017-039754
Mar. 2, 2017 (JP) .............................. JP2017-039755

(51) Int. Cl.
| | |
|---|---|
| *B60W 30/095* | (2012.01) |
| *B60W 50/10* | (2012.01) |
| *G05D 1/02* | (2020.01) |

(52) U.S. Cl.
CPC ............ *B60W 50/10* (2013.01); *G05D 1/0214* (2013.01); *B60W 2540/00* (2013.01); *B60W 2554/801* (2020.02)

(58) Field of Classification Search
CPC ..... B60W 30/0956; B60W 2050/0067; B60W 50/08; B60W 50/082; B60W 50/087; B60W 50/10; B60W 50/14; B60W 2050/146; B60W 60/00; B60W 60/0018; B60W 60/0016; B60W 60/0024; B60W 2554/801; B60W 2540/00; G05D 1/0088; G05D 1/0214
USPC .......................................... 701/26, 300, 301
See application file for complete search history.

(56) References Cited

U.S. PATENT DOCUMENTS

| | | | | |
|---|---|---|---|---|
| 9,517,767 | B1* | 12/2016 | Kentley | B60W 30/095 |
| 9,630,619 | B1* | 4/2017 | Kentley | G01C 21/32 |
| 9,697,733 | B1* | 7/2017 | Penilla | B60L 58/12 |
| 10,252,726 | B2* | 4/2019 | Emura | B60W 40/09 |
| 10,640,129 | B2* | 5/2020 | Emura | G08G 1/09 |
| 10,654,490 | B2* | 5/2020 | Urano | G01C 21/3415 |
| 10,793,165 | B2* | 10/2020 | Watanabe | G05D 1/0088 |
| 10,919,540 | B2* | 2/2021 | Tsuji | B60W 50/14 |
| 2012/0041632 | A1* | 2/2012 | Garcia Bordes | B60W 30/0953 701/29.1 |
| 2013/0110343 | A1* | 5/2013 | Ichikawa | G01C 21/3415 701/23 |
| 2016/0171898 | A1* | 6/2016 | Silver | G08G 5/0078 701/3 |
| 2016/0231746 | A1* | 8/2016 | Hazelton | G01S 13/867 |
| 2017/0120803 | A1* | 5/2017 | Kentley | B60W 10/18 |
| 2017/0297568 | A1* | 10/2017 | Kentley | G09G 5/363 |
| 2017/0371334 | A1* | 12/2017 | Nagy | B60W 50/14 |
| 2018/0074497 | A1* | 3/2018 | Tsuji | G01C 21/3484 |
| 2018/0105185 | A1* | 4/2018 | Watanabe | B60K 37/06 |
| 2018/0154824 | A1* | 6/2018 | Urano | B60Q 1/46 |
| 2019/0061775 | A1* | 2/2019 | Emura | G05D 1/0061 |
| 2019/0071101 | A1* | 3/2019 | Emura | G08G 1/09 |
| 2019/0086550 | A1* | 3/2019 | Dussan | G01S 7/4861 |
| 2019/0168772 | A1* | 6/2019 | Emura | B60W 50/10 |
| 2020/0198649 | A1* | 6/2020 | Emura | B60W 50/0098 |
| 2021/0009117 | A1* | 1/2021 | Emura | B60W 60/0055 |
| 2021/0144152 | A1* | 5/2021 | Gogna | H04L 63/0876 |

FOREIGN PATENT DOCUMENTS

| | | | | |
|---|---|---|---|---|
| JP | 10-016734 | | 1/1998 | |
| JP | 2004106682 A | * | 4/2004 | |
| WO | WO-2018159429 A1 | * | 9/2018 | ........ B60W 30/0956 |

* cited by examiner

FIG. 14
(a)
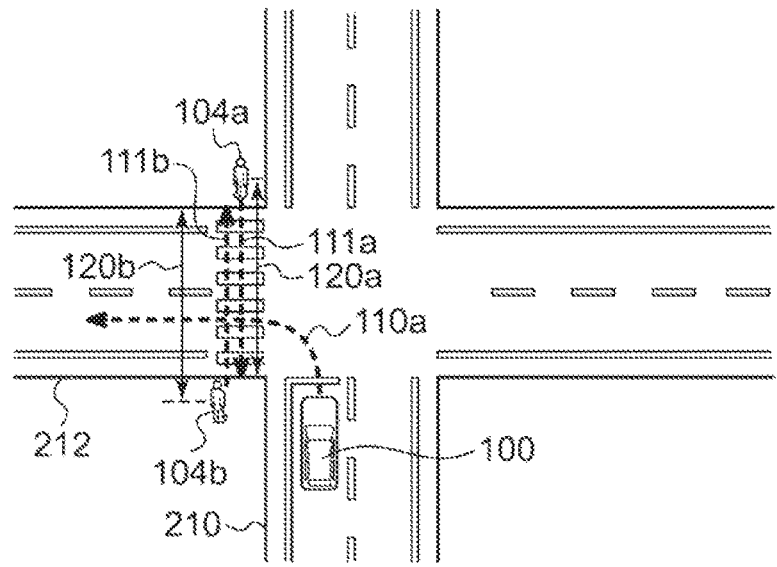
(b)
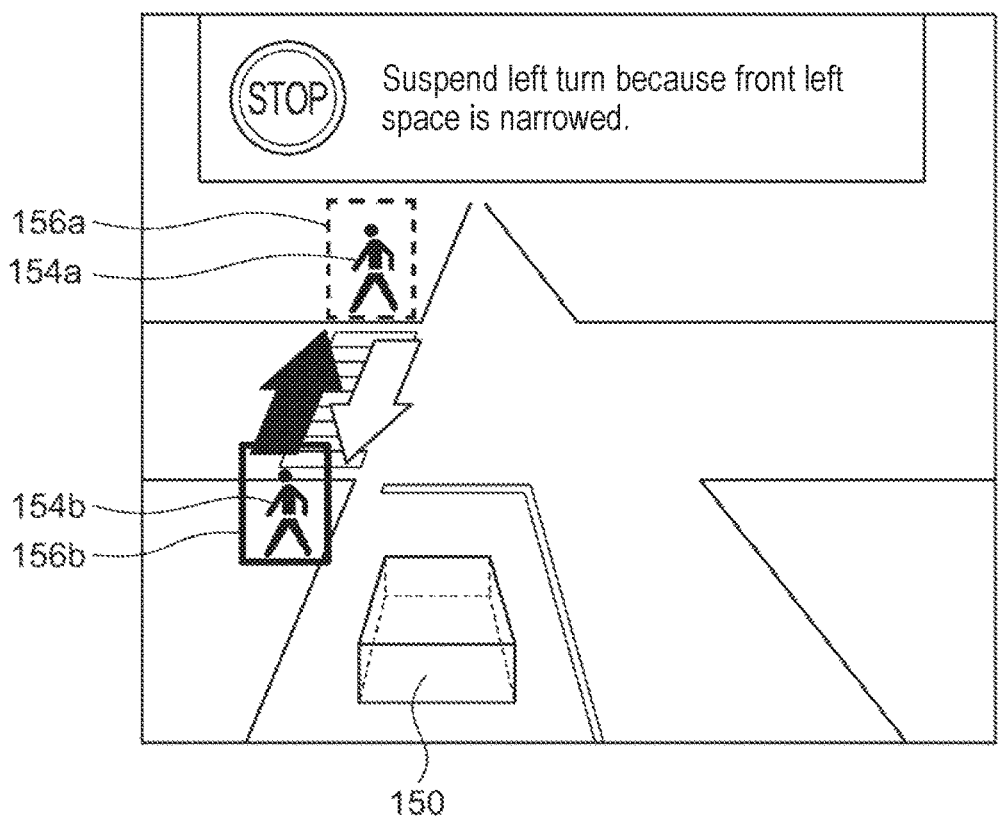

DRIVING ASSISTANCE METHOD, AND DRIVING ASSISTANCE DEVICE AND DRIVING ASSISTANCE SYSTEM USING SAID METHOD

CROSS-REFERENCE TO RELATED APPLICATIONS

This application is a continuation application of the PCT International Application No. PCT/JP2018/006341 filed on Feb. 22, 2018, which claims the benefit of foreign priority of Japanese patent application No. 2017-039752 filed on Mar. 2, 2017, Japanese patent application No. 2017-039753 filed on Mar. 2, 2017, Japanese patent application No. 2017-039754 filed on Mar. 2, 2017, and Japanese patent application No. 2017-039755 filed on Mar. 2, 2017, the contents all of which are incorporated herein by reference.

BACKGROUND

1. Technical Field

The present disclosure relates to a vehicle, a driving assistance method adopted for the vehicle, a driving assistance device using the driving assistance method, an automatic-driving control device, a program, and a driving assistance system.

2. Description of the Related Art

In automatic driving of the vehicle, an obstacle of vehicle traveling is detected, and the vehicle is automatically stooped a predetermined distance short of the obstacle. A long-distance obstacle detector that detects only presence or absence of an obstacle within a long-distance range and a short-distance obstacle detector that obtains a distance to a detected obstacle within a short-distance range are provided in order to optimally control automatic stop of the vehicle traveling at middle and high speed (for example, see Unexamined Japanese Patent Publication No. 10-16734).

SUMMARY

An object of the present disclosure is to provide a technique of traveling according to a situation even if an obstacle exists.

According to one aspect of the present disclosure, a driving system includes a detector, an automatic-driving control device, a notification device, and a driving assistance device. The detector detects at least one of a speed of an obstacle around a vehicle and a distance between the vehicle and the obstacle. The automatic-driving control device calculates a possibility of collision between the obstacle detected by the detector and the vehicle, controls automatic driving of the vehicle using the calculated collision possibility as a determination parameter, and stops the vehicle when the collision possibility is greater than a predetermined value. The notification device makes a notification of at least information about control of the automatic-driving control device. The driving assistance device assists the notification. The driving assistance device outputs first inquiry information to the notification device for inquiring of an occupant whether the possibility of the collision between the obstacle and the vehicle is to be excluded from the determination parameter, when a distance from a first point to the obstacle is greater than or equal to a first threshold, and the speed of the obstacle detected by the detector is less than or equal to a second threshold, in a case that stop-behavior information about the vehicle is input from the automatic-driving control device. The first point is a point at which a predictive movement route of the vehicle intersects with a predictive movement route of the obstacle based on the detection by the detector. The driving assistance device outputs a first command to exclude the possibility of the collision between the obstacle and the vehicle from the determination parameter to the automatic-driving control device, when a response signal of a response operation of exclusion performed by the occupant is input with respect to the first inquiry information of which the notification device makes the notification.

Another aspect of the present disclosure provides a driving assistance device. The driving assistance device includes a detector, an automatic-driving control device, and a notification device, and the driving assistance device is installed in a vehicle. The detector detects at least one of a speed of an obstacle around the vehicle and a distance between the vehicle and the obstacle. The automatic-driving control device calculates a possibility of collision between the obstacle detected by the detector and the vehicle, controls automatic driving of the vehicle using the calculated collision possibility as a determination parameter, and stops the vehicle when the collision possibility is greater than a predetermined value. The notification device makes a notification of at least information about control of the automatic-driving control device. The driving assistance device outputs first inquiry information to the notification device for inquiring of an occupant of the vehicle whether the possibility of the collision between the obstacle and the vehicle is to be excluded from the determination parameter, when a distance from a first point to the obstacle is greater than or equal to a first threshold, and the speed of the obstacle detected by the detector is less than or equal to a second threshold, in a case that stop-behavior information about the vehicle is input from the automatic-driving control device. The first point being a point at which a predictive movement route of the vehicle intersects with a predictive movement route of the obstacle based on the detection by the detector. The driving assistance device outputs a first command to exclude the possibility of the collision between the obstacle and the vehicle from the determination parameter to the automatic-driving control device, when a response signal of a response operation of exclusion performed by the occupant is input with respect to the first inquiry information of which the notification device makes the notification.

Still another aspect of the present disclosure provides a driving assistance method. The driving assistance method is one in a driving assistance device including a detector, an automatic-driving control device, and a notification device, the driving assistance device to be installed in a vehicle. The detector detects at least one of a speed of an obstacle around the vehicle and a distance between the vehicle and the obstacle. The automatic-driving control device calculates a possibility of collision between the obstacle detected by the detector and the vehicle, controls automatic driving of the vehicle using the calculated collision possibility as a determination parameter, and stops the vehicle when the collision possibility is greater than a predetermined value. The notification device makes a notification of at least information about control of the automatic-driving control device. The driving assistance method includes: a step of outputting first inquiry information to the notification device for inquiring of an occupant of the vehicle whether the possibility of the collision between the obstacle and the vehicle is to be excluded from the determination parameter, when a distance from a first point at which a predictive movement route of the vehicle and a predictive movement route of the obstacle based on the detection by the detector intersect to the obstacle is greater than or equal to a first threshold, and the speed of the obstacle detected by the detector is less than or equal to a second threshold, in a case that stop-behavior information about the vehicle is input from the automatic-driving control device; and a step of outputting a first command to exclude the possibility of the collision between the obstacle and the vehicle from the determination parameter to the automatic-driving control device when a response signal of a response operation of exclusion performed by the occupant is input with respect to the first inquiry information of which the notification device makes the notification.

Any desired combinations of the above-described components and modifications of the features of the present disclosure in devices, systems, methods, programs, (non-transitory) recording media containing the programs, vehicles on which the present devices are mounted, or other entities are still effective as other aspects of the present disclosure.

In the present disclosure, the vehicle can travel according to the situation even if the obstacle exists.

BRIEF DESCRIPTION OF DRAWINGS

FIG. 14 is a view illustrating another processing outline according to the second exemplary embodiment.

DETAILED DESCRIPTION OF PREFERRED EMBODIMENTS

Figure 1:
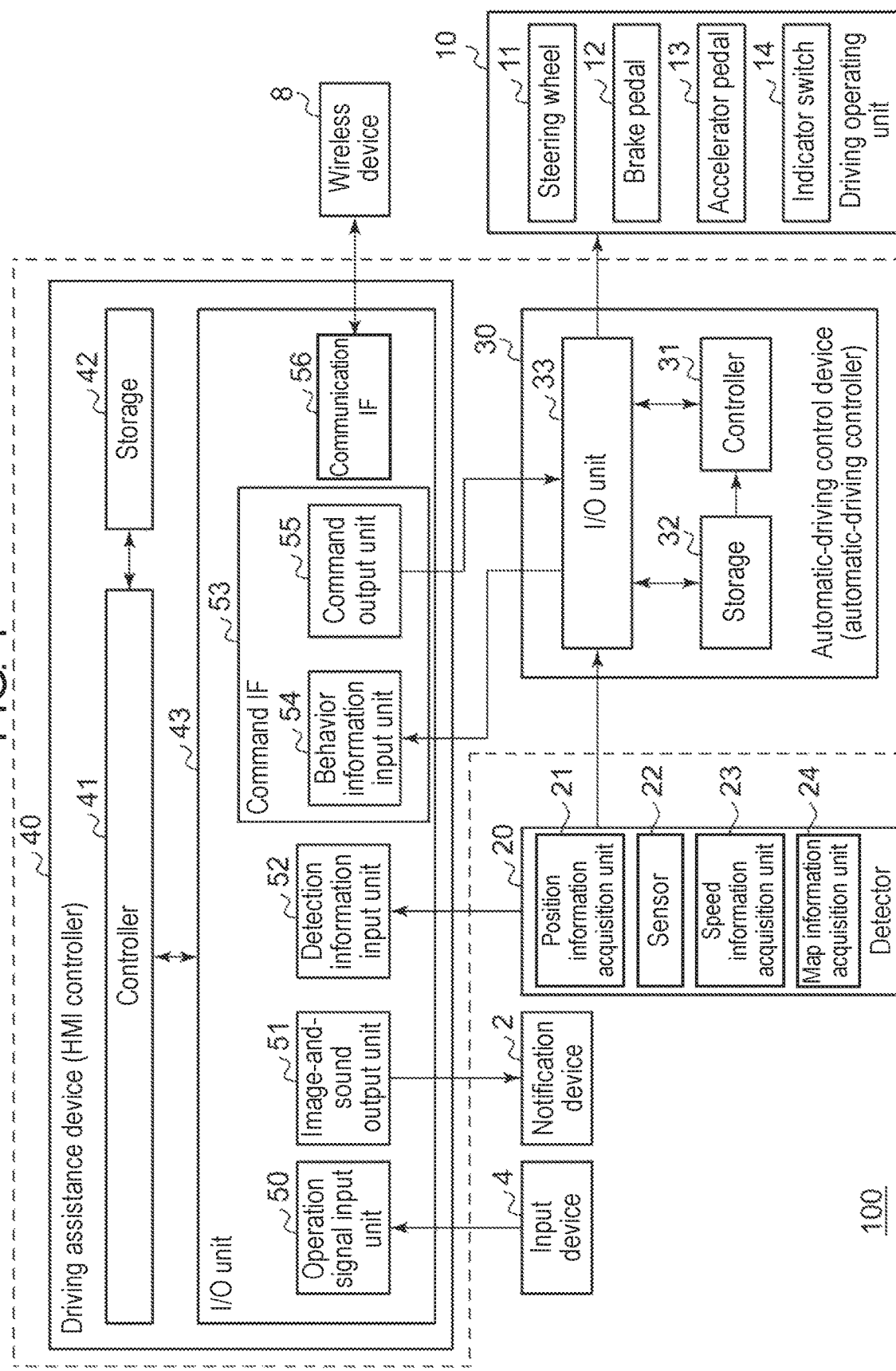
FIG. 1 is a diagram illustrating a configuration of a vehicle according to a first exemplary embodiment.

Prior to describing exemplary embodiments of the present disclosure, a problem of a conventional device is briefly described. The automatic driving vehicle automatically stops by detecting another vehicle or a pedestrian during right and left turns or merging. At this point, sometimes a driver of the other vehicle or the pedestrian gives a way to the automatic driving vehicle. Sometimes another vehicle fails and inevitably stops. However, even if the driver of the other vehicle or the pedestrian gives the way to the automatic driving vehicle or the other vehicle fails and stops, the automatic driving vehicle that automatically stops cannot start traveling because the automatic driving vehicle determines there is a possibility of colliding with a peripheral obstacle including the other vehicle or the pedestrian when detecting that an obstacle such as the other vehicle or the pedestrian exists within a predetermined distance of the automatic driving vehicle.

First Exemplary Embodiment

An outline will be described before the specific description of the present disclosure. A first exemplary embodiment relates to a vehicle that calculates a possibility of colliding with a detected obstacle and performs automatic driving using the calculated collision possibility as a determination object. In particular, the first exemplary embodiment relates to a device (hereinafter, also referred to as a "driving assistance device") that controls a human machine interface (HMI) that exchanges information about a driving behavior of the vehicle with an occupant (for example, a driver) of the vehicle. The "driving behavior" includes an operating state such as steering and braking during traveling and stopping of the vehicle, or a control content relating to the automatic driving control. Examples of the driving behavior include constant speed traveling, acceleration, deceleration, temporary stop, stop, lane change, course change, right or left turn, parking, and the like. In addition, examples of the driving behavior may include cruising (running while keeping a lane and maintaining a vehicle speed), lane keeping, following a preceding vehicle, stop and go during following, lane change, passing, response to a merging vehicle, crossover (interchange) including entry to and exit from an expressway, merging, response to a construction zone, response to an emergency vehicle, response to an interrupting vehicle, response to lanes exclusive to right and left turns, interaction with a pedestrian and a bicycle, avoidance of an obstacle other than a vehicle, response to a sign, response to restrictions of right and left turns and a U-turn, response to lane restriction, response to one-way traffic, response to a traffic sign, response to an intersection and a roundabout, and the like.

In the driving behavior such as the interruption and the right and left turns, in the case that the obstacle such as a peripheral traveling vehicle (peripheral vehicle) and a person exists near the vehicle, an automatic-driving control device calculates the possibility of the collision with the obstacle, and stops the vehicle when the collision possibility exceeds a predetermined value. When a state in which the collision possibility exceeds the predetermined value continues, the automatic-driving control device does not cause the vehicle to start. Even in such situation, sometimes the obstacle gives the way to the vehicle. This is done by eye contact between the occupant or the person of the peripheral vehicle and the occupant of the vehicle in the case that the vehicle does not perform the automatic driving. However, because the automatic driving is performed in the vehicle, unless the vehicle recognizes the obstacle gives the way to the vehicle even if the obstacle gives the way to the vehicle, the vehicle does not start in the state in which the collision possibility exceeds the predetermined value. On the other hand, in order to smooth traffic, the vehicle should start in the case that the obstacle gives the way to the vehicle.

The first exemplary embodiment focuses on the "interruption" as the driving behavior. For example, the interruption occurs in a scene in which a merging road is connected to a merged road at a merging point. When the vehicle travelling on the merging road is in front of the merging point, the automatic-driving control device calculates the possibility of collision with a peripheral vehicle that travels on the merged road and is to be interrupted by the vehicle. When the collision possibility exceeds a predetermined value, the automatic-driving control device stops the vehicle in front of the merging point to the merged road. In this situation, if the peripheral vehicle also stops in front of the merging point to give the way to the vehicle, the interruption to the peripheral vehicle is possible.

In order to enable the interruption in such a situation, the driving assistance device of the first exemplary embodiment performs the following processing. The driving assistance device is informed by the automatic-driving control device about the driving behavior of the "stop" that occurs during the driving behavior of the "interruption". The driving assistance device specifies an intersection of the merged road where the merged road intersects with the merging road from map information, and derives a distance between the intersection and the peripheral vehicle as a determination distance. The driving assistance device acquires a speed of the peripheral vehicle. When the determination distance is greater than or equal to a first threshold, and the speed is less than or equal to a second threshold, the driving assistance device inquires of the occupant whether the possibility of the collision between the peripheral vehicle and the vehicle is to be excluded from the determination object in the automatic-driving control device. For example, the image for inquiry is generated and displayed on a monitor in the vehicle. When receiving a response operation to exclude the collision possibility from the occupant with respect to the inquiry, the driving assistance device generates a command to exclude the possibility of the collision between the peripheral vehicle and the vehicle from the determination object, and transmits the command to the automatic-driving control device. When receiving the command from the driving assistance device, the automatic-driving control device excludes the possibility of the collision between the peripheral vehicle and the vehicle from the determination object, and starts the vehicle when the collision possibility is less than a predetermined value.

Hereinafter, exemplary embodiments of the present disclosure will be described in detail with reference to the drawings. Each of the exemplary embodiments described below is only illustrative, and does not limit the present disclosure.

FIG. 1 illustrates a configuration of vehicle 100 of the first exemplary embodiment, and particularly illustrates a configuration relating to an automatic driving vehicle. Vehicle 100 can travel in an automatic driving mode, and includes notification device 2, input device 4, wireless device 8, driving operating unit 10, detector 20, automatic-driving control device 30, and driving assistance device 40. The devices in FIG. 1 may be connected by a dedicated line or wired communication such as a Controller Area Network (CAN). The devices may be connected by wired communication or wireless communication such as a universal serial bus (USB), Ethernet (registered trademark), Wi-Fi (registered trademark), and Bluetooth (registered trademark).

Notification device 2 notifies the occupant of information about traveling of vehicle 100. For example, notification device 2 is a car navigation system, a head-up display, or a center display installed in the vehicle. Notification device 2 may be a display that displays information, like a luminous body such as a light emitting diode (LED) installed around a steering wheel, a pillar, a dashboard, a meter panel, or the like. Notification device 2 may be a speaker that converts information into sound to notify the occupant, or a vibrator provided at a position (for example, a seat of the occupant or a steering wheel) where the occupant can sense the vibration. Notification device 2 may be a combination of these elements.

Input device 4 is a user interface device that receives operation input performed by the occupant. For example, input device 4 is a controller such as a touch panel, a lever, a button, a switch, a joystick, and a volume, a sensor such as a camera that recognizes a gesture in a noncontact manner, a sensor such as a microphone that recognizes sound, and a combination thereof, and input device 4 receives information about the automatic driving of own vehicle input by the occupant. Input device 4 may receive an operation signal for switching between the automatic driving and the manual driving. Input device 4 outputs the received information as the operation signal to driving assistance device 40.

Figure 2:
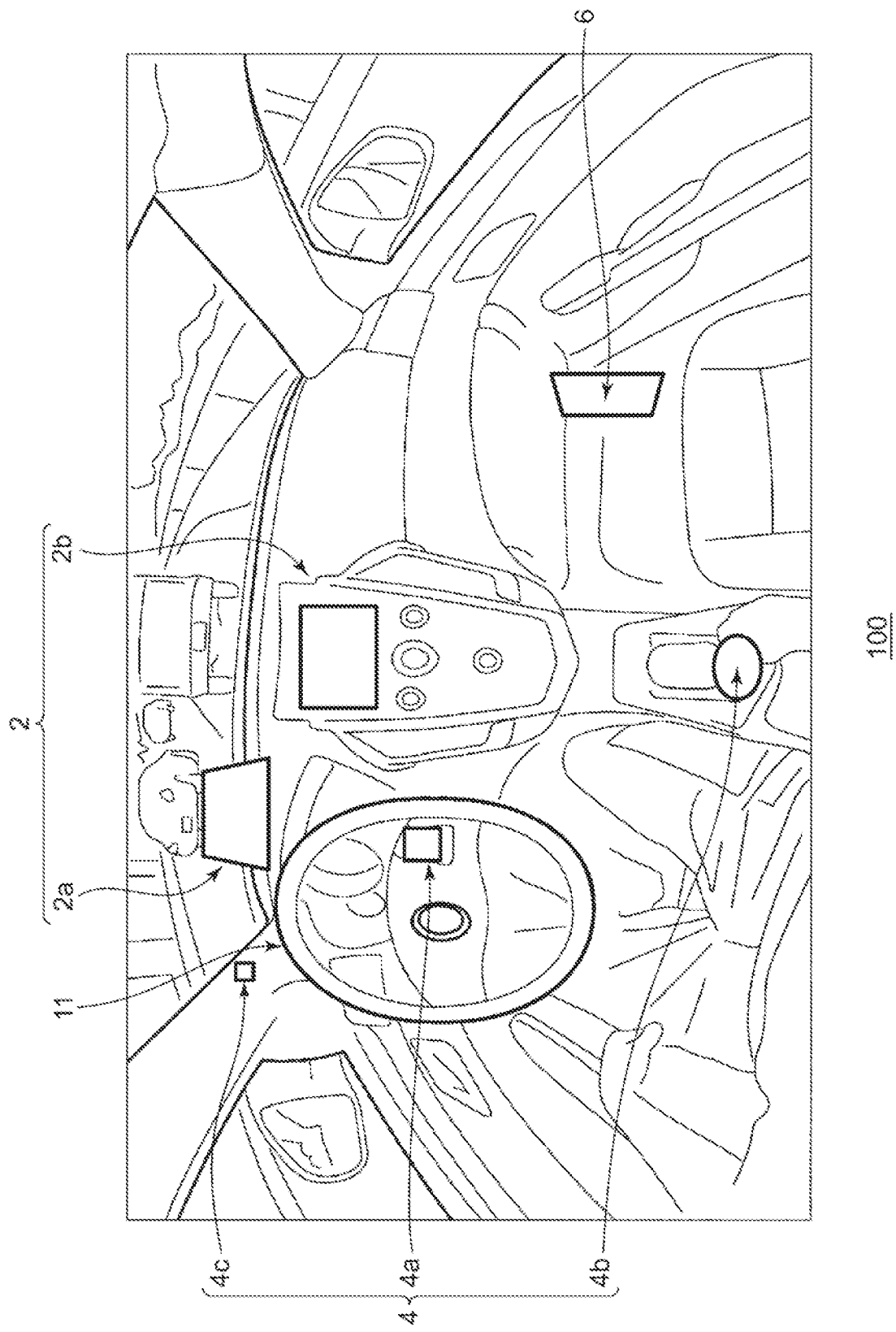
FIG. 2 is a diagram schematically illustrating an interior of the vehicle in FIG. 1.

FIG. 2 schematically illustrates an interior of vehicle 100. Notification device 2 may be head-up display (HUD) 2a or center display 2b. Input device 4 may be first operating unit 4a provided in steering wheel 11, second operating unit 4b provided between a driver seat and a passenger seat, or third operating unit 4c that is a sensor, such as a camera, which recognizes a gesture. Notification device 2 and input device 4 may be integrated with each other. For example, notification device 2 and input device 4 may be mounted as a touch panel display. Speaker 6 that presents sound information about the automatic driving to the occupant may further be provided in vehicle 100. In this case, driving assistance device 40 may display information about the automatic driving on notification device 2, and in addition to it or instead of it, output sound indicating the information about the automatic driving (for example, information about operation of the vehicle in association with acceleration or lane change of the vehicle performed by the automatic-driving control device or information indicating whether a collision possibility to be described later is to be excluded as a determination parameter) from speaker 6. The description returns to FIG. 1.

Wireless device 8 is compatible with a mobile phone communication system, a wireless metropolitan area network (WMAN), or the like, and conducts wireless communication with a data server, an infrastructure, a peripheral vehicle, a pedestrian, or the like. Driving operating unit 10 includes steering wheel 11, brake pedal 12, accelerator pedal 13, and indicator switch 14. Steering wheel 11, brake pedal 12, accelerator pedal 13, and indicator switch 14 can electronically be controlled by a steering wheel electronic control unit (ECU), a brake ECU, an engine ECU, and a motor ECU, and an indicator controller, respectively. In the automatic driving mode, the steering wheel ECU, the brake ECU, the engine ECU, and the motor ECU drive corresponding actuators according to control signals supplied from automatic-driving control device 30. The indicator controller turns on or off an indicator lamp according to the control signal supplied from automatic-driving control device 30.

Detector 20 detects a surrounding situation and a traveling state of vehicle 100. For example, detector 20 detects a speed of vehicle 100, a relative speed of a preceding vehicle with respect to vehicle 100, a distance between vehicle 100 and the preceding vehicle, a relative speed of a vehicle traveling in an adjacent lane with respect to vehicle 100, a distance between vehicle 100 and the vehicle traveling in the adjacent lane, and position information about vehicle 100. Detector 20 outputs detected various pieces of information (hereinafter, referred to as "detection information") to automatic-driving control device 30. Detector 20 may output the detection information to driving assistance device 40 through automatic-driving control device 30, or directly output the detection information to driving assistance device 40. Detector 20 includes position information acquisition unit 21, sensor 22, speed information acquisition unit 23, and map information acquisition unit 24.

Position information acquisition unit 21 acquires a current position of vehicle 100 from a global navigation satellite system (GNSS) receiver. Sensor 22 is a general term for various sensors that detect an outside situation of vehicle 100 and the state of vehicle 100. For example, a camera, a millimeter-wave radar, a light detection and ranging or laser imaging detection and ranging (LIDAR) sensor, a sonar, a temperature sensor, an atmospheric pressure sensor, a humidity sensor, and an illuminance sensor are mounted as the sensor that detects the outside situation of the vehicle. The outside situation of the vehicle includes a situation of a road where the own vehicle travels, which includes lane information, an environment including weather, a surrounding situation of the own vehicle, and a peripheral vehicle (such as a peripheral vehicle traveling in the adjacent lane) present nearby. Any information about the outside of the vehicle that can be detected by sensor 22 may be used. For example, an acceleration sensor, a gyroscope sensor, a geomagnetism sensor, and an inclination sensor are mounted as sensor 22 that detects the state of vehicle 100.

Speed information acquisition unit 23 acquires a current speed of vehicle 100 from a vehicle speed sensor. Map information acquisition unit 24 acquires map information about a region around the current position of vehicle 100 from a map database. The map database may be recorded in a recording medium in vehicle 100, or downloaded from a map server through a network at a time of use. The map information includes information about a road and an intersection.

Automatic-driving control device 30 is an automatic-driving controller having an automatic driving control function, and determines a behavior of vehicle 100 in automatic driving. Automatic-driving control device 30 includes controller 31, storage 32, and input-and-output (I/O) unit 33. A configuration of controller 31 can be implemented by cooperation between a hardware resource and a software resource or only the hardware resource. A processor, a read only memory (ROM), a random access memory (RAM), and other large scale integrations (LSIs) can be used as the hardware resource, and programs such as an operating system, an application, and firmware can be used as the software resource. Storage 32 includes a nonvolatile recording medium such as a flash memory. I/O unit 33 performs communication control according to various communication formats. For example, I/O unit 33 outputs information about the automatic driving to driving assistance device 40, and receives a control command from driving assistance device 40. I/O unit 33 receives the detection information from detector 20.

Controller 31 applies a control command input from driving assistance device 40 and various pieces of information collected from detector 20 or various ECUs to an automatic driving algorithm, and calculates a control value in order to control an automatic control object such as an accelerator throttle opening and a steering wheel angle of vehicle 100. The control of stopping vehicle 100 will be described as an example. Controller 31 calculates time-to-collision (TTC) with the peripheral vehicle as the collision possibility as follows based on the detection information received from detector 20 in the case that the detected obstacle is the peripheral vehicle.

$$TTC=D/(V2-V1)$$

In the above equation, D indicates a vehicle following distance between vehicle 100 and the peripheral vehicle, V1 indicates a speed of vehicle 100, and V2 indicates a speed of the peripheral vehicle. A decrease in TTC indicates that time to the collision is shortened, and corresponds to an increase in the collision possibility.

Figure 11:
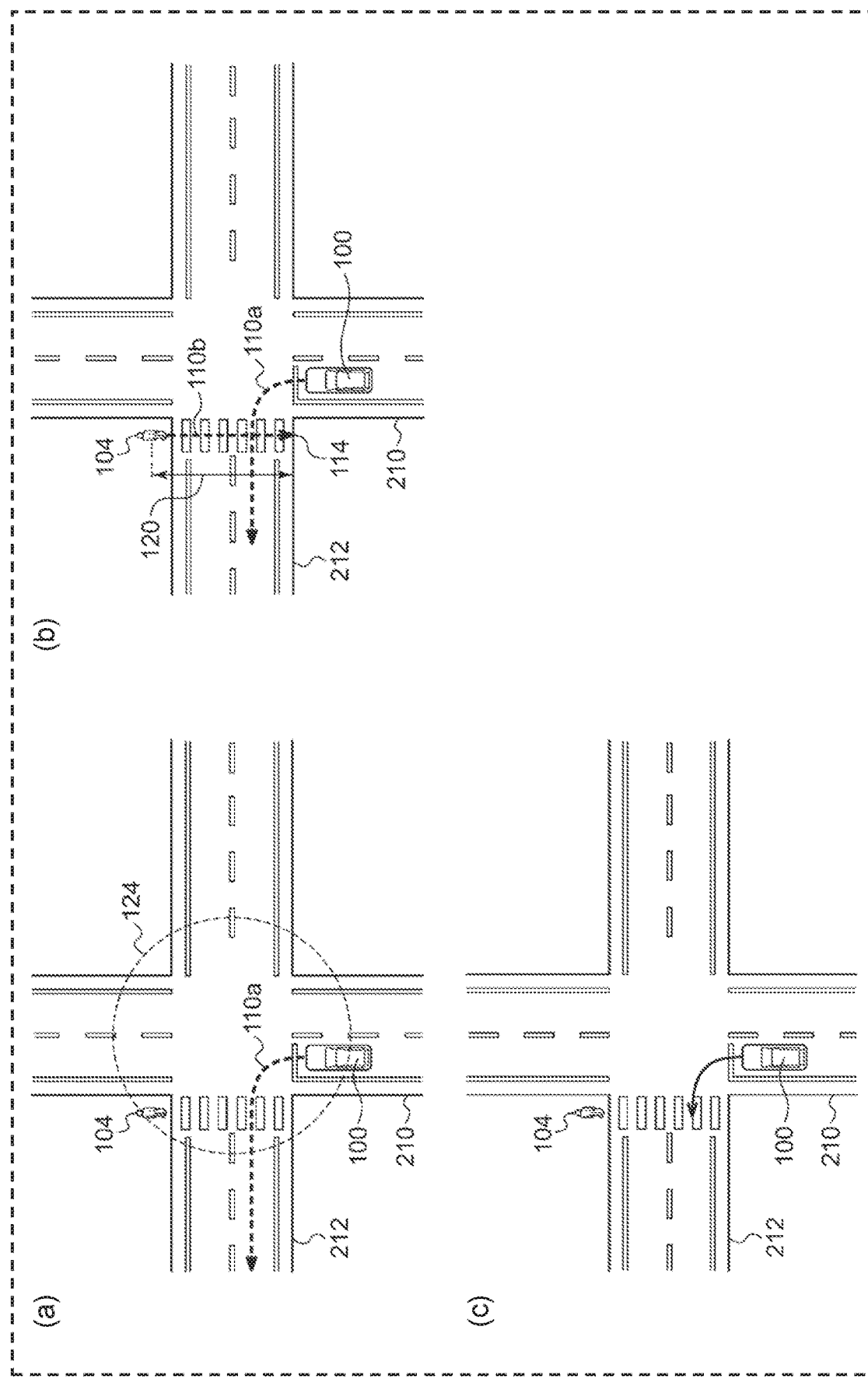
FIG. 11 is a view illustrating a processing outline according to a second exemplary embodiment.

On the other hand, controller 31 calculates the collision possibility according to whether a person exists in an area (hereinafter, referred to as a "monitoring area") that changes according to the driving behavior in an area formed around vehicle 100 based on the detection information received from detector 20 in the case that the obstacle is a person. In this case, the collision possibility decreases in the case that the person does not exist, and the collision possibility increases in the case that the person exists. Irrespective of the obstacle to be either the peripheral vehicle or the person, in the case that the collision possibility is greater than the predetermined value, controller 31 decides the stop of vehicle 100 as automatic driving control of vehicle 100, and calculates a control value in order to stop vehicle 100. That is, controller 31 performs the automatic driving control of vehicle 100 using the collision possibility as the determination object (determination parameter). The predetermined value may be changed according to whether the obstacle is a peripheral vehicle or a person. For a plurality of obstacles, controller 31 decides the stop of vehicle 100 when the possibility of collision with at least one obstacle is greater than the predetermined value. In the first exemplary embodiment, the monitoring area is simplified, and is illustrated by monitoring area 124 (including a predetermined width) surrounding the intersection at which the own vehicle is scheduled to travel as illustrated in FIG. 11. In a case of monitoring area 124 that changes according to the driving behavior, for example, monitoring area 124 may be limited to a portion that includes a scheduled traveling route of the own vehicle, a currently traveling road of the own vehicle, and a post-left-turn traveling road, in the case that the own vehicle performs the left turn at the intersection. Controller 31 transmits the calculated control value to the ECU or the controller of each control object. In the first exemplary embodiment, controller 31 transmits the calculated control value to the steering wheel ECU, the brake ECU, the engine ECU, and the indicator controller. For an electrically driven vehicle or a hybrid car, controller 31 transmits the control value to the motor ECU instead of or in addition to the engine ECU.

Driving assistance device 40 is an HMI controller that executes an interface function between vehicle 100 and the occupant, and includes controller 41, storage unit 42, and I/O unit 43. Controller 41 performs various pieces of data processing such as HMI control. Controller 41 can be implemented by cooperation between the hardware resource and the software resource or only the hardware resource. A processor, a ROM, a RAM, and other LSIs can be used as the hardware resource, and programs such as an operating system, applications, and firmware can be used as the software resource.

Storage 42 is a storage area where data that is referred to or updated by controller 41 is stored. Storage 42 is constructed with a nonvolatile recording medium such as a flash memory. I/O unit 43 performs various kinds of communication control according to various kinds of communication formats. I/O unit 43 includes operation signal input unit 50, image-and-sound output unit 51, detection information input unit 52, command interface (IF) 53, and communication IF 56.

Operation signal input unit 50 receives an operation signal generated by operation executed on input device 4 by the occupant or a user outside the vehicle from input device 4, and outputs the operation signal to controller 41. Image-and-sound output unit 51 outputs image data or a sound message, which is generated by controller 41, to notification device 2, and causes notification device 2 to display the image data or the sound message. Detection information input unit 52 receives the detection information, which is a result of detection processing by detector 20 and indicates a current surrounding situation and a traveling state of vehicle 100, from detector 20, and outputs the received detection information to controller 41.

Command IF 53 performs interface processing with automatic-driving control device 30, and includes behavior information input unit 54 and command output unit 55. Behavior information input unit 54 receives information about the automatic driving of vehicle 100, the information being transmitted from automatic-driving control device 30, and outputs the received information to controller 41. Command output unit 55 receives a control command instructing a mode of the automatic driving to automatic-driving control device 30 from controller 41, and transmits the control command to automatic-driving control device 30.

Communication IF 56 performs interface processing with wireless device 8. Communication IF 56 transmits the data, which is output from controller 41, to wireless device 8, and wireless device 8 transmits the data to an external device. Communication IF 56 receives data transmitted from the external device, the data being transferred by wireless device 8, and outputs the data to controller 41.

In this case, automatic-driving control device 30 and driving assistance device 40 are configured as individual devices. As a modification, automatic-driving control device 30 and driving assistance device 40 may be integrated into one controller as indicated by a broken line in FIG. 1. In other words, one automatic-driving control device may have both the functions of automatic-driving control device 30 and driving assistance device 40 in FIG. 1. Further, automatic-driving control device 30 may be combined with notification device 2, input device 4, and driving assistance device 40 to be configured as a driving assistance system.

Figure 3:
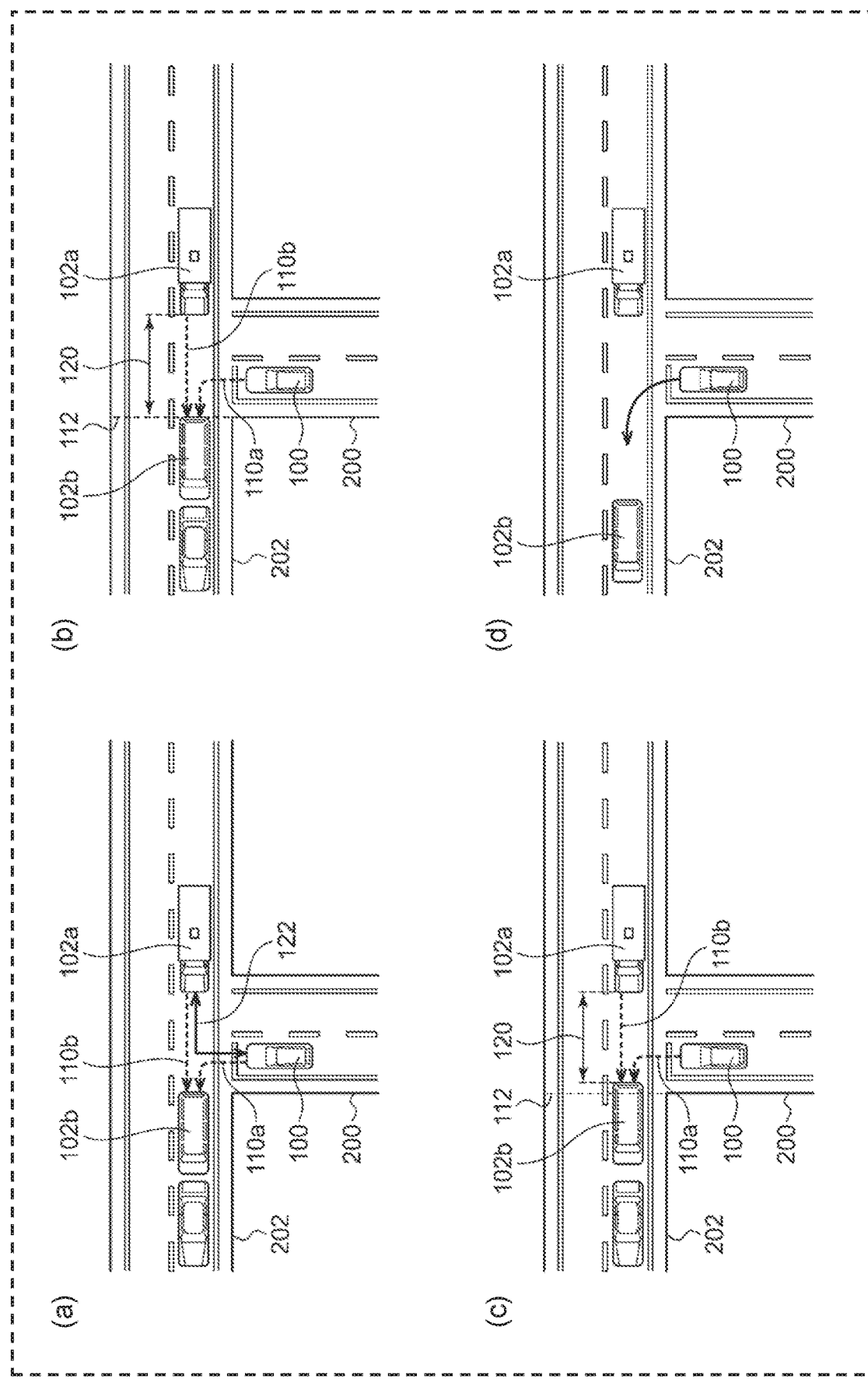
FIG. 3 is a view illustrating a processing outline of the first exemplary embodiment.

The processing of automatic-driving control device 30 will be described before the description of the processing with respect to the driving behavior of the "interruption" performed by driving assistance device 40 FIG. 3 illustrates a processing outline. A part (a) of FIG. 3 illustrates an interruption behavior to occur in the future, the interruption behavior being specified by controller 31 of automatic-driving control device 30. Merging road 200 is a road on which vehicle 100 travels, and vehicle 100 travels upward. On the other hand, merged road 202 is a road to which merging road 200 is merged, and first peripheral vehicle 102a and second peripheral vehicle 102b travel leftward. At this point, first peripheral vehicle 102a travels behind second peripheral vehicle 102b, and travels on merged road 202 before the point at which merging road 200 merges. First route 110a on which vehicle 100 is scheduled to travel is set to go upward on merging road 200, and to turn to the left on merged road 202. For this reason, interruption by vehicle 100 will occur in front of first peripheral vehicle 102a. Controller 31 specifies an interruption behavior as illustrated in the part (a) of FIG. 3 based on the detection information from detector 20. Any known technique only needs to be used for the specification, and the description will be omitted.

Controller 31 calculates TTC for first peripheral vehicle 102a as the collision possibility based on vehicle following distance 122 between vehicle 100 and first peripheral vehicle 102a, the speed of vehicle 100, and the speed of first peripheral vehicle 102a. In the case that the calculated collision possibility is greater than the predetermined value, controller 31 decides a stop behavior. When deciding the stop behavior, controller 31 performs the control of stopping vehicle 100. As a result, vehicle 100 travelling on merging road 200 stops in front of the merging to merged road 202. Controller 31 transmits information indicating the stop behavior to behavior information input unit 54 through I/O unit 33. At this point, or before the transmission of the information, controller 31 transmits information indicating interruption behavior as illustrated in the part (a) of FIG. 3 to behavior information input unit 54. Parts (b) to (d) of FIG. 3 will be described later.

Figure 4:
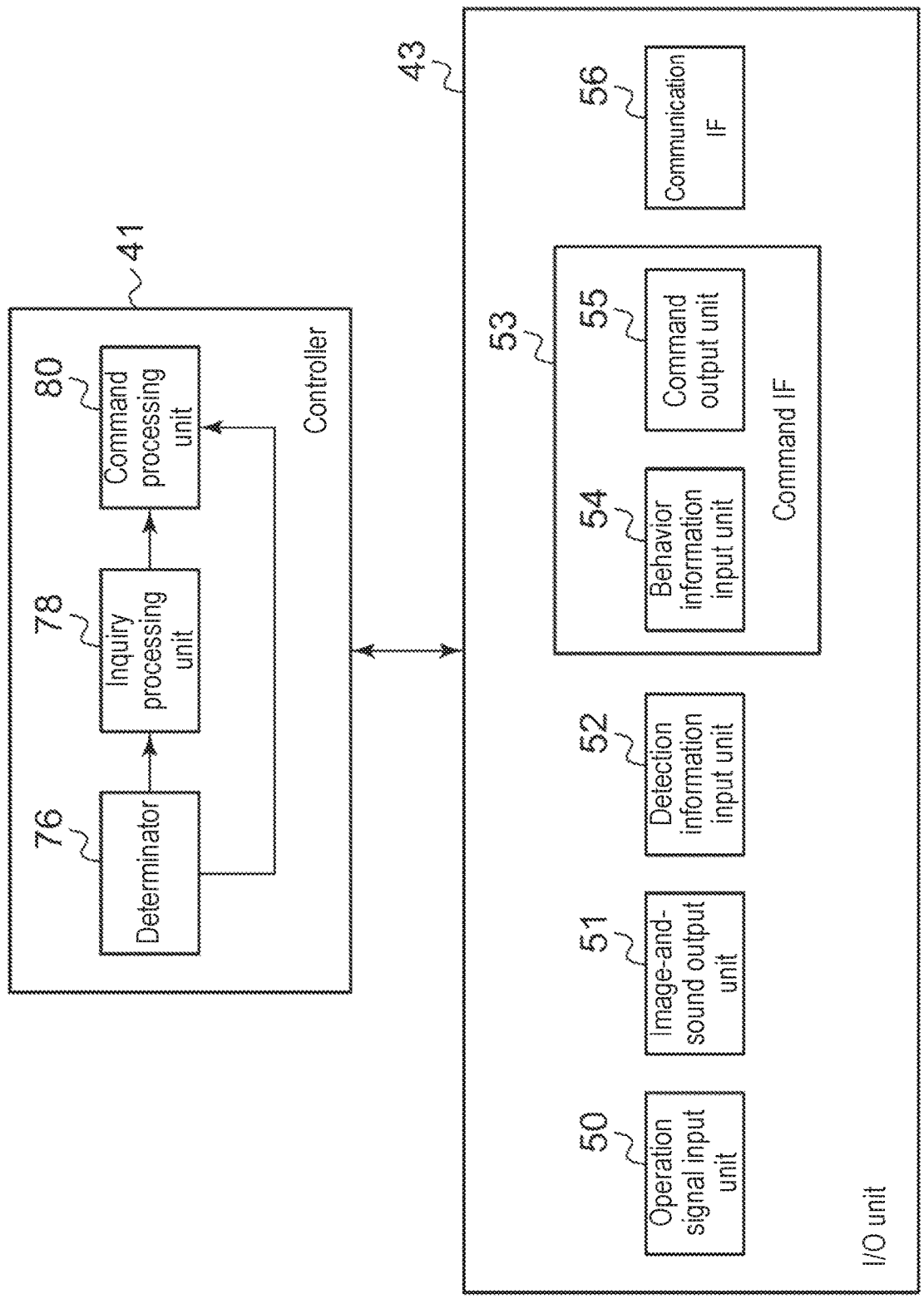
FIG. 4 is a diagram illustrating a configuration of a controller in FIG. 1.

FIG. 4 illustrates a configuration of controller 41. Controller 41 includes determinator 76, inquiry processing unit 78, and command processing unit 80. Behavior information input unit 54 receives the information indicating the interruption behavior as illustrated in the part (a) of FIG. 3 from controller 31. Behavior information input unit 54 also receives the information indicating the stop behavior from controller 31. Behavior information input unit 54 outputs the received pieces of information to controller 41. In the case that behavior information input unit 54 is informed of the stop behavior of the own vehicle, determinator 76 of controller 41 starts the following processing. Determinator 76 grasps the interruption behavior as illustrated in the part (a) of FIG. 3 based on the information indicating the interruption behavior. With no use of the information indicating the interruption behavior, determinator 76 may grasp the interruption behavior based on the detection information similarly to controller 31.

A part (b) of FIG. 3 illustrates the interruption behavior grasped by determinator 76. The part (b) of FIG. 3 illustrates second route 110b (predictive movement route) on which first peripheral vehicle 102a is predicted to travel. Second route 110b is generated based on map information included in the detection information and position information about first peripheral vehicle 102a, and previously decided as going straight to the left on merged road 202. Determinator 76 acquires intersection termination point 112 with respect to merging road 200 on merged road 202 based on the map information included in the detection information. Intersection termination point 112 is a point that first peripheral vehicle 102a that travels on merged road 202 finally reaches in a portion in which merged road 202 and merging road 200 overlap each other in the case that merging road 200 extends so as to pierce merged road 202. For this reason, intersection termination point 112 is set to one point (first point) on second route 110b. The one point may have a predetermined area, and the same holds true for the following exemplary embodiments.

Determinator 76 derives a distance from intersection termination point 112 to first peripheral vehicle 102a as distance for determination 120. Determinator 76 acquires a speed of first peripheral vehicle 102a. Determinator 76 compares the speed of first peripheral vehicle 102a to a second threshold while comparing distance for determination 120 to a first threshold. When distance for determination 120 is shorter than the first threshold, or when the speed of first peripheral vehicle 102a is higher than the second threshold, determinator 76 determines that it is a "first state". The first state corresponds to the case that first peripheral vehicle 102a travels while not giving the way to vehicle 100. On the other hand, when distance for determination 120 is greater than or equal to the first threshold, and the speed of first peripheral vehicle 102a is less than or equal to the second threshold, determinator 76 determines that it is a "second state". The second state corresponds to the case that first peripheral vehicle 102a gives the way to vehicle 100 while stopping or traveling at a speed less than or equal to the second threshold.

As illustrated in a part (c) of FIG. 3, a rearmost portion of second peripheral vehicle 102b is sometimes closer to first peripheral vehicle 102a than intersection termination point 112. In this case, determinator 76 may derive the distance from the rearmost portion of second peripheral vehicle 102b to first peripheral vehicle 102a as distance for determination 120. Determinator 76 may derive the distance between intersection termination point 112 and first peripheral vehicle 102a as distance for determination 120. The pieces of processing subsequent to this processing are similar to those described above, and thus the description will be omitted. The part (d) of FIG. 3 will be described later. The description returns to FIG. 4. Determinator 76 outputs the determination result to inquiry processing unit 78. Determinator 76 also outputs another piece of information to inquiry processing unit 78.

Figure 5:
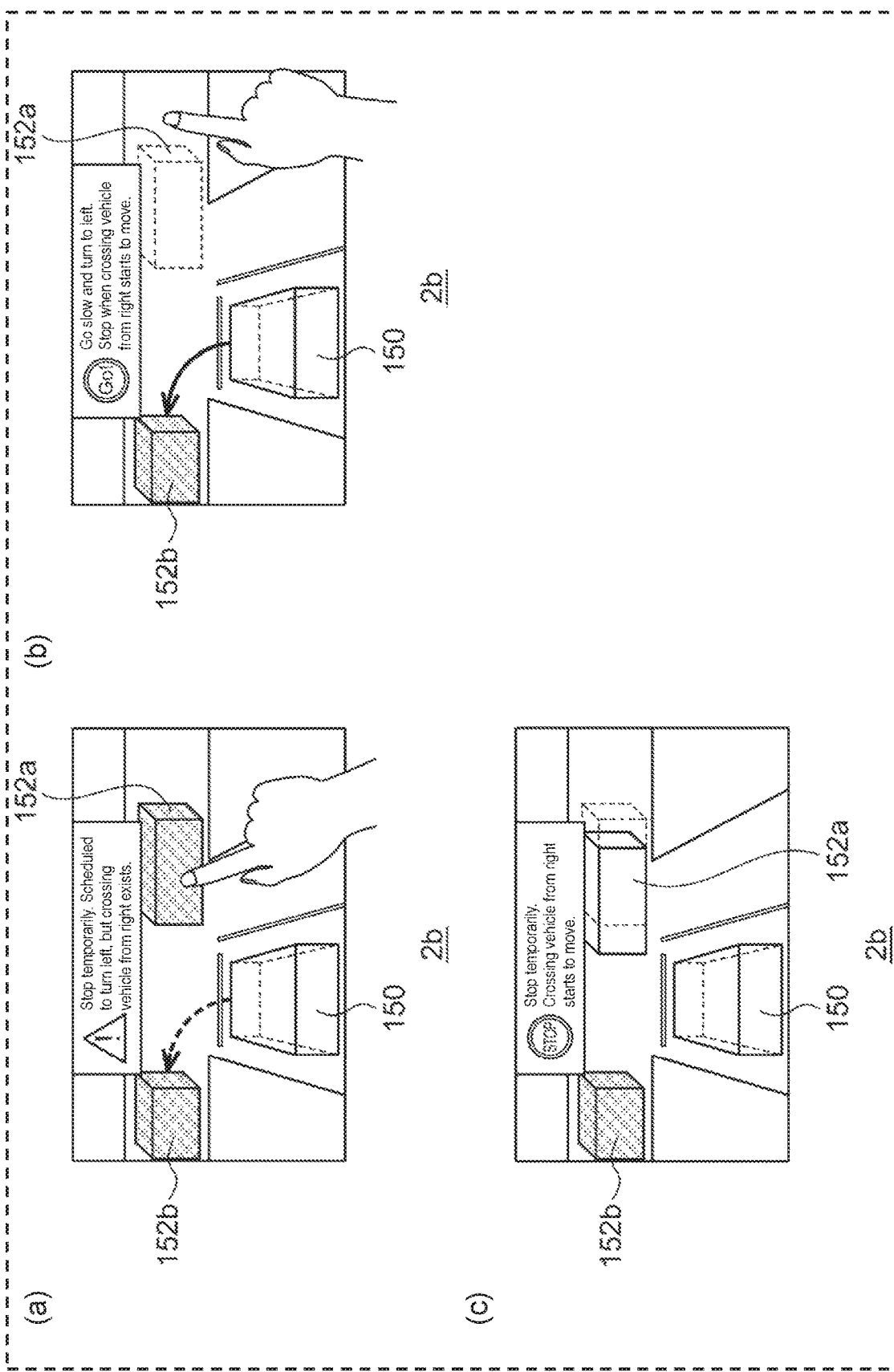
FIG. 5 is a view illustrating an image displayed on a notification device in FIG. 2.

Inquiry processing unit 78 receives the determination result from determinator 76. In the case that the determination result indicates the first state, inquiry processing unit 78 does not perform the processing. On the other hand, in the case that the determination result indicates the second state, inquiry processing unit 78 performs the processing of inquiring of the occupant whether the possibility of the collision between first peripheral vehicle 102a and vehicle 100 is to be excluded from the determination object in automatic-driving control device 30. For this reason, it is said that the case that the determination result indicates the second state satisfies an exclusion condition. The inquiry processing will specifically be described below with reference to FIG. 5. FIG. 5 illustrates the image displayed on notification device 2. A part (a) of FIG. 5 illustrates the image that is generated by inquiry processing unit 78 and displayed on center display 2b through image-and-sound output unit 51. For this reason, it is said that image-and-sound output unit 51 is an inquiry output unit.

Inquiry processing unit 78 generates the image indicating a current situation in which the interruption behavior occurs, namely, a situation in the part (a) of FIG. 3 (first inquiry information) based on another piece of information received from determinator 76. A known technique may be used to generate the image. Own vehicle icon 150 corresponding to vehicle 100, first peripheral vehicle icon 152a corresponding to first peripheral vehicle 102a, and second peripheral vehicle icon 152b corresponding to second peripheral vehicle 102b are illustrated in FIG. 5. Inquiry processing unit 78 may superpose on the image a message to inquire of the occupant whether the possibility of the collision between first peripheral vehicle 102a and vehicle 100 is to be excluded from the determination object of automatic-driving control device 30. An inquiry aspect is not limited to this, but another example will be described later. Parts (b) and (c) of FIG. 5 will be described later. The description returns to FIG. 4.

The occupant checks the image displayed on center display 2b, receives eye contact of mutual concessions from an occupant of first peripheral vehicle 102a, and recognizes the situation in which the interruption can be performed. In the case that the occupant wants to perform the interruption, the occupant performs an action of a finger so as to sweep first peripheral vehicle icon 152a of center display 2b that is a touch panel. The action is not limited to this. The touch panel detects the action, and operation signal input unit 50 in FIG. 1 receives the action. The action corresponds to a response signal for excluding the possibility of the collision between first peripheral vehicle 102a and vehicle 100 from the determination object with respect to the inquiry from image-and-sound output unit 51. When receiving the response signal, operation signal input unit 50 notifies inquiry processing unit 78 of the reception of the response signal. When receiving the notification from operation signal input unit 50, inquiry processing unit 78 instructs command processing unit 80 to generate a command. On the other hand, inquiry processing unit 78 ends the processing in the case that operation signal input unit 50 does not receive the response signal over a period of time since operation signal input unit 50 outputs the inquiry.

In the case that inquiry processing unit 78 instructs command processing unit 80 to generate the command, command processing unit 80 generates the command (first command) to exclude the possibility of the collision between first peripheral vehicle 102a and vehicle 100 from the determination object. Command output unit 55 outputs the command generated by command processing unit 80 to automatic-driving control device 30. When receiving the command, controller 31 of automatic-driving control device 30 calculates the collision possibility as in the past. The calculation of the collision possibility by controller 31, namely, the calculation of the TTC is as described above, so that the description will be omitted. However, controller 31 excludes the possibility of the collision between first peripheral vehicle 102a and vehicle 100 from the determination object, and decides the driving behavior. The part (d) of FIG. 3 illustrates the action of vehicle 100 in the case that the possibility of the collision between first peripheral vehicle 102a and vehicle 100 is excluded from the determination object. In the part (d) of FIG. 3, vehicle 100 travels on merged road 202 by performing the interruption behavior with respect to first peripheral vehicle 102a. The description returns to FIG. 4.

In the case that controller 31 of automatic-driving control device 30 excludes the possibility of the collision between first peripheral vehicle 102a and vehicle 100 from the determination object to perform the automatic driving, controller 31 outputs the performance of the command or the continuous performance of the command as the behavior information to driving assistance device 40. Behavior information input unit 54 of driving assistance device 40 receives the behavior information. When behavior information input unit 54 receives the behavior information, command processing unit 80 generates the image causing the occupant to recognize that the possibility of the collision between first peripheral vehicle 102a and vehicle 100 is excluded from the determination object in automatic-driving control device 30. The part (b) of FIG. 5 illustrates the image displayed on center display 2b in the case that the possibility of the collision between first peripheral vehicle 102a and vehicle 100 is excluded from the determination object in automatic-driving control device 30. As illustrated in the part (b) of FIG. 5, first peripheral vehicle icon 152a changes from the solid line display to the dotted line display. The part (c) of FIG. 5 will be described later. The description returns to FIG. 4.

After command output unit 55 outputs the command, determinator 76 continues the processing to continue the determination of the first state or the second state until the interruption behavior in the part (d) of FIG. 3 is completed. In this case, determinator 76 outputs the determination result to command processing unit 80.

Command processing unit 80 receives the determination result from determinator 76. In the case that the determination result indicates the first state, command processing unit 80 generates the command to instruct automatic-driving control device 30 to include the possibility of the collision between first peripheral vehicle 102a and vehicle 100 in the determination object. This corresponds to the situation in which first peripheral vehicle 102a recognized to give the way to vehicle 100 starts travelling. For this reason, it is said that the case that the determination result indicates the first state satisfies a determination object condition. Command output unit 55 outputs the command generated by command processing unit 80 to automatic-driving control device 30. When receiving the command, controller 31 of automatic-driving control device 30 includes the possibility of the collision between first peripheral vehicle 102a and vehicle 100 in the determination object. Consequently, when the collision possibility exceeds the predetermined value, controller 31 stops vehicle 100.

In the case that controller 31 stops vehicle 100 to notify command processing unit 80 of the stop through behavior information input unit 54, command processing unit 80 generates the image notifying the occupant of the suspension of the interruption. The part (c) of FIG. 5 illustrates the image displayed on center display 2b in the case that the interruption is suspended. As illustrated in the part (c) of FIG. 5, first peripheral vehicle icon 152a changes from a dotted line display to a solid line display, and a message is displayed.

Figure 6:
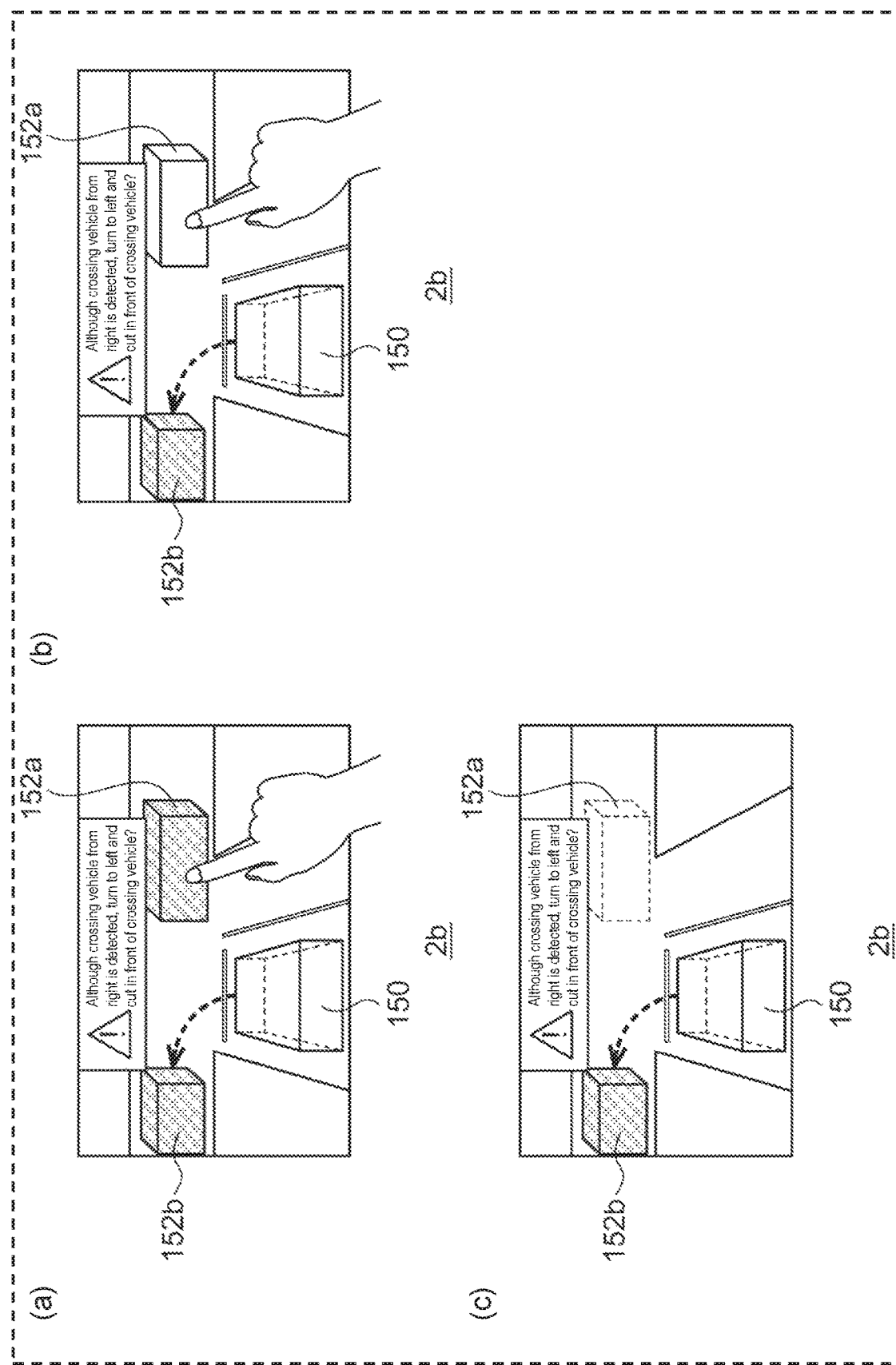
FIG. 6 is a view illustrating a processing outline performed by an inquiry processing unit in FIG. 4.

Another example of the inquiry and the response in inquiry processing unit 78 will be described below together with the detail of a human interface. FIG. 6 illustrates a processing outline performed by inquiry processing unit 78. In FIG. 6, the display performed by center display 2b and the response operation in the touch panel are performed in the same manner as before.

A part (a) of FIG. 6 illustrates the image displayed by inquiry processing unit 78. As described above, own vehicle icon 150, first peripheral vehicle icon 152a, and second peripheral vehicle icon 152b are displayed, and the message is also displayed. A route on which own vehicle icon 150 should travel for the interruption behavior is displayed by an arrow. This corresponds to first route 110a. The occupant recognizes the situation in which the interruption can be performed by checking the image displayed on center display 2b. When wanting to perform the interruption in front of first peripheral vehicle 102a corresponding to first peripheral vehicle icon 152a, the occupant selects first peripheral vehicle icon 152a by the finger.

A part (b) of FIG. 6 illustrates processing subsequent to the processing in the part (a) of FIG. 6. After the selection of first peripheral vehicle icon 152a, the occupant moves a finger so as to sweep first peripheral vehicle icon 152a. As described above, this corresponds to the input of the response operation. The occupant is notified of the input of the response operation by change in display color of first peripheral vehicle icon 152a. A part (c) of FIG. 6 illustrates processing subsequent to the processing in the part (b) of FIG. 6. After the input of the response operation, in the case that the possibility of the collision with first peripheral vehicle 102a corresponding to first peripheral vehicle icon 152a is excluded from the determination object in automatic-driving control device 30, first peripheral vehicle icon 152a changes from the solid line display to the dotted line display in the image displayed on center display 2b.

Figure 7:
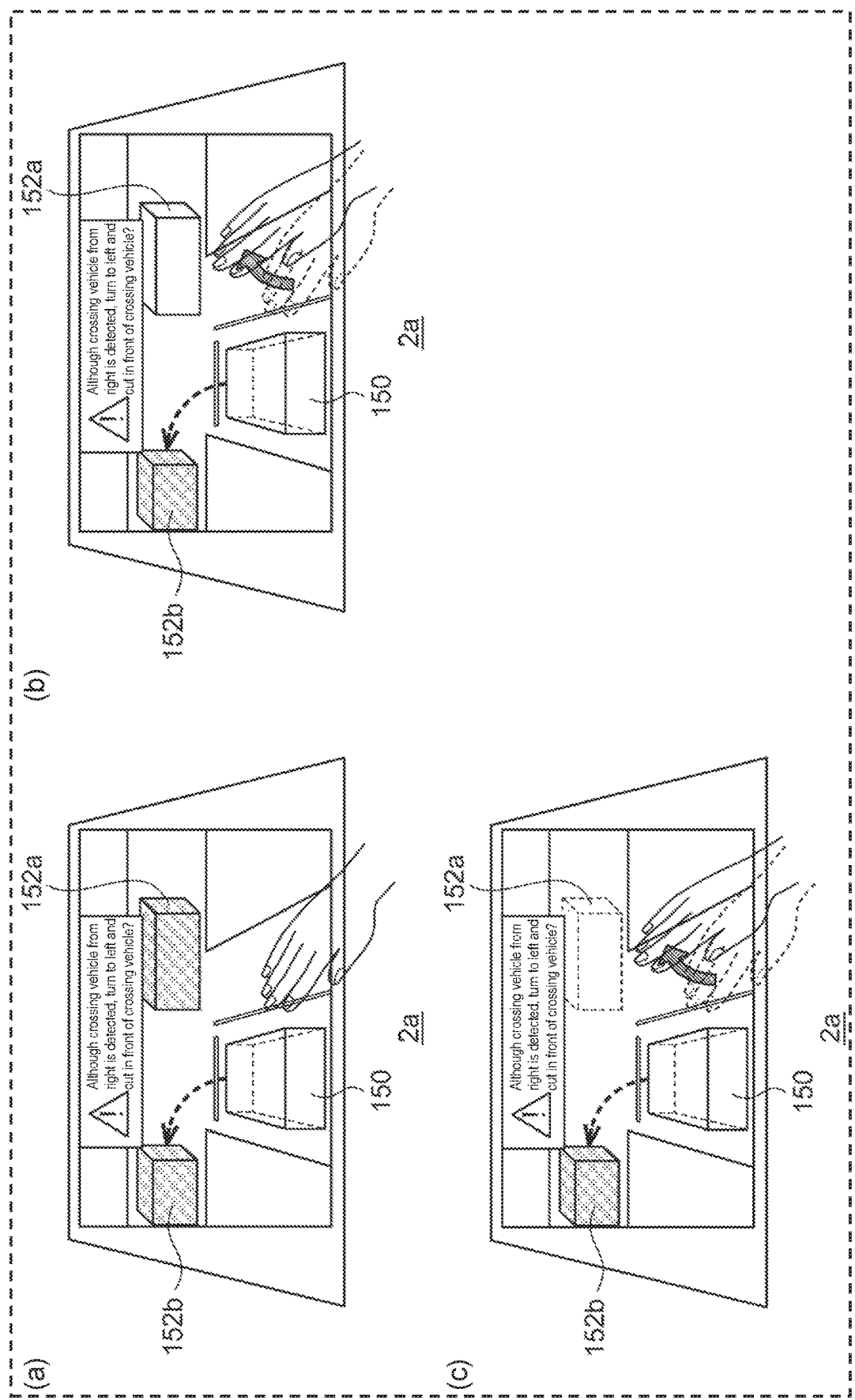
FIG. 7 is a view illustrating another processing outline performed by the inquiry processing unit in FIG. 4.

FIG. 7 is a view illustrating another processing outline performed by inquiry processing unit 78. In FIG. 7, the display is performed by head-up display 2a, and the response operation is performed by the gesture. A part (a) of FIG. 7 illustrates an image displayed by inquiry processing unit 78. The image is illustrated similarly to the part (a) of FIG. 6. The occupant recognizes the situation in which the interruption can be performed by checking the image displayed on head-up display 2a. When wanting to perform the interruption in front of first peripheral vehicle 102a corresponding to first peripheral vehicle icon 152a, the occupant shades third operating unit 4c (not illustrated) with occupant's hand.

A part (b) of FIG. 7 illustrates processing subsequent to the processing in the part (a) of FIG. 7. After shading third operating unit 4c with the hand, the occupant moves the hand so as to sweep first peripheral vehicle icon 152a. Third operating unit 4c detects the gesture of the sweep of the hand. Any known technique only needs to be used for the detection of the gesture, and the description will be omitted. This corresponds to the input of the response operation. The occupant is notified of the input of the response operation by change in display color of first peripheral vehicle icon 152a. A part (c) of FIG. 7 illustrates processing subsequent to the processing in the part (b) of FIG. 7. After the input of the response operation, in the case that the possibility of the collision with first peripheral vehicle 102a corresponding to first peripheral vehicle icon 152a is excluded from the determination object in automatic-driving control device 30, first peripheral vehicle icon 152a changes from the solid line display to the dotted line display in the image displayed on head-up display 2a.

Figure 8:
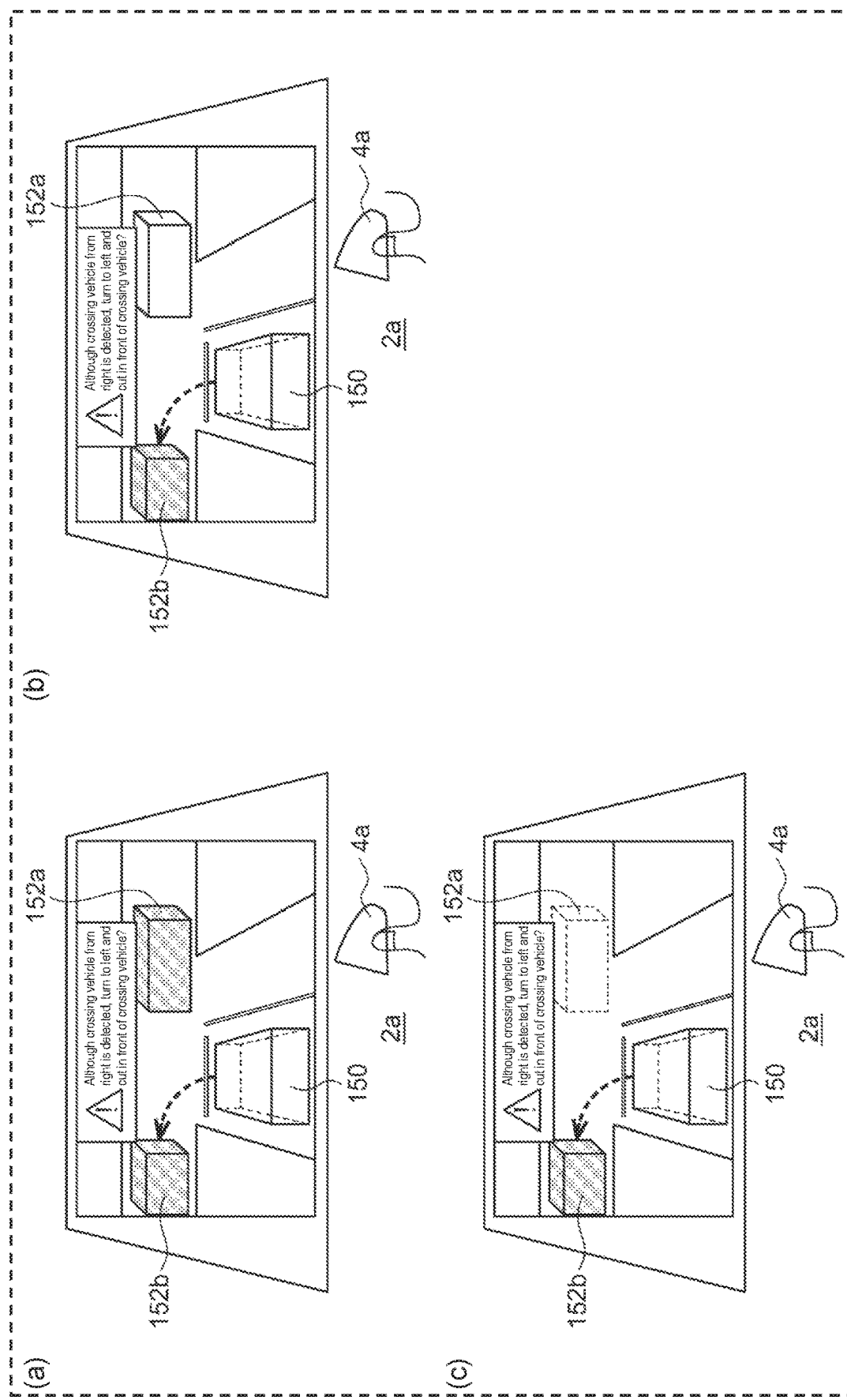
FIG. 8 is a view illustrating still another processing outline performed by the inquiry processing unit in FIG. 4.

FIG. 8 is a view illustrating still another processing outline performed by inquiry processing unit 78. In FIG. 8, the display is performed by head-up display 2a, and the response operation is performed by pressing down of a button. A part (a) of FIG. 8 illustrates the image displayed by inquiry processing unit 78. The image is illustrated similarly to the part (a) of FIG. 7. When wanting to perform the interruption in front of first peripheral vehicle 102a corresponding to first peripheral vehicle icon 152a, the occupant puts a finger on or lightly presses first operating unit 4a.

A part (b) of FIG. 8 illustrates processing subsequent to the processing in the part (a) of FIG. 8. After putting the finger on first operating unit 4a, the occupant presses down or strongly depresses first operating unit 4a. Step in the part (a) of FIG. 8 may be omitted. This corresponds to the input of the response operation. The occupant is notified of the input of the response operation by change in display color of first peripheral vehicle icon 152a. A part (c) of FIG. 8 illustrates processing subsequent to the processing in the part (b) of FIG. 8. After the input of the response operation, in the case that the possibility of the collision with first peripheral vehicle 102a corresponding to first peripheral vehicle icon 152a is excluded from the determination object in automatic-driving control device 30, first peripheral vehicle icon 152a changes from the solid line display to the dotted line display in the image displayed on head-up display 2a.

Figure 9:
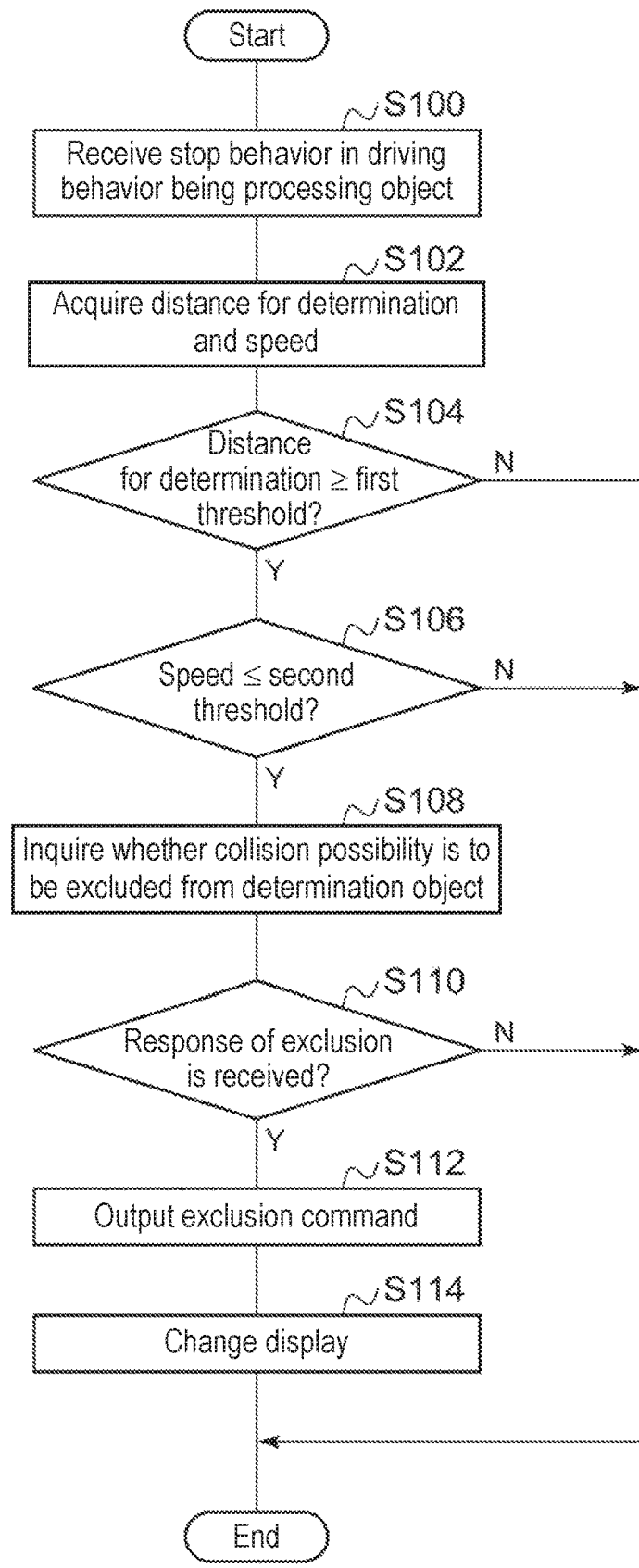
FIG. 9 is a flowchart illustrating an instruction procedure by a controller in FIG. 4.

Action of driving assistance device 40 having the above configuration will be described. FIG. 9 is a flowchart illustrating an instruction procedure by controller 41. Behavior information input unit 54 receives the stop behavior in the driving behavior being a processing object (S100). Determinator 76 acquires distance for determination 120 and the speed with respect to the obstacle (S102). When distance for determination 120 is greater than or equal to the first threshold (Y in S104), and the speed is less than or equal to the second threshold (Y in S106), inquiry processing unit 78 inquires whether the collision possibility is to be excluded from the determination object through image-and-sound output unit 51 (S108). When inquiry processing unit 78 receives the response signal of the exclusion through operation signal input unit 50 (Y in S110), command processing unit 80 outputs an exclusion command through command output unit 55 (S112). Subsequently, command processing unit 80 changes the display (S114). When distance for determination 120 is less than the first threshold (N in S104), when the speed is greater than the second threshold (N in S106), or when inquiry processing unit 78 does not receive the response signal of the exclusion through operation signal input unit 50 (N in S110), the processing is ended.

Figure 10:
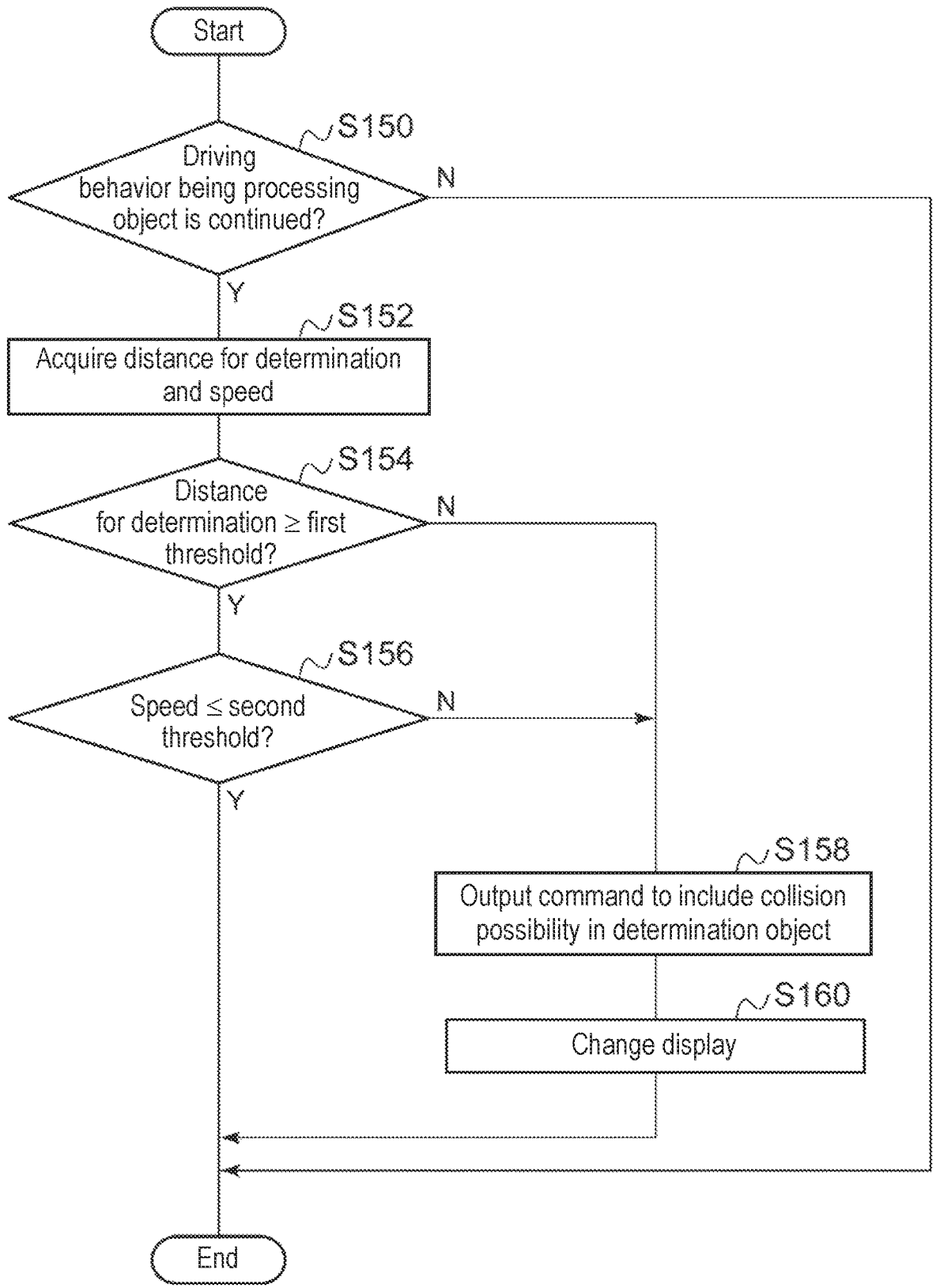
FIG. 10 is a flowchart illustrating another instruction procedure by the controller in FIG. 4.

FIG. 10 is a flowchart illustrating another instruction procedure by controller 41. FIG. 10 illustrates the processing after command processing unit 80 outputs the exclusion command through command output unit 55 and automatic-driving control device 30 excludes the possibility of the collision with the obstacle from the determination object in step 112 of FIG. 9. When automatic-driving control device 30 currently continues the driving behavior being a processing object (Y in S150), determinator 76 acquires distance for determination 120 and the speed with respect to the obstacle (S152). When distance for determination 120 is greater than or equal to the first threshold (Y in S154), and the speed is less than or equal to the second threshold (Y in S156), the processing is ended. When distance for determination 120 is less than first threshold (N in S154), or when the speed is greater than the second threshold (N in S156), command processing unit 80 outputs the command to include the collision possibility in the determination object through command output unit 55 (S158). Command processing unit 80 changes the display (S160). When automatic-driving control device 30 does not continue the driving behavior being a processing object (N in S150), the processing is ended.

In the first exemplary embodiment, when the distance to the peripheral vehicle is greater than or equal to the first threshold, and the speed of the peripheral vehicle is less than or equal to the second threshold, whether the possibility of the collision with the peripheral vehicle is to be excluded from the determination object is inquired. Thus, a will of the occupant can be checked, information acquired by visual observation of the occupant can be reflected in the driving behavior, and the driving can more smoothly be performed. When the response signal for excluding the possibility of the collision with the peripheral vehicle from the determination object is obtained in response to the inquiry, the instruction to exclude the possibility of the collision with the peripheral vehicle from the determination object is issued, so that the vehicle can interrupt the peripheral vehicle that gives the way to the vehicle. When the distance to the peripheral vehicle is greater than or equal to the first threshold, and the speed of the peripheral vehicle is less than or equal to the second threshold, whether the possibility of the collision with the peripheral vehicle is to be excluded from the determination object is inquired, so that the eye contact can be performed irrespective of the automatic driving. The instruction that the possibility of the collision with the peripheral vehicle is to be excluded from the determination object is issued by the combination of the inquiry and the response signal, so that the vehicle can travel according to the situation even if the peripheral vehicle exists during the interruption.

The determination is continued even after the possibility of the collision with the peripheral vehicle is excluded from the determination object, and the possibility of the collision with the peripheral vehicle is included in the determination object when the distance to the peripheral vehicle falls below the first threshold (less than the first threshold), or when the speed of the peripheral vehicle exceeds the second threshold. Thus, the occurrence of the collision with the peripheral vehicle can be prevented. The inquiry to the occupant is not made in including the possibility of the collision with the peripheral vehicle in the determination object, so that a period in which the possibility of the collision with the peripheral vehicle is included in the determination object can be shortened. The determination for the first threshold and the second threshold may be less than, less than or equal to, greater than or equal to, or greater than the first threshold and the second threshold according to the value.

Second Exemplary Embodiment

A second exemplary embodiment relates to a driving assistance device to be installed in the vehicle that performs the automatic driving based on the detected obstacle similarly to the first exemplary embodiment. The second exemplary embodiment focuses on the "left turn" as the driving behavior. For example, the left turn occurs at the intersection. The vehicle travels on a first road, and the automatic-driving control device calculates the possibility of the collision with a person who exists on a pedestrian crossing, which is provided for crossing a second road after the left turn, in front of the intersection intersecting the second road. When the collision possibility is greater than a predetermined value, the automatic-driving control device stops the vehicle in front of the intersection. In such a situation, the vehicle can turn to the left in the case that a person who tries to walk the pedestrian crossing stops in front of the pedestrian crossing to give the way to the vehicle.

The driving assistance device of the second exemplary embodiment performs the following processing in order to enable the left turn in such a situation. The driving assistance device is informed by automatic-driving control device of the driving behavior of the "stop" that occurs during the driving behavior of the "left turn". The driving assistance device specifies a crossing termination point of the second road from the map information, and derives the distance between the crossing termination point and the person as the determination distance. The driving assistance device acquires the speed of the person. When the determination distance is greater than or equal to a first threshold, and the speed is less than or equal to a second threshold, the driving assistance device generates an image in order to inquire of the occupant whether the possibility of the collision between the person and the vehicle is to be excluded from the determination object in the automatic-driving control device, and displays the image on a monitor in the vehicle. When receiving a response operation to exclude the collision possibility from the occupant with respect to the display, the driving assistance device generates a command to exclude the possibility of the collision between the person and the vehicle from the determination object, and transmits the command to the automatic-driving control device. When receiving the command from the driving assistance device, the automatic-driving control device excludes the possibility of the collision between the person and the vehicle from the determination object, and starts the own vehicle when the collision possibility is less than the predetermined value. Vehicle 100 of the second exemplary embodiment is of a type similar to that in FIGS. 1 and 2, and controller 41 is of a type similar to that in FIG. 4. A difference from the first exemplary embodiment will mainly be described below.

The processing of automatic-driving control device 30 will be described before the description of the processing with respect to the driving behavior of the "left turn" performed by driving assistance device 40. FIG. 11 illustrates a processing outline. A part (a) of FIG. 11 illustrates the left-turn behavior to occur in the future, the left-turn behavior being specified by controller 31 of automatic-driving control device 30. First road 210 has a running direction in a vertical direction, second road 212 has a running direction in a horizontal direction, and first road 210 and second road 212 intersect at the intersection. First route 110a on which vehicle 100 is scheduled to travel is set to go upward on first road 210, to turn to the left at the intersection, and to enter second road 212. Person 104 exists on the pedestrian crossing provided for crossing second road 212 after the left turn. It is assumed that person 104 is scheduled to cross the pedestrian crossing of second road 212. Controller 31 specifies a left-turn behavior as illustrated in the part (a) of FIG. 11 based on the detection information from detector 20. Any known technique only needs to be used for the specification, and the description will be omitted.

Controller 31 sets monitoring area 124 surrounding the intersection to which vehicle 100 comes close based on the map information and the position information about vehicle 100. At this point, monitoring area 124 has a circular shape. However, monitoring area 124 is not limited to the circular shape. Controller 31 determines whether person 104 is included in monitoring area 124 as the collision possibility based on monitoring area 124 and the position information about person 104. For example, controller 31 calculates the collision possibility greater than the predetermined value when person 104 is included in monitoring area 124, and controller 31 calculates the collision possibility less than or equal to the predetermined value when person 104 is not included in monitoring area 124. In the case that the calculated collision possibility is greater than the predetermined value, controller 31 decides the stop behavior. When deciding the stop behavior, controller 31 performs the control of stopping vehicle 100. As a result, vehicle 100 travelling on first road 210 stops in front of the intersection. Controller 31 transmits information indicating the stop behavior to behavior information input unit 54 through I/O unit 33. At this point, or before the transmission of the information, controller 31 transmits information indicating the left-turn behavior as illustrated in the part (a) of FIG. 11 to behavior information input unit 54. Parts (b) and (c) of FIG. 11 will be described later.

Behavior information input unit 54 in FIG. 4 receives the information indicating the left-turn behavior as illustrated in the part (a) of FIG. 11 from controller 31. Behavior information input unit 54 also receives the information indicating the stop behavior from controller 31. Behavior information input unit 54 outputs the received pieces of information to controller 41. In the case that behavior information input unit 54 is informed of the stop behavior of the own vehicle, determinator 76 of controller 41 starts the following processing. Determinator 76 grasps the left-turn behavior as illustrated in the part (a) of FIG. 11 based on the information indicating the left-turn behavior. As described above, with no use of the information indicating the left-turn behavior, determinator 76 may grasp the left-turn behavior based on the detection information similarly to controller 31.

The part (b) of FIG. 11 illustrates the left-turn behavior grasped by determinator 76. The part (b) of FIG. 11 illustrates second route 110b on which person 104 is predicted to walk. Second route 110b is generated based on the map information included in the detection information and the position information about person 104, and previously decided as crossing the pedestrian crossing to cross second road 212. Determinator 76 acquires crossing termination point 114 of second road 212 based on the map information included in the detection information. Crossing termination point 114 is a point at which person 104 walks on the pedestrian crossing from a position where person 104 exists and ends the crossing. For this reason, crossing termination point 114 is set to one point on second route 110b.

Determinator 76 derives the distance from crossing termination point 114 to person 104 as distance for determination 120. Determinator 76 acquires the speed of person 104. When distance for determination 120 is shorter than the first threshold, or when the speed of person 104 is higher than the second threshold, determinator 76 determines that it is the "first state". The first state corresponds to the case that person 104 walks while not giving the way to vehicle 100. On the other hand, when distance for determination 120 is greater than or equal to the first threshold, and the speed of person 104 is less than or equal to the second threshold, determinator 76 determines that it is the "second state". The second state corresponds to the case that person 104 gives the way to vehicle 100 while stopping or walking at a speed less than or equal to a fourth threshold. The part (c) of FIG. 11 will be described later. The description returns to FIG. 4. Determinator 76 outputs the determination result to inquiry processing unit 78. Determinator 76 also outputs another piece of information to inquiry processing unit 78.

Figure 12:
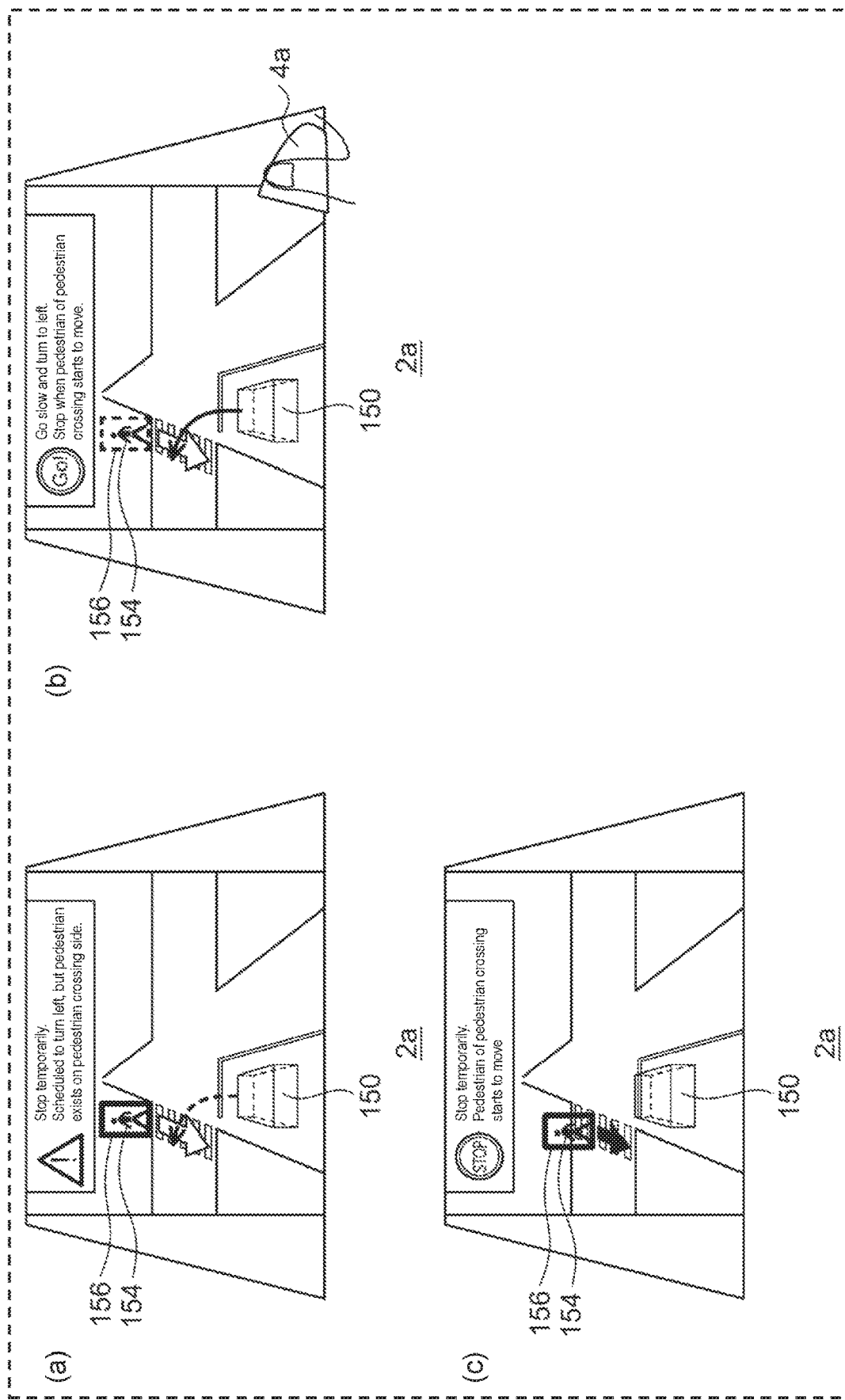
FIG. 12 is a view illustrating an image displayed on a notification device according to the second exemplary embodiment.

In the case that the determination result from determinator 76 indicates the second state, inquiry processing unit 78 performs the processing of inquiring of the occupant whether the possibility of the collision between person 104 and vehicle 100 is to be excluded from the determination object in automatic-driving control device 30. The inquiry processing will specifically be described below with reference to FIG. 12. FIG. 12 illustrates the image displayed on notification device 2. A part (a) of FIG. 12 illustrates the image that is generated by inquiry processing unit 78 and displayed on head-up display 2a through image-and-sound output unit 51.

Inquiry processing unit 78 generates the image indicating the current situation in which the left-turn behavior occurs, namely, the situation illustrated in the part (a) of FIG. 11 based on another piece of information received from determinator 76. In this case, own vehicle icon 150 corresponding to vehicle 100, person icon 154 corresponding to person 104, and rectangular obstacle icon 156 surrounding person icon 154 are illustrated. Inquiry processing unit 78 may superpose on the image a message to inquire of the occupant whether the possibility of the collision between person 104 and vehicle 100 is to be excluded from the determination object of automatic-driving control device 30. Various aspects may be used as the inquiry aspect. Parts (b) and (c) of FIG. 12 will be described later. The description returns to FIG. 4.

The occupant checks the image displayed on head-up display 2a, receives the will of mutual concessions from the person, and recognizes the situation in which the left turn can be performed. When wanting to perform the left turn, the occupant presses down first operating unit 4a. The action is not limited to this. Operation signal input unit 50 in FIG. 1 receives this action. The action corresponds to a response signal for excluding the possibility of the collision between person 104 and vehicle 100 from the determination object with respect to the inquiry from image-and-sound output unit 51. When receiving the response signal, operation signal input unit 50 notifies inquiry processing unit 78 of the reception of the response signal. When receiving the notification, inquiry processing unit 78 instructs command processing unit 80 to generate a command.

In the case that inquiry processing unit 78 instructs command processing unit 80 to generate the command, command processing unit 80 generates the command to exclude the possibility of the collision between person 104 and vehicle 100 from the determination object. Command output unit 55 outputs the command generated by command processing unit 80 to automatic-driving control device 30. When receiving the command, controller 31 of automatic-driving control device 30 calculates the collision possibility as in the past. However, controller 31 excludes the possibility of the collision between person 104 and vehicle 100 from the determination object, and decides the driving behavior. The part (c) of FIG. 11 illustrates the action of vehicle 100 in the case that the possibility of the collision between person 104 and vehicle 100 is excluded from the determination object. In the part (c) of FIG. 11, vehicle 100 turns to the left from first road 210 and travels on second road 212. The description returns to FIG. 4.

In the case that controller 31 of automatic-driving control device 30 excludes the possibility of the collision between person 104 and vehicle 100 from the determination object to perform the automatic driving, controller 31 outputs the performance of the command or the continuous performance of the command as the behavior information to driving assistance device 40. When behavior information input unit 54 receives the behavior information, command processing unit 80 generates the image causing the occupant to recognize that the possibility of the collision between person 104 and vehicle 100 is excluded from the determination object in automatic-driving control device 30. The part (b) of FIG. 12 illustrates the image displayed on head-up display 2a in the case that the possibility of the collision between person 104 and vehicle 100 is excluded from the determination object in automatic-driving control device 30. As illustrated in the part (b) of FIG. 12, obstacle icon 156 surrounding person icon 154 changes from the solid line display to the dotted line display. The part (c) of FIG. 12 will be described later. The description returns to FIG. 4.

After command output unit 55 outputs the command, determinator 76 continues the determination of the first state or the second state until the left-turn behavior in the part (c) of FIG. 11 is completed. In the case that the determination result indicates the first state, command processing unit 80 generates the command to instruct automatic-driving control device 30 to include the possibility of the collision between person 104 and vehicle 100 in the determination object. This corresponds to the situation in which person 104 recognized to give the way to vehicle 100 starts walking. Command output unit 55 outputs the command generated by command processing unit 80 to automatic-driving control device 30. When receiving the command, controller 31 of automatic-driving control device 30 includes the possibility of the collision between person 104 and vehicle 100 in the determination object. Consequently, when the collision possibility exceeds the predetermined value, controller 31 stops vehicle 100.

In the case that controller 31 stops vehicle 100 to notify command processing unit 80 of the stop through behavior information input unit 54, command processing unit 80 generates the image notifying the occupant of the suspension of the left turn. The part (c) of FIG. 12 illustrates the image displayed on head-up display 2a in the case that the left turn is suspended. As illustrated in the part (c) of FIG. 12, obstacle icon 156 surrounding person icon 154 changes from the dotted line display to the solid line display, and the message is displayed.

Figure 13:
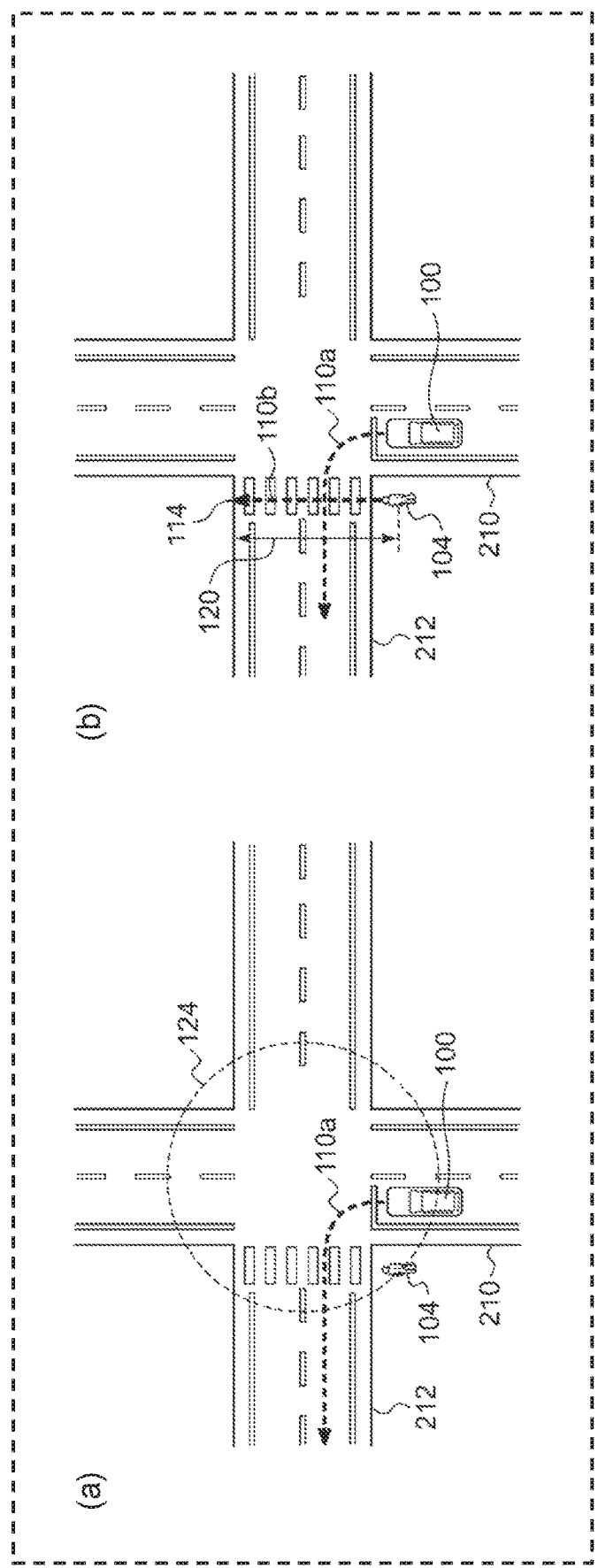
FIG. 13 is a view illustrating another processing outline of a controller of the second exemplary embodiment.

The case that person 104 may move downward is described above as illustrated in the part (b) of FIG. 11. The case that person 104 may move in a reverse direction will be described below. FIG. 13 illustrates another processing outline performed by controller 41. A part (a) of FIG. 13 illustrates the left-turn behavior to occur in the future, the left-turn behavior being specified by controller 31 of automatic-driving control device 30. Person 104 existing at the pedestrian crossing provided for crossing second road 212 is on the opposite side compared to the part (a) of FIG. 11 with respect to second road 212. Even in this case, controller 31 determines whether person 104 is included in monitoring area 124 as the collision possibility.

The part (b) of FIG. 13 illustrates second route 110b on which person 104 is predicted to walk. The direction of second route 110b is opposite to the direction in the part (b) of FIG. 11. For this reason, crossing termination point 114 is disposed at a position different from the position in the part (b) of FIG. 11, specifically on the opposite side with respect to second road 212. Determinator 76 derives the distance from crossing termination point 114 to person 104 as distance for determination 120. The pieces of processing subsequent to this processing are similar to those described above, and thus the description will be omitted.

The processing in the case of the combination of the part (b) of FIG. 11 and the part (b) of FIG. 13 will be described below. FIG. 14 illustrates another processing outline according to the second exemplary embodiment. In a part (a) of FIG. 14, first person 104a and second person 104b exist with the pedestrian crossing interposed therebetween. First person 104a moves downward along first person route 111a similarly to the part (b) of FIG. 11, and second person 104b moves upward along second person route 111b similarly to the part (b) of FIG. 13. At this point, first person route 111a and second person route 111b correspond to second route 110*b* mentioned earlier. In this case, the processing described above for first person 104*a* and the processing described above for second person 104*b* are separately performed.

A part (b) of FIG. 14 illustrates another image displayed on notification device 2. The part (b) of FIG. 14 illustrates the image displayed on center display 2*b* in the situation similar to that in the part (c) of FIG. 12. Own vehicle icon 150 corresponding to vehicle 100, first person icon 154*a* corresponding to first person 104*a*, and first obstacle icon 156*a* surrounding first person icon 154*a* are illustrated. Second person icon 154*b* corresponding to second person 104*b* and rectangular second obstacle icon 156*b* surrounding second person icon 154*b* are also illustrated. At this point, because the possibility of the collision with first person 104*a* is excluded from the determination object in automatic-driving control device 30, first obstacle icon 156*a* is displayed by the dotted line. On the other hand, for example, in the case that second person 104*b* invades into an intersection area from an end on the opposite side while first person 104*a* is excluded, because the possibility of the collision with second person 104*b* is included in the determination object in automatic-driving control device 30, second obstacle icon 156*b* is displayed by the solid line. In this case, because the possibility of the collision with second person 104*b* is greater than the predetermined value, vehicle 100 does not turn to the left, but stops.

In the second exemplary embodiment, when the distance to the person is greater than or equal to the first threshold, and the speed of the person is less than or equal to the second threshold, whether the possibility of the collision with the person is to be excluded from the determination object is inquired, so that the will of the occupant can be checked. When the response signal for excluding the possibility of the collision with the person from the determination object is obtained in response to the inquiry, the instruction to exclude the possibility of the collision with the person from the determination object is issued, so that the vehicle can turn to the left in advance of the person that gives the way to the vehicle. When the distance to the person is greater than or equal to the first threshold, and the speed of the person is less than or equal to the second threshold, whether the possibility of the collision with the person is to be excluded from the determination object is inquired, so that the eye contact can be performed irrespective of the automatic driving. The instruction to exclude the possibility of the collision with the person from the determination object is issued by the combination of the inquiry and the response signal, so that the vehicle can travel according to the situation even if the person exists during the left turn.

The determination is continued even after the possibility of the collision with the person is excluded from the determination object, and when the distance to the person falls below the first threshold (less than the first threshold), or when the speed of the person exceeds the second threshold, the possibility of the collision with the person is included in the determination object, so that the occurrence of the collision with the person can be prevented. The inquiry to the occupant is not made in including the possibility of the collision with the person in the determination object, so that a period in which the possibility of the collision with the person is included in the determination object can be shortened. The determination for the first threshold and the second threshold may be less than, less than or equal to, greater than or equal to, or greater than the first threshold and the second threshold according to the value.

Third Exemplary Embodiment

A third exemplary embodiment relates to a driving assistance device to be installed in the vehicle that performs the automatic driving based on the detected obstacle similarly to the first and second exemplary embodiments. Similarly to the second exemplary embodiment, the third exemplary embodiment also focuses on the "left turn" as the driving behavior. At this point, in particular it is assumed that a plurality of persons exist on the pedestrian crossing provided for crossing the second road that the vehicle should enter from the first road by the left turn. In such a situation, in the case that the inquiry and the response with respect to each person is performed as in the second exemplary embodiment, a period until all the pieces of processing are ended is lengthened. When the period is lengthened, there is a possibility that the person who stops to give the way to the vehicle starts to move.

For this reason, in the case that a plurality of persons determined to be in the second state exist, the driving assistance device of the third exemplary embodiment collectively perform the inquiry whether the possibility of the collision with the plurality of persons is to be excluded from the determination object in the automatic-driving control device. When the occupant collectively performs the response operation with respect to the collective inquiry, the driving assistance device causes the automatic-driving control device to collectively exclude the possibility of the collision with the plurality of persons from the determination object. That is, the one-time inquiry and the one-time response operation are performed in order to exclude the possibility of the collision with the plurality of persons from the determination object in the automatic-driving control device. Vehicle 100 of the third exemplary embodiment is of a type similar to that in FIGS. 1 and 2, and controller 41 is of a type similar to that in FIG. 4. Differences from the above description will be mainly described below.

Figure 15:
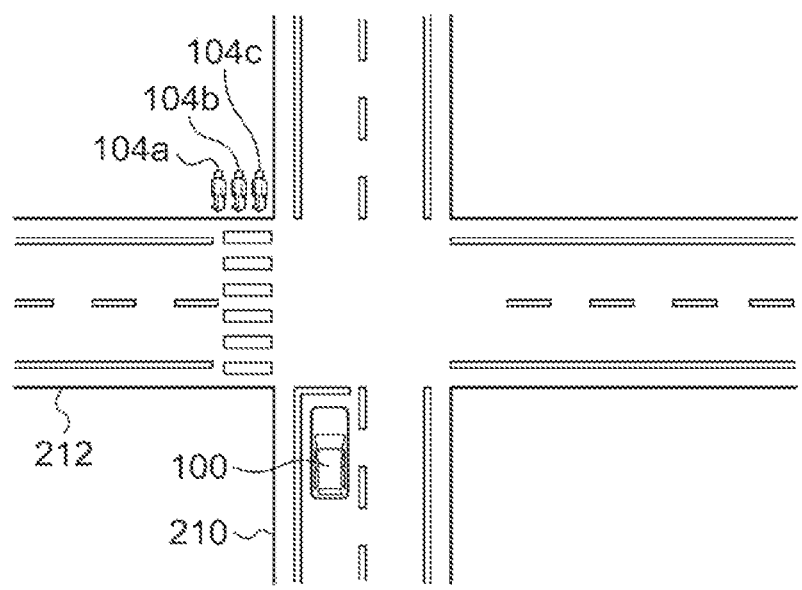
FIG. 15 is a view illustrating a processing outline according to a third exemplary embodiment.

FIG. 15 illustrates a processing outline, and illustrates the left-turn behavior to occur in the future, the left-turn behavior being specified by controller 31 of automatic-driving control device 30 and controller 41 of driving assistance device 40. First road 210, second road 212, and vehicle 100 are indicated similarly to the part (a) of FIG. 11. First person 104*a*, second person 104*b*, and third person 104*c* exist on the pedestrian crossing provided for crossing second road 212. First person 104*a*, second person 104*b*, and third person 104*c* are scheduled to cross second road 212. The number of persons 104 is not limited to three. Controller 31 calculates the collision possibility with respect to each of first person 104*a*, second person 104*b*, and third person 104*c*. When all the collision possibilities are greater than the predetermined value, controller 31 decides the stop behavior.

Behavior information input unit 54 in FIG. 4 receives the information indicating the left-turn behavior as illustrated in FIG. 15 from controller 31. Behavior information input unit 54 also receives the information indicating the stop behavior from controller 31. Behavior information input unit 54 outputs the received pieces of information to controller 41. Determinator 76 of controller 41 derives distance for determination 120 and acquires the speed with respect to each of the plurality of persons 104*a* to 104*c*. When distance for determination 120 with respect to each of the plurality of persons 104*a* to 104*c* is greater than or equal to the first threshold, and the speed of each of the plurality of persons 104a to 104c is less than or equal to the second threshold, determinator 76 determines that all the plurality of persons 104a to 104c are in the second state.

Figure 16:
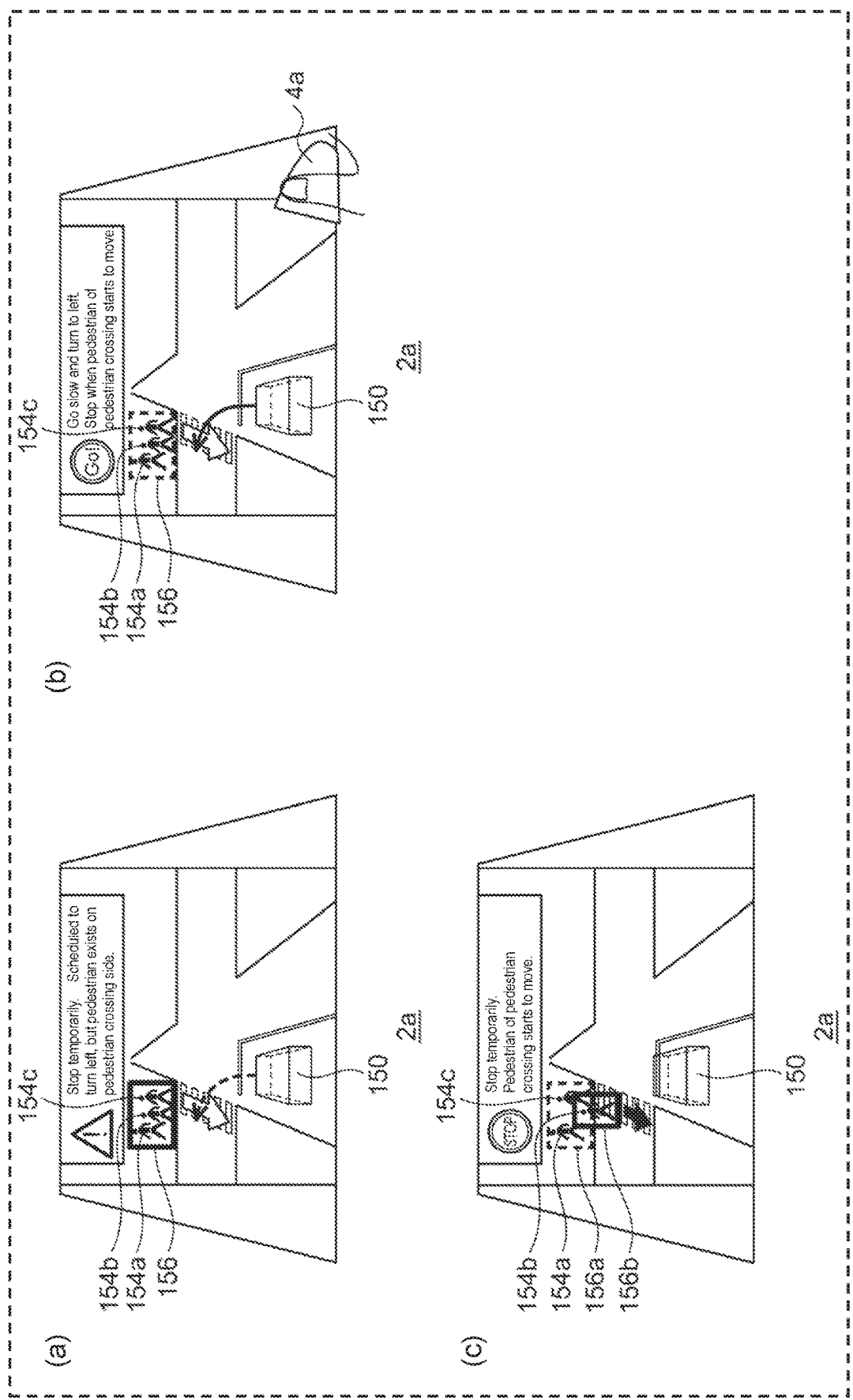
FIG. 16 is a view illustrating an image displayed on a notification device of the third exemplary embodiment.

In the case that determinator 76 determines that all the plurality of persons 104a to 104c are in the second state, inquiry processing unit 78 performs the processing of collectively inquiring of the occupant whether the possibility of the collision with the plurality of persons 104a to 104c is to be excluded from the determination object in automatic-driving control device 30. The inquiry processing will specifically be described below with reference to FIG. 16. FIG. 16 illustrates the image displayed on notification device 2. A part (a) of FIG. 16 illustrates the image that is generated by inquiry processing unit 78 and displayed on head-up display 2a through image-and-sound output unit 51.

Inquiry processing unit 78 generates the image (second inquiry information) indicating a current situation in which the left-turn behavior occurs, namely, a situation in FIG. 15 based on another piece of information received from determinator 76. Own vehicle icon 150 corresponding to vehicle 100, first person icon 154a corresponding to first person 104a, second person icon 154b corresponding to second person 104b, and third person icon 154c corresponding to third person 104c are illustrated in FIG. 16. Rectangular obstacle icon 156 collectively surrounding first person icon 154a to third person icon 154c is also illustrated. Various aspects may be used as the inquiry aspect. Parts (b) and (c) of FIG. 16 will be described later. The description returns to FIG. 4.

The occupant checks the image displayed on head-up display 2a, receives the will of mutual concessions from all the persons or a person who is leader-like of the plurality of persons, and recognizes the situation in which the left turn can be performed. When wanting to perform the left turn, the occupant presses down first operating unit 4a. The action is not limited to this. Operation signal input unit 50 in FIG. 1 receives this action. The action corresponds to a response signal for collectively excluding the possibility of the collision with the plurality of persons 104a to 104c from the determination object with respect to the collective inquiry from image-and-sound output unit 51. When receiving the collective response signal, operation signal input unit 50 notifies inquiry processing unit 78 of the reception of the collective response signal. When receiving the notification of the collective reception, inquiry processing unit 78 instructs command processing unit 80 to generate the command.

In the case that inquiry processing unit 78 instructs command processing unit 80 to generate the command, command processing unit 80 generates the command (second command) to exclude the possibility of the collision with the plurality of persons 104a to 104c from the determination object. Command output unit 55 outputs the command generated by command processing unit 80 to automatic-driving control device 30. When receiving the command, controller 31 of automatic-driving control device 30 excludes the possibility of the collision with the plurality of persons 104a to 104c from the determination object.

In the case that controller 31 of automatic-driving control device 30 excludes the possibility of the collision with the plurality of persons 104a to 104c from the determination object to perform the automatic driving, controller 31 outputs the performance of the command or the continuous performance of the command as the behavior information to driving assistance device 40. When behavior information input unit 54 receives the behavior information, command processing unit 80 generates the image causing the occupant to recognize that the possibility of the collision with the plurality of persons 104a to 104c is excluded from the determination object in automatic-driving control device 30. The part (b) of FIG. 16 illustrates the image displayed on head-up display 2a in the case that the possibility of the collision with the plurality of persons 104a to 104c is excluded from the determination object in automatic-driving control device 30. As illustrated in the part (b) of FIG. 16, obstacle icon 156 surrounding first person icon 154a, second person icon 154b, and third person icon 154c changes from a solid line display to a dotted line display. The part (c) of FIG. 16 will be described later. The description returns to FIG. 4.

After command processing unit 80 outputs the command, determinator 76 continues the determination of the first state or the second state with respect to the plurality of persons 104a to 104c until the left-turn behavior is completed. In the case that the determination result for one of the plurality of persons 104a to 104c indicates the first state, command processing unit 80 generates the command to instruct automatic-driving control device 30 to include the possibility of the collision with the plurality of persons 104a to 104c in the determination object. This corresponds to the inclusion of the possibility of the collision with one of the plurality of persons 104a to 104c that satisfies a determination object condition in the determination object. Command output unit 55 outputs the command generated by command processing unit 80 to automatic-driving control device 30. When receiving the command, controller 31 of automatic-driving control device 30 includes the possibility of the collision with one of the plurality of persons 104a to 104c in the determination object. By including the possibility of the collision with one of the plurality of persons 104a to 104c that satisfies the determination object condition, controller 31 stops vehicle 100 when the collision possibility exceeds the predetermined value.

In the case that controller 31 stops vehicle 100 to notify command processing unit 80 of the stop through behavior information input unit 54, command processing unit 80 generates the image notifying the occupant of the suspension of the left turn. The part (c) of FIG. 16 illustrates the image displayed on head-up display 2a in the case that the left turn is suspended. At this point, it is assumed that the change is performed such that only the possibility of the collision with second person 104b is included in the determination object in automatic-driving control device 30. As illustrated in the part (c) of FIG. 16, first person icon 154a and third person icon 154c are surrounded by first obstacle icon 156a of the dotted line display. On the other hand, second person icon 154b is surrounded by second obstacle icon 156b of the solid line display. Although the processing performed on the downward movement is described above, the processing in which the second exemplary embodiment and the third exemplary embodiment are combined may be performed on the upward movement. For example, in the case that the downward movement and the upward movement exist simultaneously as illustrated in the part (a) of FIG. 14, the plurality of persons including the first person who moves downward and the second person who moves upward may be set to a collective inquiry object.

Figure 17:
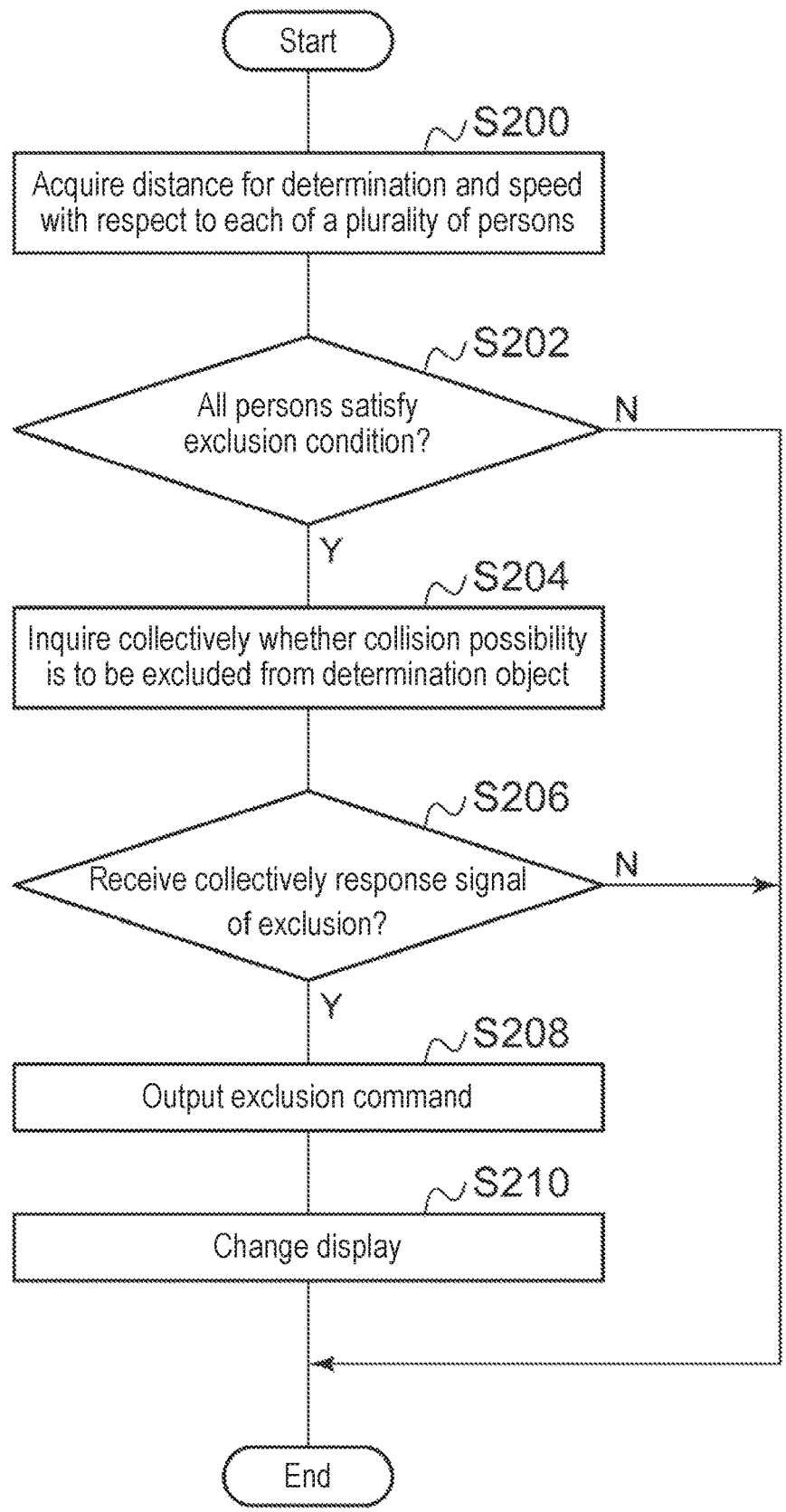
FIG. 17 is a flowchart illustrating an instruction procedure by a controller of the third exemplary embodiment.

Action of driving assistance device 40 having the above configuration will be described. FIG. 17 is a flowchart illustrating an instruction procedure performed by controller 41. Determinator 76 acquires distance for determination 120 and the speed with respect to each of the plurality of persons 104a to 104c (S200). When all persons 104a to 104c satisfy the exclusion condition (Y in S202), inquiry processing unit 78 collectively inquires whether the possibility of the collision with the plurality of persons 104a to 104c is to be excluded from the determination object through image-and-sound output unit 51 (S204). When inquiry processing unit 78 collectively receives the response signal of the exclusion through operation signal input unit 50 (Y in S206), command processing unit 80 outputs the exclusion command through command output unit 55 (S208). Subsequently, command processing unit 80 changes the display (S210). When one of persons 104a to 104c does not satisfy the exclusion condition (N in S202), the processing is ended. In this case, the processing similar to that of the first exemplary embodiment may be performed on one of persons 104a to 104c that satisfies the exclusion condition. When inquiry processing unit 78 does not collectively receives the response signal of the exclusion through operation signal input unit 50 (N in S206), the processing is ended.

Figure 18:
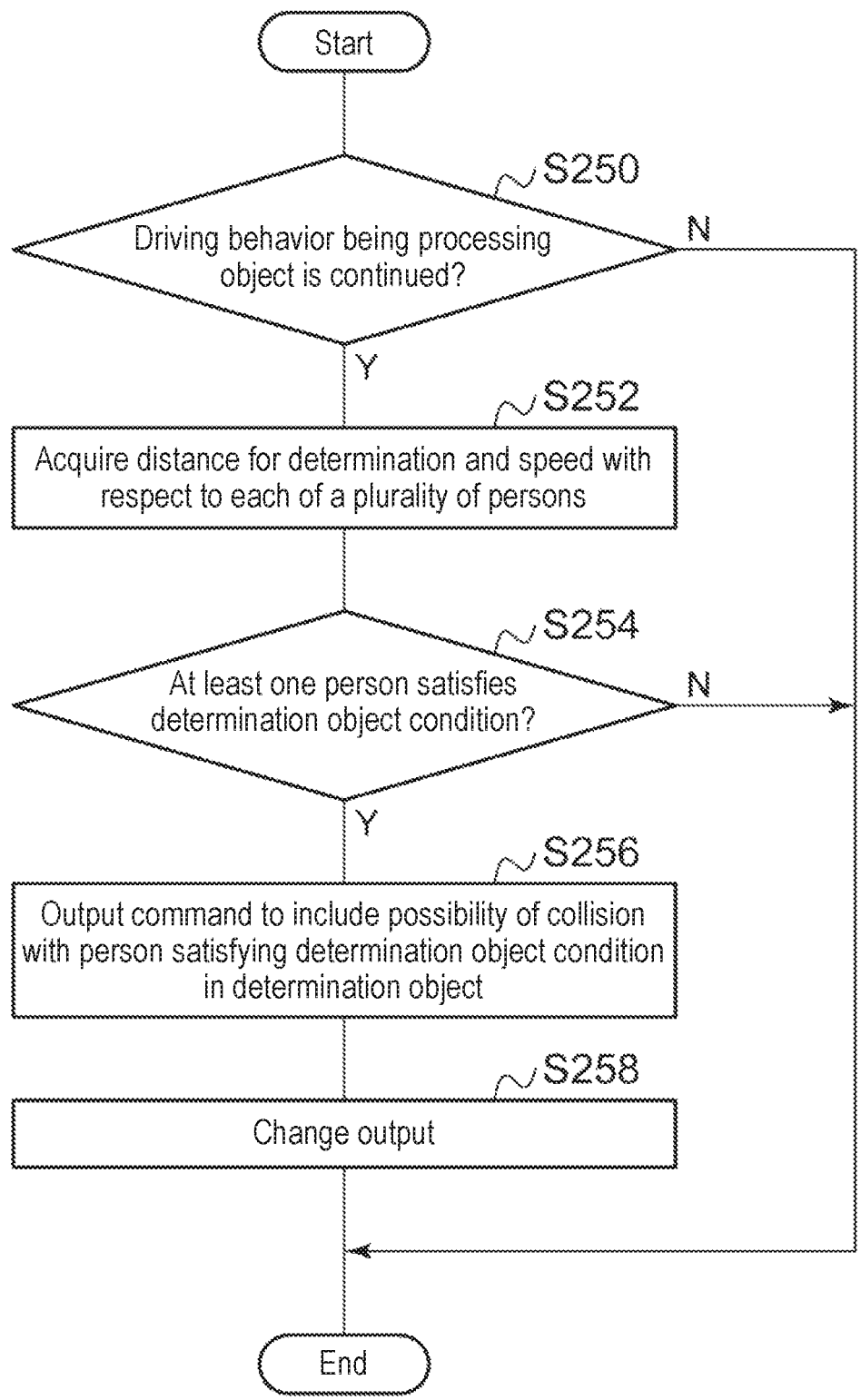
FIG. 18 is a flowchart illustrating another instruction procedure by the controller of the third exemplary embodiment.

FIG. 18 is a flowchart illustrating another instruction procedure performed by controller 41. FIG. 18 illustrates the processing after command processing unit 80 outputs the exclusion command through command output unit 55 and automatic-driving control device 30 excludes the possibility of the collision with the plurality of persons 104a to 104c from the determination object in step 208 of FIG. 17. When automatic-driving control device 30 currently continues the driving behavior being a processing object (Y in S250), determinator 76 acquires distance for determination 120 and the speed with respect to each of the plurality of persons 104a to 104c (S252). When at least one of persons 104a to 104c satisfies the determination object condition (Y in S254), command processing unit 80 output the command to include the possibility of the collision with one of persons 104a to 104c that satisfies the determination object condition through the command output unit 55 (S256). Command processing unit 80 changes the display (S258). When automatic-driving control device 30 does not continue the driving behavior being a processing object (N in S250), or when all persons 104a to 104c do not satisfy the determination object condition (N in S254), the processing is ended.

In the third exemplary embodiment, whether the possibility of the collision with the plurality of persons is to be excluded from the determination object is collectively inquired, so that the number of inquiries can be decreased. The response signal with respect to the collective inquiry is received, so that the processing performed by the occupant can be simplified. The processing performed by the occupant is simplified, so that a period from the inquiry to the response can be shortened. When the distance to at least one person falls below the first threshold, or when the speed of at least one person exceeds the second threshold, the possibility of the collision with the person is included in the determination object, so that the occurrence of the collision with the person can be prevented.

Fourth Exemplary Embodiment

A fourth exemplary embodiment relates to a driving assistance device to be installed in the vehicle that performs the automatic driving based on the detected obstacle similarly to the first to third exemplary embodiments. The fourth exemplary embodiment focuses on the "right turn" as the driving behavior. The right turn occurs at the intersection similarly to the left turn. The vehicle travels on the first road, and the automatic-driving control device calculates the possibility of the collision with the peripheral vehicle that travels oppositely on the first road in front of the intersection intersecting the second road. When the collision possibility is greater than a predetermined value, the automatic-driving control device stops the vehicle in front of the intersection. In this situation, the vehicle can turn to the right in the case that the oppositely traveling peripheral vehicle stops in front of the intersection to give the way to the vehicle.

The driving assistance device of the fourth exemplary embodiment performs the following processing in order to enable the right turn in such a situation. The driving assistance device is informed by automatic-driving control device of the driving behavior of the "stop" that occurs during the driving behavior of the "right turn". The driving assistance device specifies the intersection termination point with respect to the second road in the traveling direction of the peripheral vehicle that is an oncoming vehicle on the first road in the scene in which the first road and the second road intersect from the map information, and derives the distance between the intersection termination point and the peripheral vehicle as the determination distance. The driving assistance device acquires the speed of the peripheral vehicle. When the determination distance is greater than or equal to a first threshold, and the speed is less than or equal to a second threshold, the driving assistance device generates the image in order to inquire of the occupant whether the possibility of the collision between the peripheral vehicle and the vehicle is to be excluded from the determination object in the automatic-driving control device, and displays the image on a monitor in the vehicle. When receiving a response operation to exclude the collision possibility from the occupant with respect to the display, the driving assistance device generates the command to exclude the possibility of the collision between the peripheral vehicle and the vehicle from the determination object, and transmits the command to the automatic-driving control device. When receiving the command from the driving assistance device, the automatic-driving control device excludes the possibility of the collision between the peripheral vehicle and the vehicle from the determination object, and starts the vehicle when the collision possibility is small. Vehicle 100 of the fourth exemplary embodiment is of a type similar to that in FIGS. 1 and 2, and controller 41 is of a type similar to that in FIG. 4. A difference from the first exemplary embodiment will mainly be described below.

Figure 19:
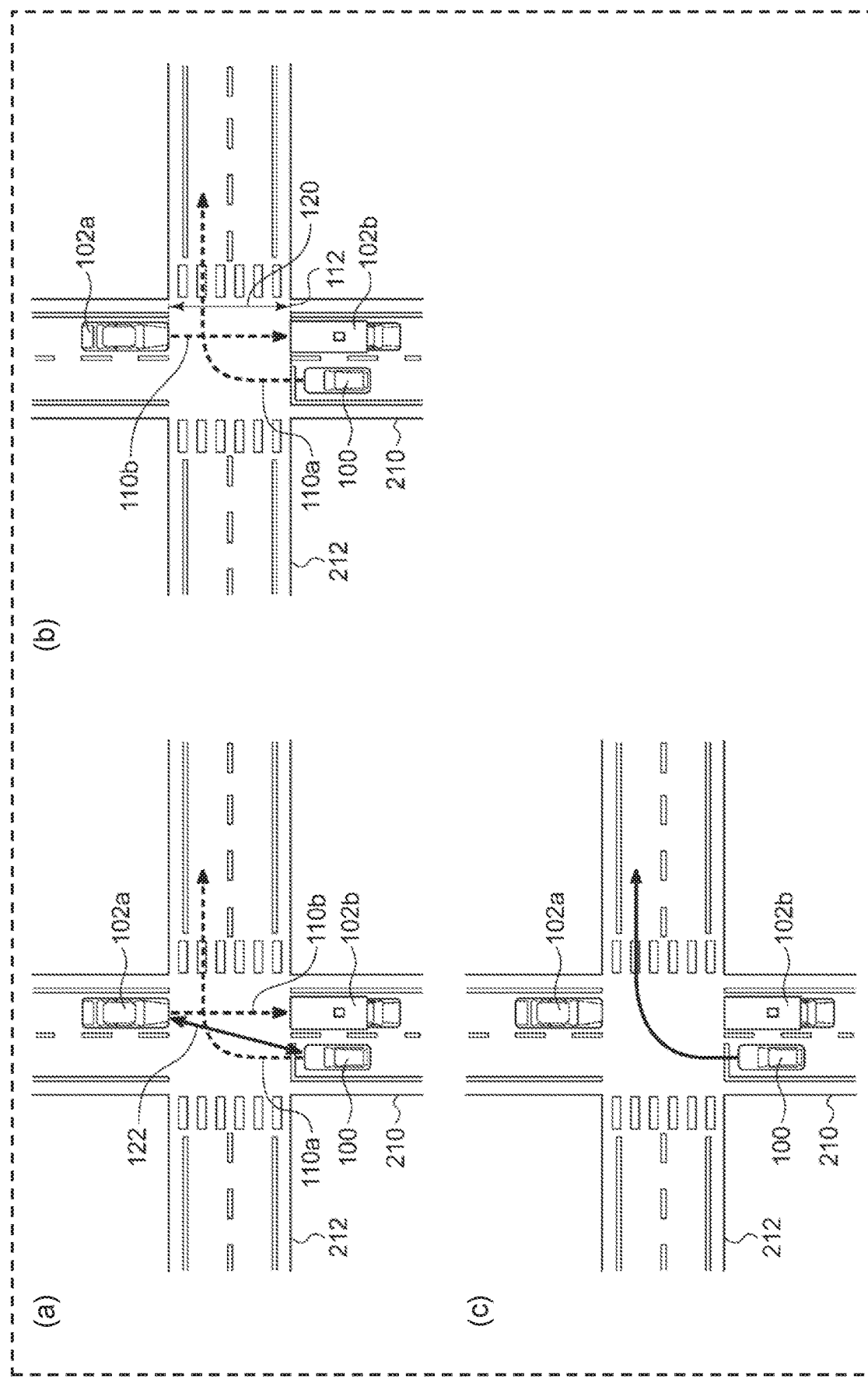
FIG. 19 is a view illustrating a processing outline according to a fourth exemplary embodiment.

The processing of automatic-driving control device 30 will be described before the description of the processing with respect to the driving behavior of the "right turn" performed by driving assistance device 40. FIG. 19 illustrates a processing outline. A part (a) of FIG. 19 illustrates the right-turn behavior to occur in the future, the right-turn behavior being specified by controller 31 of automatic-driving control device 30. First road 210 and second road 212 are indicated similarly to the part (a) of FIG. 11. First route 110a on which vehicle 100 is scheduled to travel is set to go upward on first road 210, to turn to the right at the intersection, and to enter second road 212. First peripheral vehicle 102a and second peripheral vehicle 102b travel downward on first road 210, namely, travel opposite to vehicle 100. At this point, first peripheral vehicle 102a travels in front of the intersection. It is assumed that first peripheral vehicle 102a traveling opposite to vehicle 100 is scheduled to cross vehicle 100 during the right turn of vehicle 100. Controller 31 specifies a right-turn behavior as illustrated in the part (a) of FIG. 19 based on the detection information from detector 20. Any known technique only needs to be used for the specification, and the description will be omitted.

Controller 31 calculates TTC for first peripheral vehicle 102a as the collision possibility based on vehicle following distance 122 between vehicle 100 and first peripheral vehicle 102a, the speed of vehicle 100, and the speed of first peripheral vehicle 102a. In the fourth exemplary embodiment, vehicle following distance 122 is a distance in which a road distance of first route 110a from the position of vehicle 100 to a point at which first route 110a intersects second route 110b and a road distance of second route 110b from the position of first peripheral vehicle 102a to the intersecting point are added to each other. However, vehicle following distance 122 may be approximated by a linear distance between a head of vehicle 100 and a head of first peripheral vehicle 102a. In this case, the linear distance between the head of vehicle 100 and the head of first peripheral vehicle 102a is used as an approximate value. In the case that the calculated collision possibility is greater than the predetermined value, controller 31 decides the stop behavior. When deciding the stop behavior, controller 31 performs the control of stopping vehicle 100. As a result, vehicle 100 travelling on first road 210 stops in front of the intersection. Controller 31 transmits information indicating the stop behavior to behavior information input unit 54 through I/O unit 33. At this point, or before the transmission of the information, controller 31 transmits information indicating the right-turn behavior as illustrated in the part (a) of FIG. 19 to behavior information input unit 54. Parts (b) and (c) of FIG. 19 will be described later.

Behavior information input unit 54 in FIG. 4 receives the information indicating the right-turn behavior as illustrated in the part (a) of FIG. 19 from controller 31. Behavior information input unit 54 also receives the information indicating the stop behavior from controller 31. Behavior information input unit 54 outputs the received pieces of information to controller 41. In the case that behavior information input unit 54 is informed of the stop behavior of the own vehicle, determinator 76 of controller 41 starts the following processing. Determinator 76 grasps the right-turn behavior as illustrated in the part (a) of FIG. 19 based on the information indicating the right-turn behavior. As described above, with no use of the information indicating the right-turn behavior, determinator 76 may grasp the right-turn behavior based on the detection information similarly to controller 31.

The part (b) of FIG. 19 illustrates the right-turn behavior grasped by determinator 76. The part (b) of FIG. 19 illustrates second route 110b on which first peripheral vehicle 102a is predicted to travel. Second route 110b is generated based on map information included in the detection information and position information about first peripheral vehicle 102a, and previously decided as going straight in a downward direction on first road 210. Determinator 76 acquires intersection termination point 112 with respect to second road 212 in the traveling direction of first peripheral vehicle 102a on first road 210 based on the map information included in the detection information. Intersection termination point 112 is a point at which first peripheral vehicle 102a traveling on first road 210 finally reaches in a portion in which first road 210 and second road 212 overlap each other. That is, intersection termination point 112 is an end point (line) of the intersection that first peripheral vehicle 102a travels along first road 210 to reach, and serves as an intersection completion point.

Determinator 76 derives the distance from intersection termination point 112 to first peripheral vehicle 102a as distance for determination 120. In the case that a rearmost portion of second peripheral vehicle 102b exists between intersection termination point 112 and first peripheral vehicle 102a, the distance from the rearmost portion of second peripheral vehicle 102b to first peripheral vehicle 102a may be set to distance for determination 120. Determinator 76 acquires the speed of first peripheral vehicle 102a. When distance for determination 120 is shorter than the first threshold, or when the speed of first peripheral vehicle 102a is higher than the second threshold, determinator 76 determines that it is the "first state". On the other hand, when distance for determination 120 is greater than or equal to the first threshold, and the speed of first peripheral vehicle 102a is less than or equal to the second threshold, determinator 76 determines that it is the "second state". The part (c) of FIG. 19 will be described later. The description returns to FIG. 4. Determinator 76 outputs the determination result to inquiry processing unit 78. Determinator 76 also outputs another piece of information to inquiry processing unit 78.

Figure 20:
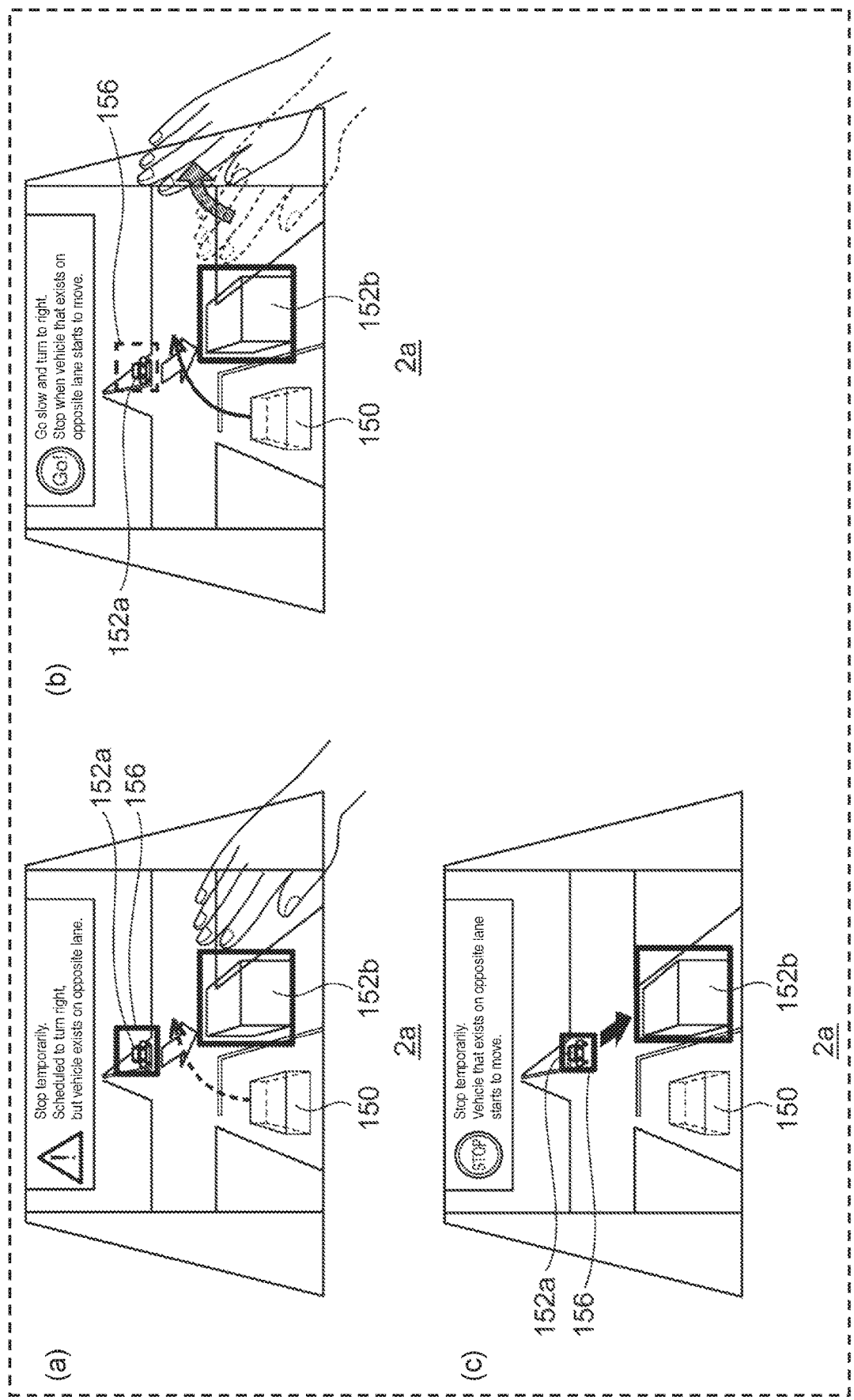
FIG. 20 is a view illustrating an image displayed on a notification device of the fourth exemplary embodiment.

In the case that the determination result from determinator 76 indicates the second state, inquiry processing unit 78 performs the processing of inquiring of the occupant whether the possibility of the collision between first peripheral vehicle 102a and vehicle 100 is to be excluded from the determination object in automatic-driving control device 30. The inquiry processing will specifically be described below with reference to FIG. 20. FIG. 20 illustrates the image displayed on notification device 2. Apart (a) of FIG. 20 illustrates the image that is generated by inquiry processing unit 78 and displayed on head-up display 2a through image-and-sound output unit 51.

Inquiry processing unit 78 generates the image indicating the current situation in which the right-turn behavior occurs, namely, the situation in the part (a) of FIG. 19 based on another piece of information received from determinator 76. Own vehicle icon 150 corresponding to vehicle 100, first peripheral vehicle icon 152a corresponding to first peripheral vehicle 102a, and second peripheral vehicle icon 152b corresponding to second peripheral vehicle 102b are illustrated in FIG. 20. Rectangular obstacle icon 156 surrounding first peripheral vehicle icon 152a is also illustrated. Inquiry processing unit 78 may superpose on the image a message to inquire of the occupant whether the possibility of the collision between first peripheral vehicle 102a and vehicle 100 is to be excluded from the determination object of automatic-driving control device 30. Various aspects may be used as the inquiry aspect. Parts (b) and (c) of FIG. 20 will be described later. The description returns to FIG. 4.

The occupant checks the image displayed on head-up display 2a, receives the eye contact of mutual concessions from the occupant of first peripheral vehicle 102a, and recognizes the situation in which the right turn can be performed. When wanting to perform the right turn, the occupant performs the gesture of the sweep of the hand. Third operating unit 4c detects this action. The action is not limited to this. Operation signal input unit 50 in FIG. 1 receives this action. The action corresponds to a response signal for excluding the possibility of the collision between first peripheral vehicle 102a and vehicle 100 from the determination object with respect to the inquiry from image-and-sound output unit 51. When receiving the response signal, operation signal input unit 50 notifies inquiry processing unit 78 of the reception of the response signal. When receiving the notification, inquiry processing unit 78 instructs command processing unit 80 to generate the command.

In the case that inquiry processing unit 78 instructs command processing unit 80 to generate the command, command processing unit 80 generates the command to exclude the possibility of the collision between first peripheral vehicle 102a and vehicle 100 from the determination object. Command output unit 55 outputs the command generated by command processing unit 80 to automatic-driving control device 30. When receiving the command, controller 31 of automatic-driving control device 30 calculates the collision possibility as in the past. However, controller 31 excludes the possibility of the collision between first peripheral vehicle 102a and vehicle 100 from the determination object, and decides the driving behavior. The part (c) of FIG. 19 illustrates the action of vehicle 100 in the case that the possibility of the collision between first peripheral vehicle 102a and vehicle 100 is excluded from the determination object. In the part (c) of FIG. 19, vehicle 100 turns to the right from first road 210 and travels on second road 212. The description returns to FIG. 4.

In the case that controller 31 of automatic-driving control device 30 excludes the possibility of the collision between first peripheral vehicle 102a and vehicle 100 from the determination object to perform the automatic driving, controller 31 outputs the performance of the command or the continuous performance of the command as the behavior information to driving assistance device 40. When behavior information input unit 54 receives the behavior information, command processing unit 80 generates the image causing the occupant to recognize that the possibility of the collision between first peripheral vehicle 102a and vehicle 100 is excluded from the determination object in automatic-driving control device 30. The part (b) of FIG. 20 illustrates the image displayed on head-up display 2a in the case that the possibility of the collision between first peripheral vehicle 102a and vehicle 100 is excluded from the determination object in automatic-driving control device 30. As illustrated in the part (b) of FIG. 20, obstacle icon 156 surrounding first peripheral vehicle icon 152a changes from the solid line display to the dotted line display. The part (c) of FIG. 20 will be described later. The description returns to FIG. 4.

After command output unit 55 outputs the command, determinator 76 continues the determination of the first state or the second state until the right-turn behavior in the part (c) of FIG. 19 is completed. In the case that the determination result indicates the first state, command processing unit 80 generates the command to instruct automatic-driving control device 30 to include the possibility of the collision between first peripheral vehicle 102a and vehicle 100 in the determination object. This corresponds to the situation in which first peripheral vehicle 102a recognized to give the way to vehicle 100 starts travelling. Command output unit 55 outputs the command generated by command processing unit 80 to automatic-driving control device 30. When receiving the command, controller 31 of automatic-driving control device 30 includes the possibility of the collision between first peripheral vehicle 102a and vehicle 100 in the determination object. Consequently, when the collision possibility exceeds the predetermined value, controller 31 stops vehicle 100.

In the case that controller 31 stops vehicle 100 to notify command processing unit 80 of the stop through behavior information input unit 54, command processing unit 80 generates the image notifying the occupant of the suspension of the right turn. The part (c) of FIG. 20 illustrates the image displayed on head-up display 2a in the case that the right turn is suspended. As illustrated in the part (c) of FIG. 20, obstacle icon 156 surrounding first peripheral vehicle icon 152a changes from the dotted line display to the solid line display, and the message is displayed.

Figure 21:
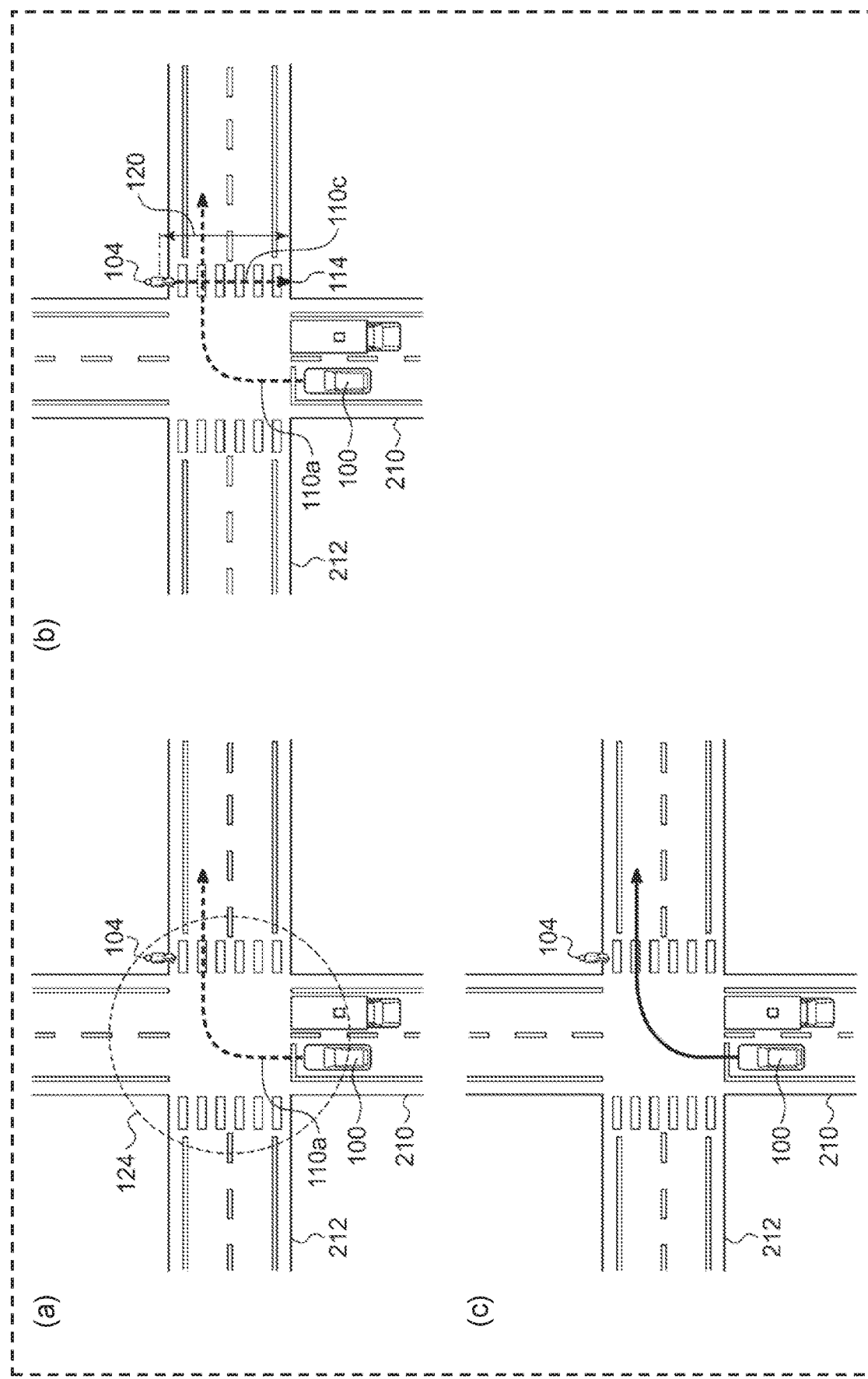
FIG. 21 is a view illustrating another processing outline of a controller of the fourth exemplary embodiment.

For the right-turn behavior, sometimes a person exists on the pedestrian crossing that is provided for crossing second road 212 after the right turn of vehicle 100. For this reason, in the right-turn behavior, similarly to the case of the left-turn behavior, there is a possibility that mutual concessions between the vehicle and the person occur. The processing performed on mutual concessions from the person will be described below. FIG. 21 illustrates another processing outline performed by controller 41. A part (a) of FIG. 21 illustrates the right-turn behavior to occur in the future, the right-turn behavior being specified by controller 31 of automatic-driving control device 30. First route 110a on which vehicle 100 is scheduled to travel is set to go upward on first road 210, to turn to the right at the intersection, and to enter second road 212. Person 104 exists on the pedestrian crossing provided for crossing second road 212 after the right turn. The part (a) of FIG. 21 except for these is similar to the part (a) of FIG. 11, and controller 31 performs the processing similar to the case of the left-turn behavior.

Behavior information input unit 54 in FIG. 4 receives the information indicating the right-turn behavior as illustrated in the part (a) of FIG. 21 from controller 31. Behavior information input unit 54 also receives the information indicating the stop behavior from controller 31. Behavior information input unit 54 outputs the received pieces of information to controller 41. In the case that behavior information input unit 54 is informed of the stop behavior of the own vehicle, determinator 76 of controller 41 starts the following processing. Determinator 76 grasps the right-turn behavior as illustrated in the part (a) of FIG. 21 based on the information indicating the right-turn behavior. As described above, with no use of the information indicating the right-turn behavior, determinator 76 may grasp the right-turn behavior based on the detection information similarly to controller 31.

A part (b) of FIG. 21 illustrates the right-turn behavior grasped by determinator 76 of automatic-driving control device 30. Third route 110c on which person 104 is predicted to walk and crossing termination point 114 of second road 212 are illustrated. These images are illustrated similarly to the part (b) of FIG. 11. For this reason, automatic-driving control device 30 performs the processing similar to the case of the left-turn behavior. As a result, as illustrated in the part (c) of FIG. 21, sometimes vehicle 100 turns to the right from first road 210 and travels on second road 212. The pieces of processing subsequent to this processing are similar to those described above, and thus the description will be omitted.

Although FIG. 21 illustrates the case that person 104 moves downward, the similar processing is performed in the case that person 104 moves upward. In addition, there may be the case that a plurality of peripheral vehicles 102 scheduled to cross vehicle 100 during the right turn of vehicle 100 exist, and the case that a plurality of persons 104 scheduled to cross vehicle 100 during the right turn of vehicle 100 exist. For such cases, the processing similar to that of the third exemplary embodiment may be performed.

In the fourth exemplary embodiment, when the distance to the peripheral vehicle is greater than or equal to the first threshold, and the speed of the peripheral vehicle is less than or equal to the second threshold, whether the possibility of the collision with the peripheral vehicle is to be excluded from the determination object is inquired, so that the will of the occupant can be checked. When the response signal for excluding the possibility of the collision with the peripheral vehicle from the determination object is obtained in response to the inquiry, the instruction to exclude the possibility of the collision with the peripheral vehicle from the determination object is issued, so that the vehicle can turn to the right in advance of the peripheral vehicle that gives the way to the vehicle. When the distance to the peripheral vehicle is greater than or equal to the first threshold, and the speed of the peripheral vehicle is less than or equal to the second threshold, whether the possibility of the collision with the peripheral vehicle is to be excluded from the determination object is inquired, so that the eye contact can be performed irrespective of the automatic driving. The instruction that the possibility of the collision with the peripheral vehicle is to be excluded from the determination object is issued by the combination of the inquiry and the response signal, so that the vehicle can travel according to the situation even if the peripheral vehicle exists during the right turn.

The determination is continued even after the possibility of the collision with the peripheral vehicle is excluded from the determination object, and when the distance to the peripheral vehicle falls below the first threshold, or when the speed of the person exceeds the second threshold, the possibility of the collision with the peripheral vehicle is included in the determination object, so that the occurrence of the collision with the peripheral vehicle can be prevented. The inquiry to the occupant is not made in including the possibility of the collision with the peripheral vehicle in the determination object, so that a period in which the possibility of the collision with the peripheral vehicle is included in the determination object can be shortened.

When the distance to the person is greater than or equal to the third threshold, and the speed of the person is less than or equal to the fourth threshold, whether the possibility of the collision with the person is to be excluded from the determination object is inquired, so that the will of the occupant can be checked. When the response signal for excluding the possibility of the collision with the person from the determination object is obtained in response to the inquiry, the instruction to exclude the possibility of the collision with the person from the determination object is issued, so that the vehicle can turn to the right in advance of the person that gives the way to the vehicle. When the distance to the person is greater than or equal to the third threshold, and the speed of the person is less than or equal to the fourth threshold, whether the possibility of the collision with the person is to be excluded from the determination object is inquired, so that the eye contact can be performed irrespective of the automatic driving. The instruction to exclude the possibility of the collision with the person from the determination object is issued by the combination of the inquiry and the response signal, so that the vehicle can travel according to the situation even if the person exists during the right turn. When the distance to the person falls below the third threshold, or when the speed of the person exceeds the fourth threshold, the possibility of the collision with the person is included in the determination object, so that the occurrence of the collision with the person can be prevented.

Whether the possibility of the collision with the plurality of peripheral vehicles is to be excluded from the determination object is collectively inquired, so that the number of inquiries can be decreased. The response signal with respect to the collective inquiry is received, so that the processing performed by the occupant can be simplified. The processing performed by the occupant is simplified, so that a period from the inquiry to the response can be shortened. When the distance to at least one peripheral vehicle falls below the first threshold, or when the speed of at least one peripheral vehicle exceeds the second threshold, the possibility of the collision with the peripheral vehicle is included in the determination object, so that the occurrence of the collision with the peripheral vehicle can be prevented. Whether the possibility of the collision with the plurality of persons is to be excluded from the determination object is collectively inquired, so that the number of inquiries can be decreased. When the distance to at least one person falls below the third threshold, or when the speed of at least one person exceeds the fourth threshold, the possibility of the collision with the person is included in the determination object, so that the occurrence of the collision with the person can be prevented.

Fifth Exemplary Embodiment

A fifth exemplary embodiment relates to a driving assistance device to be installed in the vehicle that performs the automatic driving based on the detected obstacle similarly to the first to fourth exemplary embodiments. Similarly to the fourth exemplary embodiment, the fifth exemplary embodiment also focuses on the "right turn" as the driving behavior. As described above, in the right turn, sometimes the peripheral vehicle corresponds to the obstacle, and sometimes the person corresponds to the obstacle. At this point, in particular, it is assumed that the peripheral vehicle and the person each correspond to the obstacle. In such a situation, in the case that the inquiry and the response with respect to each of the peripheral vehicle and the person is performed as in the fourth exemplary embodiment, the period until all the pieces of processing are ended is lengthened. When the period is lengthened, there is a possibility that the peripheral vehicle and the person that stop to give the way to the vehicle start to move.

For this reason, in the case that the peripheral vehicle and the person determined to be in the second state exist, the driving assistance device of the fifth exemplary embodiment collectively perform the inquiry whether the possibility of the collision with the peripheral vehicle and the person is to be excluded from the determination object in the automatic-driving control device. When the occupant collectively performs the response operation with respect to the collective inquiry, the driving assistance device causes the automatic-driving control device to exclude the possibility of the collision with the peripheral vehicle and the person from the determination object. That is, the one-time inquiry and the one-time response operation are performed in order to exclude the possibility of the collision with the peripheral vehicle and the person from the determination object in the automatic-driving control device. Vehicle 100 of the fifth exemplary embodiment is of a type similar to that in FIGS. 1 and 2, and controller 41 is of a type similar to that in FIG. 4. Differences from the above description will be mainly described below.

Figure 22:
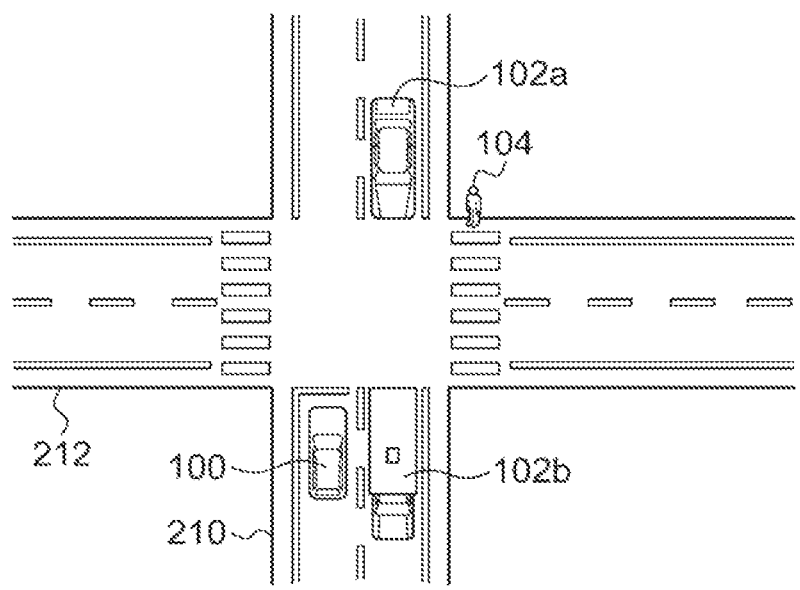
FIG. 22 is a view illustrating a processing outline according to a fifth exemplary embodiment.

FIG. 22 illustrates a processing outline, and illustrates the right-turn behavior to occur in the future, the right-turn behavior being specified by controller 31 of automatic-driving control device 30 and controller 41 of driving assistance device 40. First road 210, second road 212, vehicle 100, first peripheral vehicle 102a, and second peripheral vehicle 102b are indicated similarly to the part (a) of FIG. 19. Person 104 is indicated similarly to the part (a) of FIG. 21. Controller 31 calculates the collision possibility with respect to each of first peripheral vehicle 102a and person 104. When the calculated collision possibility is greater than the predetermined value, controller 31 decides the stop behavior.

Behavior information input unit 54 in FIG. 4 receives the information indicating the right-turn behavior as illustrated in FIG. 22 from controller 31. Behavior information input unit 54 also receives the information indicating the stop behavior from controller 31. Behavior information input unit 54 outputs the received pieces of information to controller 41. Determinator 76 of controller 41 performs processing similar to that described above on first peripheral vehicle 102a, and performs processing similar to that described above on person 104. That is, determinator 76 determines whether first peripheral vehicle 102a is in the first state or the second state, and determines whether person 104 is in the first state or the second state.

Figure 23:
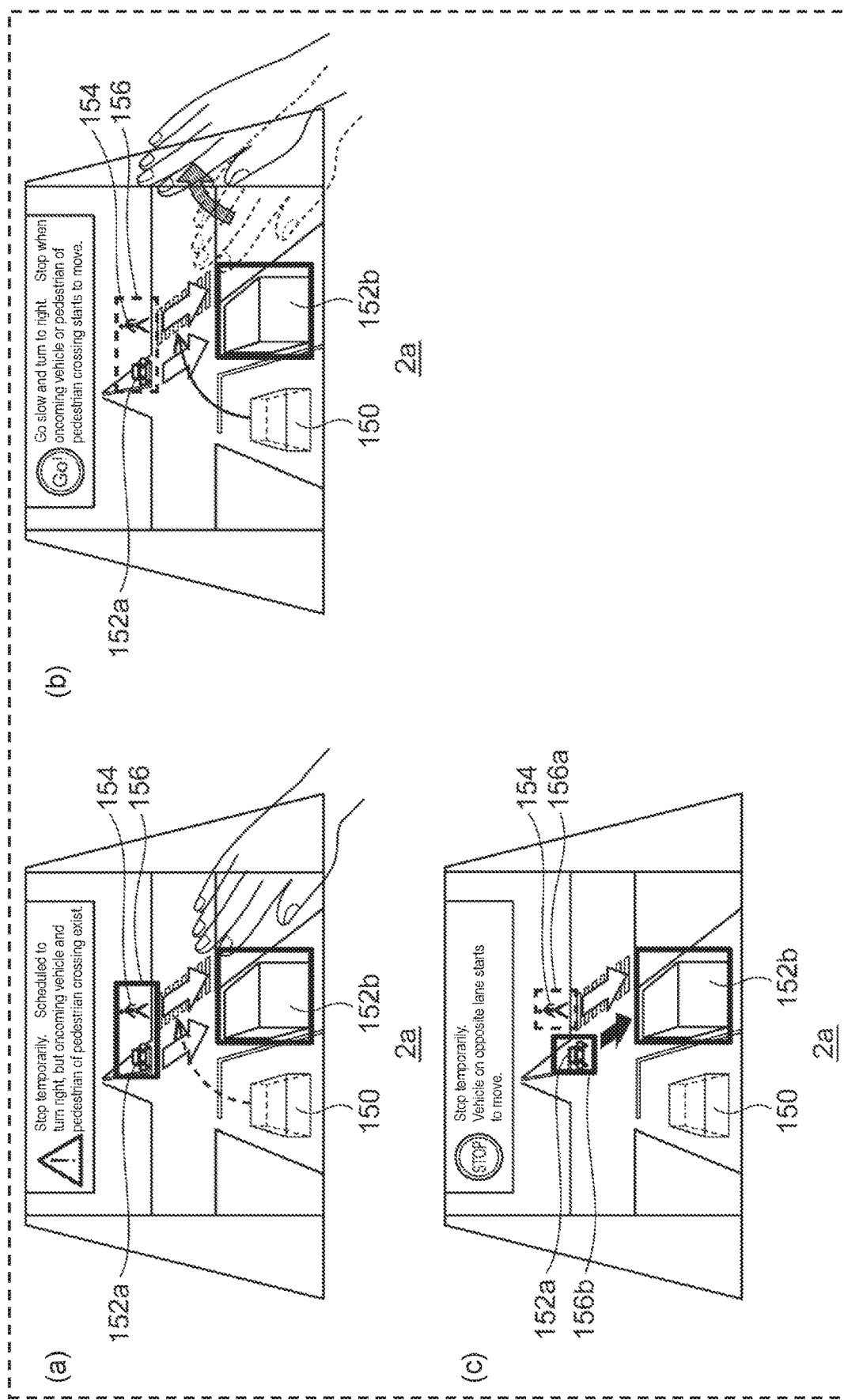
FIG. 23 is a view illustrating an image displayed on a notification device of the fifth exemplary embodiment.

In the case that determinator 76 determines that first peripheral vehicle 102a and person 104 are in the second state, inquiry processing unit 78 performs the processing of collectively inquiring of the occupant whether the possibility of the collision with first peripheral vehicle 102a and person 104 is to be excluded from the determination object in automatic-driving control device 30. The inquiry processing will specifically be described below with reference to FIG. 23. FIG. 23 illustrates the image displayed on notification device 2. A part (a) of FIG. 23 illustrates the image that is generated by inquiry processing unit 78 and displayed on head-up display 2a through image-and-sound output unit 51.

Inquiry processing unit 78 generates the image indicating the current situation in which the right-turn behavior occurs, namely, the situation in FIG. 22 based on another piece of information received from determinator 76. Own vehicle icon 150 corresponding to vehicle 100, first peripheral vehicle icon 152a corresponding to first peripheral vehicle 102a, second peripheral vehicle icon 152b corresponding to second peripheral vehicle 102b, and person icon 154 corresponding to person 104 are illustrated in FIG. 23. Rectangular obstacle icon 156 collectively surrounding first peripheral vehicle icon 152a and person icon 154 is also illustrated. Various aspects may be used as the inquiry aspect. Parts (b) and (c) of FIG. 23 will be described later. The description returns to FIG. 4.

The occupant checks the image displayed on head-up display 2a, receives the eye contact of mutual concessions from both an occupant of first peripheral vehicle 102a and person 104, and recognizes the situation in which the right turn can be performed. When wanting to perform the right turn, the occupant performs the gesture of the sweep of the hand. Third operating unit 4c detects this action. The action is not limited to this. Operation signal input unit 50 in FIG. 1 receives this action. The action corresponds to a response signal for collectively excluding the possibility of the collision with first peripheral vehicle 102a and person 104 from the determination object with respect to the collective inquiry from image-and-sound output unit 51. When receiving the collective response signal, operation signal input unit 50 notifies inquiry processing unit 78 of the reception of the collective response signal. When receiving the notification of the collective reception, inquiry processing unit 78 instructs command processing unit 80 to generate the command.

In the case that inquiry processing unit 78 instructs command processing unit 80 to generate the command, command processing unit 80 generates the command to exclude the possibility of the collision between first peripheral vehicle 102a and person 104 from the determination object. Command output unit 55 outputs the command generated by command processing unit 80 to automatic-driving control device 30. When receiving the command, controller 31 of automatic-driving control device 30 excludes the possibility of the collision with first peripheral vehicle 102a and person 104 from the determination object.

In the case that controller 31 of automatic-driving control device 30 excludes the possibility of the collision between first peripheral vehicle 102a and person 104 from the determination object to perform the automatic driving, controller 31 outputs the performance of the command or the continuous performance of the command as the behavior information to driving assistance device 40. When behavior information input unit 54 receives the behavior information, command processing unit 80 generates the image causing the occupant to recognize that the possibility of the collision with first peripheral vehicle 102a and person 104 is excluded from the determination object in automatic-driving control device 30. The part (b) of FIG. 23 illustrates the image displayed on head-up display 2a in the case that the possibility of the collision with first peripheral vehicle 102a and person 104 is excluded from the determination object in automatic-driving control device 30. As illustrated in the part (b) of FIG. 23, obstacle icon 156 collectively surrounding first peripheral vehicle icon 152a and person icon 154 changes from the solid line display to the dotted line display. The part (c) of FIG. 23 will be described later. The description returns to FIG. 4.

After command processing unit 80 outputs the command, determinator 76 continues the determination of the first state or the second state with respect to each of first peripheral vehicle 102a and person 104 until the right-turn behavior is completed. In the case that the determination result for first peripheral vehicle 102a indicates the first state, command processing unit 80 generates the command to instruct automatic-driving control device 30 to include the possibility of the collision with first peripheral vehicle 102a in the determination object. This corresponds to the inclusion of the possibility of the collision with first peripheral vehicle 102a satisfying the determination object condition in the determination object. On the other hand, in the case that the determination result for person 104 indicates the first state, command processing unit 80 generates the command to instruct automatic-driving control device 30 to include the possibility of the collision with person 104 in the determination object. This corresponds to the inclusion of the possibility of the collision with person 104 satisfying the determination object condition in the determination object.

Command output unit 55 outputs the command generated by command processing unit 80 to automatic-driving control device 30. When receiving the command, controller 31 of automatic-driving control device 30 includes the possibility of the collision with first peripheral vehicle 102a or person 104 that satisfies the determination object condition in the determination object. Consequently, when the collision possibility exceeds the predetermined value, controller 31 stops vehicle 100.

In the case that controller 31 stops vehicle 100 to notify command processing unit 80 of the stop through behavior information input unit 54, command processing unit 80 generates the image notifying the occupant of the suspension of the right turn. The part (c) of FIG. 23 illustrates the image displayed on head-up display 2a in the case that the right turn is suspended. At this point, it is assumed that the change is performed such that the possibility of the collision with first peripheral vehicle 102a is included in the determination object in automatic-driving control device 30. As illustrated in the part (c) of FIG. 23, person icon 154 is surrounded by first obstacle icon 156a of the dotted line display. On the other hand, first peripheral vehicle icon 152a is surrounded by second obstacle icon 156b of the solid line display.

In the fifth exemplary embodiment, whether the possibility of the collision with the peripheral vehicle and the person of different types is to be excluded from the determination object is collectively inquired, so that the number of inquiries can be decreased. The response signal with respect to the collective inquiry is received, so that the processing performed by the occupant can be simplified. The processing performed by the occupant is simplified, so that the period from the inquiry to the response can be shortened. In the case that the distance to one of the peripheral vehicle and the person is shortened, or in the case that the speed is enhanced, the possibility of the collision with the peripheral vehicle or the person is included in the determination object, so that the occurrence of the collision with the peripheral vehicle or the person can be prevented.

While the exemplary embodiments of the present disclosure are described above with reference to the drawings, the functions of the above devices and processors can be implemented by a computer program. A computer that implements the above functions through the execution of the program includes an input device such as a keyboard, a mouse, and a touch pad, an output device such as a display and a speaker, a central processing unit (CPU), a storage device such as a ROM, a RAM, a hard disk device, and an solid state drive (SSD), a reading device that reads information from a recording medium such as a digital versatile disk read only memory (DVD-ROM) and a universal serial bus (USB) memory, and a network card that conducts communication through a network, and the respective elements are connected to one another through a bus.

The reading device reads the program from the recording medium in which the program is recorded, and stores the program in the storage device. Alternatively, the network card communicates with a server device connected to the network, and a program, which implements the respective functions of the above devices and is downloaded from the server device, is stored in the storage device. The CPU copies the program stored in the storage device onto the RAM, and sequentially reads instructions included in the program from the RAM to execute the instructions, thereby implementing the functions of the devices. Another road user may be included as the obstacle. For example, a motorcycle (two-wheeled vehicle) and a bicycle (with a person riding thereon) may be dealt with as the peripheral vehicle, and a person who pushes the bicycle or a person who rides a skateboard may be dealt with the pedestrian.

An outline of one aspect of the present disclosure is as follows.

(Item 1-1)

A driving assistance device to be installed on a vehicle, the driving assistance device including; an automatic-driving control device that calculates a possibility of collision between a detected obstacle and the vehicle, controls automatic driving of the vehicle using the calculated collision possibility as a determination object, and stops the vehicle when the collision possibility is greater than a predetermined value;

a behavior information input unit that receives stop-behavior information about the vehicle from the automatic-driving control device;

an inquiry output unit that outputs inquiry information for inquiring of an occupant whether the possibility of the collision between the obstacle and the vehicle is to be excluded from the determination object in the automatic-driving control device to a notification device, when a distance from one point on a predictive movement route of the obstacle to the obstacle is greater than or equal to a first threshold, and a speed of the obstacle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the obstacle and the vehicle from the determination object; and a command output unit that outputs a command to exclude the possibility of the collision between the obstacle and the vehicle from the determination object to the automatic-driving control device when the operation signal input unit receives the response signal.

According to this aspect, when the distance to the obstacle is greater than or equal to the first threshold, the speed of the obstacle is less than or equal to the second threshold, and the response signal for excluding the possibility of the collision between the obstacle and the vehicle from the determination object is obtained, an instruction to exclude the obstacle is issued, so that the vehicle can travel according to the situation in the case that the obstacle exists.

(Item 1-2)

The driving assistance device according to item 1-1, in which the command output unit outputs a command to include the possibility of the collision between the obstacle and the vehicle in the determination object to the automatic-driving control device, when the distance from the one point on the predictive movement route of the obstacle to the obstacle falls below the first threshold, or when the speed of the obstacle exceeds the second threshold, after outputting the command to exclude the possibility of the collision between the obstacle and the vehicle from the determination object to the automatic-driving control device.

In this case, when the distance to the obstacle falls below the first threshold, or when the speed of the obstacle exceeds the second threshold, the possibility of the collision with the obstacle is included in the determination object, so that the occurrence of the collision with the obstacle can be prevented.

(Item 1-3)

The driving assistance device according to item 1-1, in which the possibility of the collision with a plurality of obstacles including the obstacle increased greater than the predetermined value in the automatic-driving control device allows the behavior information input unit to receive the stop-behavior information about the vehicle from the automatic-driving control device, the inquiry output unit outputs inquiry information for collectively inquiring of the occupant whether the possibility of the collision with the plurality of obstacles is to be excluded from the determination object in the automatic-driving control device to the notification device, when a distance from one point on a predictive movement route of each of the plurality of obstacles to a corresponding one of the plurality of obstacles is greater than or equal to the first threshold, and the speed of each of the plurality of obstacles is less than or equal to the second threshold, in the case that the inquiry output unit receives the stop-behavior information about the vehicle from the behavior information input unit, the operation signal input unit receives a response signal with respect to the inquiry of which the occupant is notified by the notification device, the response signal for collectively excluding the possibility of the collision with the plurality of obstacles from the determination object, and the command output unit outputs a command to exclude the possibility of the collision with the plurality of obstacles from the determination object to the automatic-driving control device when the operation signal input unit receives the response signal.

In this case, whether the possibility of the collision with the plurality of obstacles is to be excluded from the determination object is collectively inquired and then the response signal is received, so that the processing can be simplified.

(Item 1-4)

The driving assistance device according to item 1-3, in which the command output unit outputs a command to include the possibility of the collision with an obstacle satisfying a condition in the determination object to the automatic-driving control device, when one of the distances from the respective points on the predictive movement routes of the plurality of obstacles to the plurality of obstacles falls below the first threshold, or when at least one of the speeds of the plurality of obstacles exceeds the second threshold, after outputting the command to exclude the possibility of the collision with the plurality of obstacles from the determination object to the automatic-driving control device.

In this case, when the distance relating to at least one obstacle falls below the first threshold, or when the speed of at least one obstacle exceeds the second threshold, the possibility of the collision with the obstacle is included in the determination object, so that the occurrence of the collision with the obstacle can be prevented.

(Item 1-5)

An automatic-driving control device to be mounted in a vehicle, the automatic-driving control device including:

an automatic-driving controller that calculates a possibility of collision between a detected obstacle and the vehicle, controls automatic driving of the vehicle using the calculated collision possibility as a determination object, and stops the vehicle when the collision possibility is greater than a predetermined value;

a behavior information input unit that receives stop-behavior information about the vehicle from the automatic-driving controller;

an inquiry output unit that output inquiry information for inquiring of an occupant whether the possibility of the collision between the obstacle and the vehicle is to be excluded from the determination object in the automatic-driving controller to a notification device, when a distance from one point on a predictive movement route of the obstacle to the obstacle is greater than or equal to a first threshold, and the speed of the obstacle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the obstacle and the vehicle from the determination object; and a command output unit that outputs a command to exclude the possibility of the collision between the obstacle and the vehicle from the determination object to the automatic-driving controller when the operation signal input unit receives the response signal.

(Item 1-6)

A vehicle including; an automatic-driving control device that calculates a possibility of collision between a detected obstacle and the vehicle, controls automatic driving of the vehicle using the calculated collision possibility as a determination object, and stops the vehicle when the collision possibility is greater than a predetermined value; and a driving assistance device, the driving assistance device including;

a behavior information input unit that receives stop-behavior information about the vehicle from the automatic-driving control device;

an inquiry output unit that outputs inquiry information for inquiring of an occupant whether the possibility of the collision between the obstacle and the vehicle is to be excluded from the determination object in the automatic-driving control device to a notification device, when a distance from one point on a predictive movement route of the obstacle to the obstacle is greater than or equal to a first threshold, and a speed of the obstacle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the obstacle and the vehicle from the determination object; and a command output unit that outputs a command to exclude the possibility of the collision between the obstacle and the vehicle from the determination object to the automatic-driving control device when the operation signal input unit receives the response signal.

(Item 1-7)

A driving assistance method in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the collision possibility is greater than a predetermined value, the driving assistance method including:

a step of receiving stop-behavior information about the vehicle from the automatic-driving control device;

a step of outputting inquiry information for inquiring of an occupant whether the possibility of the collision between the obstacle and the vehicle is to be excluded from the determination object in the automatic-driving control device to a notification device, when a distance from one point on a predictive movement route of the obstacle to the obstacle is greater than or equal to a first threshold, and a speed of the obstacle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the obstacle and the vehicle from the determination object; and a step of outputting a command to exclude the possibility of the collision between the obstacle and the vehicle from the determination object to the automatic-driving control device when the response signal is input.

(Item 1-8)

A program in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the collision possibility is greater than a predetermined value, the program causing a computer to execute:

a step of receiving stop-behavior information about the vehicle from the automatic-driving control device;

a step of outputting inquiry information for inquiring of an occupant whether the possibility of the collision between the obstacle and the vehicle is to be excluded from the determination object in the automatic-driving control device to a notification device, when a distance from one point on a predictive movement route of the obstacle to the obstacle is greater than or equal to a first threshold, and a speed of the obstacle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the obstacle and the vehicle from the determination object; and a step of outputting a command to exclude the possibility of the collision between the obstacle and the vehicle from the determination object to the automatic-driving control device when the response signal is input.

(Item 1-9)

A driving assistance system to be installed on a vehicle, the driving assistance system including; an automatic-driving control device that calculates a possibility of collision between a detected obstacle and the vehicle, controls automatic driving of the vehicle using the calculated collision possibility as a determination object, and stops the vehicle when the collision possibility is greater than a predetermined value;

a behavior information input unit that receives stop-behavior information about the vehicle from the automatic-driving control device;

a notification device that makes a notification of inquiry information for inquiring of an occupant whether the possibility of the collision between the obstacle and the vehicle is to be excluded from the determination object in the automatic-driving control device to a notification device, when a distance from one point on a predictive movement route of the obstacle to the obstacle is greater than or equal to a first threshold, and a speed of the obstacle is less than or equal to a second threshold, in the case that the notification device receives the stop-behavior information about the vehicle from the behavior information input unit;

an input device that receives a response operation performed by the occupant with respect to the inquiry of which the occupant is notified by the notification device, the response operation for excluding the possibility of the collision between the obstacle and the vehicle from the determination object; and a command output unit that outputs a command to exclude the possibility of the collision between the obstacle and the vehicle from the determination object to the automatic-driving control device when the input device receives the response operation.

(Item 2-1)

A driving assistance device to be installed on a vehicle, the driving assistance device including: an automatic-driving control device that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value;

a behavior information input unit that receives stop-behavior information about the vehicle from the automatic-driving control device;

an inquiry output unit that outputs inquiry information for inquiring of an occupant whether the possibility of the collision between the other vehicle and the vehicle is to be excluded from the determination object in the automatic-driving control device to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving control device when the operation signal input unit receives the response signal.

According to this aspect, when the distance to the peripheral vehicle is greater than or equal to the first threshold, the speed of the peripheral vehicle is less than or equal to the second threshold, and the response signal for excluding the possibility of the collision between the peripheral vehicle and the vehicle from the determination object is obtained, an instruction to exclude the peripheral vehicle is issued, so that the vehicle can travel according to the situation in the case that the peripheral vehicle exists.

(Item 2-2)

The driving assistance device according to item 2-1, in which the inquiry output unit compares a distance from still another vehicle to the other vehicle to the first threshold when the still other vehicle exists between the point at which the other vehicle is predicted to end the crossing of the road on which the vehicle travels and the other vehicle.

In this case, the distance from the still other vehicle to the other vehicle is compared to the first threshold, so that various cases can be coped with. In the case that the still other vehicle exists, the control can be performed more safely.

(Item 2-3)

The driving assistance device according to Item 2-1 or 2-2, in which the command output unit outputs the command to include the possibility of the collision between the other vehicle and the vehicle in the determination object to the automatic-driving control device when the point at which the other vehicle is predicted to end the crossing of the road on which the vehicle travels and the other vehicle falls below the first threshold, or when the speed of the other vehicle exceeds the second threshold, after outputting the command to exclude the possibility of the collision between the other vehicle and the vehicle from the determination object to the automatic-driving control device.

In this case, when the distance to the peripheral vehicle falls below the first threshold, or when the speed of the peripheral vehicle exceeds the second threshold, the possibility of the collision with the peripheral vehicle is included in the determination object, so that the occurrence of the collision with the peripheral vehicle can be prevented.

(Item 2-4)

An automatic-driving control device to be mounted in a vehicle, the automatic-driving control device including:

an automatic-driving controller that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value;

a behavior information input unit that receives stop-behavior information about the vehicle from the automatic-driving controller;

an inquiry output unit that outputs inquiry information for inquiring of an occupant whether the possibility of the collision between the other vehicle and the vehicle is to be excluded from the determination object in the automatic-driving controller to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving controller when the operation signal input unit receives the response signal.

(Item 2-5)

A vehicle including: an automatic-driving control device that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value; and the driving assistance device, the driving assistance device including:

a behavior information input unit that receives stop-behavior information about the vehicle from the automatic-driving control device;

an inquiry output unit that outputs inquiry information for inquiring of an occupant whether the possibility of the collision between the other vehicle and the vehicle is to be excluded from the determination object in the automatic-driving control device to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving control device when the operation signal input unit receives the response signal.

(Item 2-6)

A driving assistance method in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value, the driving assistance method including;

a step of receiving stop-behavior information about the vehicle from the automatic-driving control device;

a step of outputting inquiry information for inquiring of an occupant whether the possibility of the collision between the other vehicle and the vehicle is to be excluded from the determination object in the automatic-driving control device to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the other vehicle and the vehicle from the determination object; and a step of outputting a command to exclude the possibility of the collision between the other vehicle and the vehicle from the determination object to the automatic-driving control device when the response signal is input.

(Item 2-7)

A program in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value, the program causing a computer to execute:

a step of receiving stop-behavior information about the vehicle from the automatic-driving control device;

a step of outputting inquiry information for inquiring of an occupant whether the possibility of the collision between the other vehicle and the vehicle is to be excluded from the determination object in the automatic-driving control device to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the other vehicle and the vehicle from the determination object; and a step of outputting a command to exclude the possibility of the collision between the other vehicle and the vehicle from the determination object to the automatic-driving control device when the response signal is input.

(Item 2-8)

A driving assistance system to be installed on a vehicle, the driving assistance system including: an automatic-driving control device that calculates a possibility of collision between a detected obstacle and the vehicle, controls automatic driving of the vehicle using the calculated collision possibility as a determination object, and stops the vehicle when the possibility of the collision with another vehicle in a case of interruption by the vehicle in front of the other vehicle is greater than a predetermined value;

a behavior information input unit that receives stop-behavior information about the vehicle from the automatic-driving control device;

a notification device makes a notification of inquiry information for inquiring of an occupant whether the possibility of the collision between the other vehicle and the vehicle is to be excluded from the determination object in the automatic-driving control device to a notification device, when a distance from a point at which the other vehicle is predicted to end intersection of a road on which the vehicle travels to the other vehicle is greater than or equal to a first threshold, and a speed of the other vehicle is less than or equal to a second threshold, in the case that the inquiry output unit receives the stop-behavior information about the vehicle from the behavior information input unit;

an input device that receives a response operation performed by the occupant with respect to the inquiry of which the occupant is notified by the notification device, the response operation for excluding the possibility of the collision between the other vehicle and the vehicle from the determination object; and a command output unit that outputs a command to exclude the possibility of the collision between the other vehicle and the vehicle from the determination object to the automatic-driving control device when the input device receives the response operation.

(Item 3-1)

A driving assistance device to be installed on a vehicle, the driving assistance device including; an automatic-driving control device that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value;

a behavior information input unit that receives stop-behavior information about the vehicle from the automatic-driving control device;

an inquiry output unit that outputs inquiry information for inquiring of an occupant whether the possibility of the collision between the person and the vehicle is to be excluded from the determination object in the automatic-driving control device to a notification device when a distance from a point at which the person is predicted to end crossing to the person is greater than or equal to a first threshold and a speed of the person is less than or equal to a second threshold in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the person and the vehicle from the determination object; and a command output unit that outputs a command to exclude the possibility of the collision between the person and the vehicle from the determination object to the automatic-driving control device when the operation signal input unit receives the response signal.

According to this aspect, when the distance to the person is greater than or equal to the first threshold, the speed of the person is less than or equal to the second threshold, and the response signal for excluding the possibility of the collision between the person and the vehicle from the determination object is obtained, an instruction to exclude the person is issued, so that the vehicle can travel according to the situation in the case that the person exists.

(Item 3-2)

The driving assistance device according to item 3-1, in which the command output unit outputs the command to include the possibility of the collision between the person and the vehicle in the determination object to the automatic-driving control device, when the distance from the point at which the person is predicted to end the crossing to the person falls below the first threshold, or when the speed of the person exceeds the second threshold, after outputting the command to exclude the possibility of the collision between the obstacle and the vehicle from the determination object to the automatic-driving control device.

In this case, when the distance to the person falls below the first threshold, or when the speed of the person exceeds the second threshold, the possibility of the collision with the person is included in the determination object, so that the occurrence of the collision with the person can be prevented.

(Item 3-3)

The driving assistance device according to item 3-1, in which if the possibility of the collision with a plurality of persons including the person is increased greater than the predetermined value in the automatic-driving control device, the behavior information input unit receives the stop-behavior information about the vehicle from the automatic-driving control device, the inquiry output unit outputs inquiry information for collectively inquiring of the occupant whether the possibility of the collision with the plurality of persons is to be excluded from the determination object in the automatic-driving control device to the notification device, when the distance from the point at which each of the plurality of persons is predicted to end the crossing to a corresponding one of the plurality of persons is greater than or equal to the first threshold, and the speed of each of the plurality of persons is less than or equal to the second threshold, in the case that the inquiry output unit receives the stop-behavior information about the vehicle from the behavior information input unit, the operation signal input unit receives a response signal of a response operation with respect to the inquiry of which the occupant is notified by the notification device, the response signal for excluding the possibility of the collision with the plurality of persons from the determination object, and the command output unit outputs a command to exclude the possibility of the collision with the plurality of persons from the determination object to the automatic-driving control device when the operation signal input unit receives the response signal.

In this case, whether the possibility of the collision with the plurality of persons is to be excluded from the determination object is collectively inquired to receive the response signal, so that the processing can be simplified.

(Item 3-4)

The driving assistance device according to item 3-3, in which the command output unit outputs a command to include the possibility of the collision with a person satisfying a condition in the determination object to the automatic-driving control device, when at least one of the distances from the respective points at which the plurality of persons are predicted to end the crossing to the plurality of persons falls below the first threshold, or when at least one of the speeds of the plurality of persons exceeds the second threshold, after outputting the command to exclude the possibility of the collision with the plurality of persons from the determination object to the automatic-driving control device.

In this case, when the distance to at least one person falls below the first threshold, or when the speed of at least one person exceeds the second threshold, the possibility of the collision with the person is included in the determination object, so that the occurrence of the collision with the person can be prevented.

(Item 3-5)

An automatic-driving control device to be mounted in a vehicle, the automatic-driving control device including:

an automatic-driving controller that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value;

a behavior information input unit that receives stop-behavior information about the vehicle from the automatic-driving controller;

an inquiry output unit that outputs inquiry information for inquiring of an occupant whether the possibility of the collision between the person and the vehicle is to be excluded from the determination object in the automatic-driving controller to a notification device, when a distance from a point at which the person is predicted to end crossing to the person is greater than or equal to a first threshold, and a speed of the person is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the person and the vehicle from the determination object; and a command output unit that outputs a command to exclude the possibility of the collision between the person and the vehicle from the determination object to the automatic-driving controller when the operation signal input unit receives the response signal.

(Item 3-6)

A vehicle including: an automatic-driving control device that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value; and a driving assistance device, the driving assistance device including:

a behavior information input unit that receives stop-behavior information about the vehicle from the automatic-driving control device;

an inquiry output unit that outputs inquiry information for inquiring of an occupant whether the possibility of the collision between the person and the vehicle is to be excluded from the determination object in the automatic-driving control device to a notification device, when a distance from a point at which the person is predicted to end crossing to the person is greater than or equal to a first threshold, and a speed of the person is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the person and the vehicle from the determination object; and a command output unit that outputs a command to exclude the possibility of the collision between the person and the vehicle from the determination object to the automatic-driving control device when the operation signal input unit receives the response signal.

(Item 3-7)

A driving assistance method in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value, the driving assistance method including:

a step of receiving stop-behavior information about the vehicle from the automatic-driving control device;

a step of outputting inquiry information for inquiring of an occupant whether the possibility of the collision between the person and the vehicle is to be excluded from the determination object in the automatic-driving control device to a notification device when a distance from a point at which the person is predicted to end crossing to the person is greater than or equal to a first threshold and a speed of the person is less than or equal to a second threshold in the case that the stop-behavior information about the vehicle is input;

a step of receiving a response signal of a response operation performed by the occupant with respect to the inquiry of which the occupant is notified by the notification device, the response signal for excluding the possibility of the collision between the person and the vehicle from the determination object; and a step of outputting a command to exclude the possibility of the collision between the person and the vehicle from the determination object to the automatic-driving control device when the response signal is input.

(Item 3-8)

A program in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value, the program causing a computer to execute:

a step of receiving stop-behavior information about the vehicle from the automatic-driving control device;

a step of outputting inquiry information for inquiring of an occupant whether the possibility of the collision between the person and the vehicle is to be excluded from the determination object in the automatic-driving control device to a notification device, when a distance from a point at which the person is predicted to end crossing to the person is greater than or equal to a first threshold, and a speed of the person is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the person and the vehicle from the determination object; and a step of outputting a command to exclude the possibility of the collision between the person and the vehicle from the determination object to the automatic-driving control device when the response signal is input.

(Item 3-9)

A driving assistance system to be installed on a vehicle, the driving assistance system including: an automatic-driving control device that calculates a possibility of collision between a detected obstacle and the vehicle, controls automatic driving of the vehicle using the calculated collision possibility as a determination object, and stops the vehicle when the possibility of the collision with a person who crosses a road on which the vehicle performs a left turn, the collision possibility being calculated when the vehicle performs the left turn, is greater than a predetermined value;

a behavior information input unit that receives stop-behavior information about the vehicle from the automatic-driving control device;

a notification device that makes a notification of inquiry information for inquiring of an occupant whether the possibility of the collision between the person and the vehicle is to be excluded from the determination object in the automatic-driving control device to a notification device, when a distance from a point at which the person is predicted to end crossing to the person is greater than or equal to a first threshold, and a speed of the person is less than or equal to a second threshold, in the case that the inquiry output unit receives the stop-behavior information about the vehicle from the behavior information input unit;

an input device that receives a response operation performed by the occupant with respect to the inquiry of which the occupant is notified by the notification device, the response operation for excluding the possibility of the collision between the person and the vehicle from the determination object; and a command output unit that outputs a command to exclude the possibility of the collision between the person and the vehicle from the determination object to the automatic-driving control device when the input device receives the response operation.

(Item 4-1)

A driving assistance device to be installed on a vehicle, the driving assistance device including: an automatic-driving control device that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value;

a behavior information input unit that receives stop-behavior information about the vehicle from the automatic-driving control device;

an inquiry output unit that outputs inquiry information for inquiring of an occupant whether the possibility of the collision between the other vehicle and the vehicle is to be excluded from the determination object in the automatic-driving control device to a notification device, when a distance from a point at which the other vehicle is predicted to end intersection to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving control device when the operation signal input unit receives the response signal.

According to this aspect, when the distance to the peripheral vehicle is greater than or equal to the first threshold, the speed of the peripheral vehicle is less than or equal to the second threshold, and the response signal for excluding the possibility of the collision between the peripheral vehicle and the vehicle from the determination object is obtained, an instruction to exclude the peripheral vehicle is issued, so that the vehicle can travel according to the situation in the case that the peripheral vehicle exists.

(Item 4-2)

The driving assistance device according to item 4-1, in which the inquiry output unit compares a distance from still another vehicle to the other vehicle to the first threshold when the still another vehicle exists between the point at which the other vehicle is predicted to end the crossing and the other vehicle.

In this case, the distance from the still other vehicle to the other vehicle is compared to the first threshold, so that various cases can be coped with. In the case that the still other vehicle exists, the control can be performed more safely.

(Item 4-3)

The driving assistance device according to Item 4-1 or 4-2, in which the command output unit outputs the command to include the possibility of the collision between the other vehicle and the vehicle in the determination object to the automatic-driving control device, when the point at which the other vehicle is predicted to end the crossing and the other vehicle falls below the first threshold, or when the speed of the other vehicle exceeds the second threshold, after outputting the command to exclude the possibility of the collision between the obstacle and the vehicle from the determination object to the automatic-driving control device.

In this case, when the distance to the peripheral vehicle falls below the first threshold, or when the speed of the peripheral vehicle exceeds the second threshold, the possibility of the collision with the peripheral vehicle is included in the determination object, so that the occurrence of the collision with the peripheral vehicle can be prevented.

(Item 4-4)

The driving assistance device according to any one of items 4-1 to 4-3, in which the behavior information input unit receives stop-behavior information about the vehicle from the automatic-driving control device, when the possibility of the collision with a person who crosses a road on which the vehicle performs a right turn, the collision possibility being calculated when the vehicle performs the right turn in the automatic-driving control device, is greater than or equal to a predetermined value, the inquiry output unit outputs inquiry information for inquiring of an occupant whether the possibility of the collision between the person and the vehicle is to be excluded from the determination object in the automatic-driving control device to a notification device, when a distance from a point at which the person is predicted to end crossing to the person is greater than or equal to a third threshold, and a speed of the person is less than or equal to a fourth threshold, in the case that the inquiry output unit receives the stop-behavior information about the vehicle from the behavior information input unit, the operation signal input unit receives a response signal of a response operation performed by the occupant with respect to the inquiry of which the occupant is notified by the notification device, the response signal for excluding the possibility of the collision between the person and the vehicle from the determination object, and the command output unit outputs a command to exclude the possibility of the collision between the person and the vehicle from the determination object to the automatic-driving control device when the operation signal input unit receives the response signal.

According to this aspect, when the distance to the person is greater than or equal to the third threshold, the speed of the person is less than or equal to the fourth threshold, and the response signal for excluding the possibility of the collision between the person and the vehicle from the determination object is obtained, an instruction to exclude the person is issued, so that the vehicle can travel according to the situation in the case that the person exists.

(Item 4-5)

The driving assistance device according to item 4-4, in which the command output unit outputs the command to include the possibility of the collision between the person and the vehicle in the determination object to the automatic-driving control device, when the distance from the point at which the person is predicted to end the crossing to the person falls below the third threshold, or when the speed of the person exceeds the fourth threshold, after outputting the command to exclude the possibility of the collision between the obstacle and the vehicle from the determination object to the automatic-driving control device.

In this case, when the distance to the person falls below the third threshold, or when the speed of the person exceeds the fourth threshold, the possibility of the collision with the person is included in the determination object, so that the occurrence of the collision with the person can be prevented.

(Item 4-6)

The driving assistance device according to item 4-1 or 4-2, in which if the possibility of the collision with a plurality of other vehicles including the other vehicle is increased greater than the predetermined value in the automatic-driving control device, the behavior information input unit receives the stop-behavior information about the vehicle from the automatic-driving control device, the inquiry output unit outputs inquiry information for collectively inquiring of the occupant whether the possibility of the collision with the plurality of other vehicles is to be excluded from the determination object in the automatic-driving control device to the notification device, when the distance from the point at which each of the plurality of other vehicles is predicted to end intersection to a corresponding one of the plurality of other vehicles is greater than or equal to the first threshold, and the speed of each of the plurality of other vehicles is less than or equal to the second threshold, in the case that the inquiry output unit receives the stop-behavior information about the vehicle from the behavior information input unit, the operation signal input unit receives a response signal of a response operation with respect to the inquiry of which the occupant is notified by the notification device, the response signal for excluding the possibility of the collision with the plurality of other vehicles from the determination object, and the command output unit outputs a command to exclude the possibility of the collision with the plurality of other vehicles from the determination object to the automatic-driving control device when the operation signal input unit receives the response signal.

In this case, whether the possibility of the collision with the plurality of other vehicles is to be excluded from the determination object is collectively inquired to receive the response signal, so that the processing can be simplified.

(Item 4-7)

The driving assistance device according to item 4-6, in which the command output unit outputs a command to include the possibility of the collision with other vehicles satisfying a condition in the determination object to the automatic-driving control device, when one of the distances from the respective points at which the plurality of other vehicles are predicted to end the intersection to the plurality of other vehicles falls below the first threshold, or when at least one of the speeds of the plurality of other vehicles exceeds the second threshold, after outputting the command to exclude the possibility of the collision with the plurality of other vehicles from the determination object to the automatic-driving control device.

In this case, when the distance to at least one peripheral vehicle falls below the first threshold, or when the speed of at least one peripheral vehicle exceeds the second threshold, the possibility of the collision with the peripheral vehicle is included in the determination object, so that the occurrence of the collision with the peripheral vehicle can be prevented.

(Item 4-8)

The driving assistance device according to item 4-4, in which the possibility of the collision with a plurality of persons including the person is increased greater than the predetermined value in the automatic-driving control device, which allows the behavior information input unit to receive the stop-behavior information about the vehicle from the automatic-driving control device, the inquiry output unit outputs inquiry information for collectively inquiring of the occupant whether the possibility of the collision with the plurality of persons is to be excluded from the determination object in the automatic-driving control device to the notification device, when the distance from the point at which each of the plurality of persons is predicted to end the crossing to a corresponding one of the plurality of persons is greater than or equal to the third threshold, and the speed of each of the plurality of persons is less than or equal to the fourth threshold, in the case that the inquiry output unit receives the stop-behavior information about the vehicle from the behavior information input unit, the operation signal input unit receives a response signal of a response operation with respect to the inquiry of which the occupant is notified by the notification device, the response signal for excluding the possibility of the collision with the plurality of persons from the determination object, and the command output unit outputs a command to exclude the possibility of the collision with the plurality of persons from the determination object to the automatic-driving control device when the operation signal input unit receives the response signal.

In this case, whether the possibility of the collision with the plurality of persons is to be excluded from the determination object is collectively inquired to receive the response signal, so that the processing can be simplified.

(Item 4-9)

The driving assistance device according to item 4-8, in which the command output unit outputs a command to include the possibility of the collision with a person satisfying a condition in the determination object to the automatic-driving control device, when at least one of the distances from the respective points at which the plurality of persons are predicted to end the crossing to the plurality of persons falls below the third threshold, or when at least one of the speeds of the plurality of persons exceeds the fourth threshold, after outputting the command to exclude the possibility of the collision with the plurality of persons from the determination object to the automatic-driving control device.

In this case, when the distance with respect to at least one person falls below the third threshold, or when the speed of at least one person exceeds the fourth threshold, the possibility of the collision with the person is included in the determination object, so that the occurrence of the collision with the person can be prevented.

(Item 4-10)

The driving assistance device according to item 4-4, in which the inquiry output unit outputs inquiry information for collectively inquiring of the occupant whether the possibility of the collision between the other vehicle and the person is to be excluded from the determination object in the automatic-driving control device to the notification device, when the distance from a point at which the other vehicle is predicted to end intersection to the other vehicle is greater than or equal to the first threshold, the speed of the other vehicle is less than or equal to the second threshold, the distance from the point at which the person is predicted to end the intersection to the person is greater than or equal to the third threshold, and the speed of the person is less than or equal to the fourth threshold, in the case that the inquiry output unit receives the stop-behavior information about the vehicle from the behavior information input unit, the operation signal input unit receives a response signal of a response operation with respect to the inquiry of which the occupant is notified by the notification device, the response signal for excluding the possibility of the collision between the other vehicle and the person from the determination object, and the command output unit outputs a command to exclude the possibility of the collision between the anther vehicle and the person from the determination object to the automatic-driving control device when the operation signal input unit receives the response signal.

In this case, whether the possibility of the collision between peripheral vehicle and the person is to be excluded from the determination object is collectively inquired to receive the response signal, so that the processing can be simplified.

(Item 4-11)

The driving assistance device according to item 4-10, in which (1) the command output unit outputs the command to include the possibility of the collision with the other vehicle satisfying a condition in the determination object to the automatic-driving control device, when the distance from the point at which the other vehicle is predicted to end the intersection to the other vehicle falls below the first threshold, or when the speed of the other vehicle exceeds the second threshold, and (2) the command output unit outputs the command to include the possibility of the collision with the person satisfying a condition in the determination object to the automatic-driving control device, when the distance from the point at which the person is predicted to end the crossing to the person falls below the third threshold, or when the speed of the person exceeds the fourth threshold, after outputting the command to exclude the possibility of the collision between the other vehicle and the person from the determination object to the automatic-driving control device.

In the case that the distance to one of the peripheral vehicle and the person is shortened, or in the case that the speed is enhanced, the possibility of the collision with the peripheral vehicle or the person is included in the determination object, so that the occurrence of the collision with the peripheral vehicle or the person can be prevented.

(Item 4-12)

An automatic-driving control device to be mounted in a vehicle, the automatic-driving control device including:

an automatic-driving controller that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value;

a behavior information input unit that receives stop-behavior information about the vehicle from the automatic-driving controller;

an inquiry output unit that outputs inquiry information for inquiring of an occupant whether the possibility of the collision between the other vehicle and the vehicle is to be excluded from the determination object in the automatic-driving controller to a notification device, when a distance from a point at which the other vehicle is predicted to end intersection to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving controller when the operation signal input unit receives the response signal.

(Item 4-13)

A vehicle including: the driving assistance device including: an automatic-driving control device that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value; and a driving assistance device, the driving assistance device including:

a behavior information input unit that receives stop-behavior information about the vehicle from the automatic-driving control device;

an inquiry output unit that outputs inquiry information for inquiring of an occupant whether the possibility of the collision between the other vehicle and the vehicle is to be excluded from the determination object in the automatic-driving control device to a notification device, when a distance from a point at which the other vehicle is predicted to end intersection to the other vehicle is greater than or equal to a first threshold, and a speed of the other vehicle is less than or equal to a second threshold, in the case that the inquiry output unit receives the stop-behavior information about the vehicle from the behavior information input unit;

an operation signal input unit that receives a response signal of a response operation performed by the occupant with respect to the inquiry of which the occupant is notified by the notification device, the response signal for excluding the possibility of the collision between the other vehicle and the vehicle from the determination object; and a command output unit that outputs a command to exclude the possibility of the collision between the other vehicle and the vehicle from the determination object to the automatic-driving control device when the operation signal input unit receives the response signal.

(Item 4-14)

A driving assistance method in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value, the driving assistance method including:

a step of receiving stop-behavior information about the vehicle from the automatic-driving control device;

a step of outputting inquiry information for inquiring of an occupant whether the possibility of the collision between the other vehicle and the vehicle is to be excluded from the determination object in the automatic-driving control device to a notification device, when a distance from a point at which the other vehicle is predicted to end crossing to the other vehicle is greater than or equal to a first threshold, and a speed of the other vehicle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the other vehicle and the vehicle from the determination object; and a step of outputting a command to exclude the possibility of the collision between the other vehicle and the vehicle from the determination object to the automatic-driving control device when the response signal is input.

(Item 4-15)

A program in a driving assistance device to be installed on a vehicle, the driving assistance device including an automatic-driving control device that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value, the program causing a computer to execute:

a step of receiving stop-behavior information about the vehicle from the automatic-driving control device;

a step of outputting inquiry information for inquiring of an occupant whether the possibility of the collision between the other vehicle and the vehicle is to be excluded from the determination object in the automatic-driving control device to a notification device, when a distance from a point at which the other vehicle is predicted to end intersection to the other vehicle is greater than or equal to a first threshold, and a speed of the other vehicle is less than or equal to a second threshold, in the case that the stop-behavior information about the vehicle is input;

a step of receiving a response signal of a response operation performed by the occupant with respect to the inquiry of which the occupant is notified by the notification device, the response signal for excluding the possibility of the collision between the other vehicle and the vehicle from the determination object; and a step of outputting a command to exclude the possibility of the collision between the other vehicle and the vehicle from the determination object to the automatic-driving control device when the response signal is input.

(Item 4-16)

A driving assistance system to be installed on a vehicle, the driving assistance system including: an automatic-driving control device that calculates a possibility of collision between a detected obstacle and the vehicle, controls automatic driving of the vehicle using the calculated collision possibility as a determination object, and stops the vehicle when the possibility of the collision with another vehicle that crosses the vehicle during a right turn of the vehicle while traveling opposite to the vehicle, the collision possibility being calculated when the vehicle performs the right turn, is greater than a predetermined value;

a behavior information input unit that receives stop-behavior information about the vehicle from the automatic-driving control device;

a notification device makes a notification of inquiry information for inquiring of an occupant whether the possibility of the collision between the other vehicle and the vehicle is to be excluded from the determination object in the automatic-driving control device to a notification device, when a distance from a point at which the other vehicle is predicted to end intersection to the other vehicle is greater than or equal to a first threshold, and a speed of the other vehicle is less than or equal to a second threshold, in the case that the inquiry output unit receives the stop-behavior information about the vehicle from the behavior information input unit;

an input device that receives a response operation performed by the occupant with respect to the inquiry of which the occupant is notified by the notification device, the response operation for excluding the possibility of the collision between the other vehicle and the vehicle from the determination object; and a command output unit that outputs a command to exclude the possibility of the collision between the other vehicle and the vehicle from the determination object to the automatic-driving control device when the input device receives the response operation.

(Item 5-1)

A driving assistance system including: a detector that detects at least one of a speed of an obstacle around a vehicle and a distance to the vehicle; an automatic-driving control device that calculates a possibility of collision between the obstacle detected by the detector and the vehicle, controls automatic driving of the vehicle using the calculated collision possibility as a determination parameter, and stops the vehicle when the collision possibility is greater than a predetermined value; a notification device that makes a notification of at least information about control of the automatic-driving control device; and a driving assistance device that assists the notification, the driving assistance device outputs first inquiry information for inquiring of an occupant whether the possibility of the collision between the obstacle and the vehicle is to be excluded from the determination parameter to the notification device, when a distance from a first point at which a predictive movement route of the vehicle and a predictive movement route of the obstacle based on the detection by the detector intersect to the obstacle is greater than or equal to a first threshold, and the speed of the obstacle detected by the detector is less than or equal to a second threshold, in the case that stop-behavior information about the vehicle is input from the automatic-driving control device, and the driving assistance device outputs a first command to exclude the possibility of the collision between the obstacle and the vehicle from the determination parameter to the automatic-driving control device when a response signal of a response operation of exclusion performed by the occupant is input with respect to the first inquiry information of which the notification device makes the notification.

(Item 5-2)

The driving assistance system according to item 5-1, in which the driving assistance device outputs a command to include the possibility of the collision between the obstacle and the vehicle in the determination parameter to the automatic-driving control device when a distance from the first point to the obstacle is less than the first threshold, or when a speed of the obstacle exceeds the second threshold, after outputting the first command to the automatic-driving control device.

(Item 5-3)

The driving assistance system according to item 5-1, in which the driving assistance device outputs second inquiry information for inquiring of the occupant whether a possibility of collision with a plurality of obstacles including the obstacle is to be excluded from the determination parameter to the notification device, when a distance from a point at which a predictive movement route of the vehicle and a predictive movement route of each of the plurality of obstacles based on the detection by the detector intersect to a corresponding one of the plurality of obstacles is greater than or equal to the first threshold, and a speed of each of the plurality of obstacles is less than or equal to the second threshold, in a case that stop-behavior information about the vehicle is input from the automatic-driving control device while the possibility of the collision with the plurality of obstacles is greater than a predetermined value, and the driving assistance device outputs a second command to exclude the possibility of the collision with the plurality of obstacles from the determination parameter to the automatic-driving control device when a response signal of collective exclusion is input with respect to the second inquiry information of which the notification device makes the notification.

(Item 5-4)

The driving assistance system according to item 5-3, in which the driving assistance device outputs a command to include the possibility of the collision with an obstacle satisfying a condition in the determination parameter to the automatic-driving control device, when at least one of the distances from the respective points to the plurality of obstacles is less than the first threshold, or when at least one of the speeds of the plurality of obstacles exceeds the second threshold, after outputting the second command to the automatic-driving control device.

(Item 5-5)

A driving assistance device to be installed in a vehicle, the driving assistance device including: a detector that detects at least one of a speed of an obstacle around a vehicle and a distance between the vehicle and the obstacle; an automatic-driving control device that calculates a possibility of collision between the obstacle detected by the detector and the vehicle, controls automatic driving of the vehicle using the calculated collision possibility as a determination parameter, and stops the vehicle when the collision possibility is greater than a predetermined value; and a notification device that makes a notification of at least information about control of the automatic-driving control device, in which first inquiry information for inquiring of an occupant whether the possibility of the collision between the obstacle and the vehicle is to be excluded from the determination parameter is output to the notification device, when a distance from a first point at which a predictive movement route of the vehicle and a predictive movement route of the obstacle based on the detection by the detector intersect to the obstacle is greater than or equal to a first threshold, and the speed of the obstacle detected by the detector is less than or equal to a second threshold, in the case that stop-behavior information about the vehicle is input from the automatic-driving control device, and a first command to exclude the possibility of the collision between the obstacle and the vehicle from the determination parameter is output to the automatic-driving control device when a response signal of a response operation of exclusion performed by the occupant is input with respect to the first inquiry information of which the notification device makes the notification.

(Item 5-6)

A driving assistance method in a driving assistance device to be installed in a vehicle, the driving assistance device including: a detector that detects at least one of a speed of an obstacle around a vehicle and a distance between the vehicle and the obstacle; an automatic-driving control device that calculates a possibility of collision between the obstacle detected by the detector and the vehicle, controls automatic driving of the vehicle using the calculated collision possibility as a determination parameter, and stops the vehicle when the collision possibility is greater than a predetermined value; and a notification device that makes a notification of at least information about control of the automatic-driving control device, the driving assistance method including:

a step of outputting first inquiry information for inquiring of an occupant whether the possibility of the collision between the obstacle and the vehicle is to be excluded from the determination parameter to the notification device, when a distance from a first point at which a predictive movement route of the vehicle and a predictive movement route of the obstacle based on the detection by the detector intersect to the obstacle is greater than or equal to a first threshold, and a speed of the obstacle detected by the detector is less than or equal to a second threshold, in the case that stop-behavior information about the vehicle is input from the automatic-driving control device; and a step of outputting a first command to exclude the possibility of the collision between the obstacle and the vehicle from the determination parameter to the automatic-driving control device when a response signal of a response operation of exclusion performed by the occupant is input with respect to the first inquiry information of which the notification device makes the notification.

The present disclosure is described above according to the exemplary embodiments. It will be understood by those skilled in the art that the exemplary embodiment is merely an example, other exemplary modifications in which components and/or processes of the exemplary embodiment are variously combined are possible, and the other exemplary modifications still fall within the scope of the present disclosure.

In the first to fifth exemplary embodiments, for example, vehicle 100 keeps to the left of the road. However, the present disclosure is not limited to the left-hand traffic, but vehicle 100 may keep to the right of the road. At this point, the description of the left-turn behavior and the right-turn behavior becomes contrary to the first to fifth exemplary embodiments. In this modification, a range of applications can be widened.

In the first to fifth exemplary embodiments, the road on which vehicle 100 or the peripheral vehicle travels is described as the predictive movement route of the obstacle. However, the present disclosure is not limited to this, but a specific traffic lane on the road may be calculated. At this point, by replacing the road with the traffic lane, the predictive movement route of the obstacle can calculate more correctly, and the vehicle can be controlled more accurately. In this modification, a range of applications can be widened.

In the first to fifth exemplary embodiments, the merging behavior, the left-turn behavior, and the right-turn behavior are described as the driving behavior. However, the present disclosure is not limited to the left-hand traffic, but another driving behavior may be used. Distance for determination 120 may be decided according to the driving behavior. In this modification, a range of applications can be widened.

In the first to fifth exemplary embodiments, when controller 31 decides the stop behavior, controller 31 stops vehicle 100 and transmits the information indicating the stop behavior. For this reason, after behavior information input unit 54 receives the stop behavior, controller 41 performs the processing of deciding whether the possibility of the collision with the obstacle is to be excluded from the determination object in the state in which vehicle 100 stops. However, the present disclosure is not limited to this. For example, behavior information input unit 54 receives the stop behavior before vehicle 100 stops, and controller 41 may perform the processing of deciding whether the possibility of the collision with the obstacle is to be excluded from the determination object in the state in which vehicle 100 travels. In this modification, vehicle 100 does not stop, so that the traffic can further be smoothed.

In the fourth exemplary embodiment, during the right turn, controller 41 performs the processing on person 104 while performing the processing on first peripheral vehicle 102a. However, the present disclosure is not limited to this. For example, during the right turn, controller 41 may perform only the processing on person 104 without performing the processing on first peripheral vehicle 102a. At this point, the third threshold and the fourth threshold correspond to the first threshold and the second threshold. In this modification, a range of applications can be widened.

The present disclosure is useful for the automatic driving of the vehicle that can travel according to the situation even if the obstacle exists.

What is claimed is:

1. A driving assistance system comprising:
   a sensor, being able to be on a vehicle, that is configured to detect at least one of a speed of an obstacle around the vehicle and a distance between the vehicle and the obstacle;
   a controller, being able to be on the vehicle, that is configured to calculate a possibility of collision between the obstacle detected by the sensor and the vehicle, control automatic driving of the vehicle based on the calculated possibility of collision, and stop the vehicle when the collision possibility of collision is greater than a predetermined value;
   a display, being able to be on the vehicle, that is configured to make a notification of at least information about control of the controller; and
   a processor, being able to be on the vehicle, and a memory coupled to the processor,
   wherein the memory stores a program that, when executed by the processor, causes the processor to:
   output first inquiry information to the display for inquiring of an occupant of the vehicle whether the automatic driving of the vehicle is to be controlled by the controller regardless of the possibility of collision between the obstacle and the vehicle, when a distance from a first point to the obstacle is greater than or equal to a first threshold, and the speed of the obstacle detected by the sensor is less than or equal to a second threshold, the first point being a point at which a predictive movement route of the vehicle intersects with a predictive movement route of the obstacle based on a detection by the sensor; and
   output a first command for controlling the automatic driving of the vehicle regardless of the possibility of collision between the obstacle and the vehicle to the controller when a response signal based on a predetermined response operation performed by the occupant is input with respect to the first inquiry information of which the display makes the notification.

2. The driving assistance system according to claim 1, wherein the program, when executed by the processor, further causes the processor to output a command for controlling the automatic driving of the vehicle based on the possibility of collision between the obstacle and the vehicle to the controller, when the distance from the first point to the obstacle falls below the first threshold, or when the speed of the obstacle exceeds the second threshold, after outputting the first command to the controller.

3. The driving assistance system according to claim 1, wherein the program, when executed by the processor, further causes the processor to:

output second inquiry information to the display for inquiring of the occupant of the vehicle whether the automatic driving of the vehicle is to be controlled regardless of a possibility of collision with a plurality of obstacles including the obstacle, when each of distances from intersecting points to the plurality of obstacles is greater than or equal to the first threshold and a speed of each of the plurality of obstacles is less than or equal to the second threshold, while the possibility of the collision with the plurality of obstacles is greater than a predetermined value, the intersecting points being points at which the predictive movement route of the vehicle intersects with a predictive movement route of each of the plurality of obstacles based on detections by the sensor; and output a second command for controlling the automatic driving of the vehicle regardless of the possibility of collision with respect to the plurality of obstacles to the controller, when a second response signal is input with respect to the second inquiry information of which the display makes the notification.

4. The driving assistance system according to claim 3, wherein the program, when executed by the processor, further causes the processor to output a third command for controlling the automatic driving of the vehicle based on the possibility of collision between a first obstacle and the vehicle to the controller, when a distance from a second point to the first obstacle falls below the first threshold, or when a speed of the first obstacle exceeds the second threshold, after outputting the second command to the controller, the first obstacle being one of the plurality of obstacles, the second point being a point at which the predictive movement route of the vehicle intersects with a predictive movement route of the first obstacle based on a detection by the sensor.

5. A driving assistance device to be installed in a vehicle, the driving assistance device comprising:

a processor; and a memory coupled to the processor, the memory storing a program that, when executed by the processor, causes the processor to:

detect at least one of a speed of an obstacle around the vehicle and a distance between the vehicle and the obstacle;

calculate a possibility of collision between the obstacle and the vehicle, control automatic driving of the vehicle based on the possibility of collision, and stop the vehicle when the possibility of collision is greater than a predetermined value; and make a notification of at least information about controlling the automatic driving of the vehicle, wherein first inquiry information for inquiring of an occupant of the vehicle whether the automatic driving of the vehicle is to be controlled regardless of the possibility of collision between the obstacle and the vehicle is output, when a distance from a first point to the obstacle is greater than or equal to a first threshold, and the speed of the obstacle is less than or equal to a second threshold, the first point being a point at which a predictive movement route of the vehicle intersects with a predictive movement route of the obstacle, and a first command for controlling the automatic driving of the vehicle regardless of the possibility of collision between the obstacle and the vehicle is output, when a response signal based on a predetermined response operation performed by the occupant is input with respect to the first inquiry information.

6. A driving assistance method in a driving assistance device to be installed in a vehicle, the driving assistance method comprising:

detecting at least one of a speed of an obstacle around the vehicle and a distance between the vehicle and the obstacle;

calculating a possibility of collision between the obstacle and the vehicle, controlling automatic driving of the vehicle based on the possibility of collision, and stopping the vehicle when the possibility of collision is greater than a predetermined value;

making a notification of at least information about controlling the automatic driving of the vehicle;

outputting first inquiry information for inquiring of an occupant of the vehicle whether the automatic driving of the vehicle is to be controlled regardless of the possibility of the collision between the obstacle and the vehicle, when a distance from a first point to the obstacle is greater than or equal to a first threshold, and the speed of the obstacle is less than or equal to a second threshold, the first point being a point at which a predictive movement route of the vehicle intersects with a predictive movement route of the obstacle and outputting a first command for controlling the automatic driving of the vehicle regardless of the possibility of collision between the obstacle and the vehicle when a response signal based on a predetermined response operation performed by the occupant is input with respect to the first inquiry information.

* * * * *